US009852561B2

(12) United States Patent
Dumas et al.

(10) Patent No.: US 9,852,561 B2
(45) Date of Patent: Dec. 26, 2017

(54) WIRELESS ACCESS CONTROL SYSTEM FOR A DOOR INCLUDING PROXIMITY BASED LOCK DISABLING AND RELATED METHODS

(71) Applicant: Unikey Technologies Inc., Winter Park, FL (US)

(72) Inventors: Philip C. Dumas, Orlando, FL (US); William Holderness, Winter Park, FL (US); Stephen Jablonski, Apopka, FL (US); Thomas Bennett, Maitland, FL (US)

(73) Assignee: UNIKEY TECHNOLOGIES INC., Orlando, FL (US)

( * ) Notice: Subject to any disclaimer, the term of this patent is extended or adjusted under 35 U.S.C. 154(b) by 293 days.

(21) Appl. No.: 14/714,694

(22) Filed: May 18, 2015

(65) Prior Publication Data

US 2016/0343189 A1 Nov. 24, 2016

(51) Int. Cl.
*G06F 7/04* (2006.01)
*G07C 9/00* (2006.01)

(52) U.S. Cl.
CPC ..... *G07C 9/00309* (2013.01); *G07C 2209/63* (2013.01)

(58) Field of Classification Search
CPC ............ G07C 9/00174; G07C 9/00309; G07C 2209/64
See application file for complete search history.

(56) References Cited

U.S. PATENT DOCUMENTS 9,613,478 B2 * 4/2017 Dumas ................ G07C 9/00111
9,704,318 B2 * 7/2017 Zakaria .............. G07C 9/00309
2002/0014954 A1 2/2002 Fitzgibbon et al.
2004/0036573 A1 2/2004 Fitzgibbon et al.
2008/0017705 A1 1/2008 Costello et al.
2012/0280790 A1 11/2012 Gerhardt et al.
2014/0125453 A1 5/2014 McIntyre et al.
2014/0188348 A1 7/2014 Gautama et al.
2014/0340196 A1 11/2014 Myers et al.
(Continued)

OTHER PUBLICATIONS

Neil et al., U.S. Appl. No. 13/415,365, filed Mar. 8, 2012.
(Continued)

*Primary Examiner* — Carlos E Garcia
(74) *Attorney, Agent, or Firm* — Allen, Dyer, Doppelt + Gilchrist, P.A.

(57) ABSTRACT

A wireless access control system for a door may include a lock assembly carried by the door that may include a lock, lock wireless communications circuitry, a proximity detector directed toward an interior area, interior and exterior antennas, and a lock controller. The lock controller may determine if the user is in the interior or exterior area based upon the proximity detector and a received signal strength at the interior and exterior antennas based upon wireless communication with a remote access device, enable lock switching based upon the received signal strength at the exterior antenna being greater than at the interior antenna, disable lock switching when the user is in the interior area and a difference between the received signal strength at the interior and exterior antennas is below a threshold, and switch the lock based upon communication with the remote access device and switching of the lock being enabled.

20 Claims, 40 Drawing Sheets

(56) References Cited

U.S. PATENT DOCUMENTS

| | | | | |
|---|---|---|---|---|
| 2016/0343185 | A1* | 11/2016 | Dumas | G07C 9/00309 |
| 2016/0343189 | A1* | 11/2016 | Dumas | G07C 9/00309 |

OTHER PUBLICATIONS

Dumas et al., U.S. Appl. No. 13/654,132, filed Oct. 17, 2012.
Dumas et al., U.S. Appl. No. 13/734,671, filed Jan. 4, 2013.
Dumas et al., U.S. Appl. No. 13/968,067, filed Aug. 15, 2013.
Dumas et al., U.S. Appl. No. 14/304,573, filed Jun. 13, 2014.

* cited by examiner

WIRELESS ACCESS CONTROL SYSTEM FOR A DOOR INCLUDING PROXIMITY BASED LOCK DISABLING AND RELATED METHODS

TECHNICAL FIELD

The present disclosure is directed to the field of electronics, and more particularly, to wireless access control and related methods.

BACKGROUND

Protecting or securing access to an area may be particularly desirable. For example, it is often desirable to secure a home or business. One way of securing access to an area is with a mechanical lock. A mechanical lock typically accepts a key, which may move a deadbolt or enable a door handle to be operated.

It may be desirable to increase user convenience with respect to a mechanical lock. A passive keyless entry (PKE) system may provide an increased level of convenience over a standard lock and key, for example, by providing the ability to access a secure area without having to find, insert, and turn a traditional key. For example, a user may access a secure area using a remote access device, such as, for example, a FOB or mobile wireless communication device. In a PKE system, access may be provided to the secure area without pressing a button or providing other input to the remote device, thus making it passive.

U.S. Patent Application Publication No. 2014/0340196 to Myers et al. discloses an access control system via direct and indirect communications. More particularly, Myers et al. discloses a lock assembly communicating with a mobile device and a gateway to communicate with the lock. Operating command such as lock and unlock are communicated directly from the mobile device or indirectly after confirming, for example, using GPS coordinates of the mobile device.

U.S. Patent Application Publication No. 2012/0280790 to Gerhardt et al. is directed to a system for controlling a locking mechanism using a portable electronic device. More particularly, Gerhardt et al. discloses using a web service to authenticate a portable electronic device, detecting the proximity of the portable electronic device to the lock, and issuing a command for receipt by the lock from the web service or portable electronic device.

SUMMARY

A wireless access control system for a door defining interior and exterior areas may include a lock assembly carried by the door. The lock assembly may include a lock switchable between a locked position and an unlocked position, lock wireless communications circuitry, and a proximity detector directed toward the interior area to detect a proximity of a user to the door. The lock assembly may also include an interior directional antenna directed toward the interior area, an exterior directional antenna directed toward the exterior area, and a lock controller coupled to the lock, the lock wireless communications circuitry, the proximity detector, and the interior and exterior directional antennas. The wireless access control system may also include a remote access device remote from the lock assembly and that includes remote access wireless communications circuitry to communicate with the lock wireless communications circuitry. The lock controller may be configured to determine if the user is in the interior area or exterior area based upon the proximity detector and a received signal strength at each of the interior and exterior directional antennas based upon communication with the remote access device, and enable switching of the lock between the locked and unlocked positions based upon the received signal strength at the exterior directional antenna being greater than at the interior directional antenna. The lock controller may also be configured to disable switching of the lock between the locked and unlocked positions when the user is determined to be in the interior area and a difference between the received signal strength at the interior and exterior directional antennas is below a threshold, and switch the lock between the locked and unlocked positions based upon communication with the remote access device and switching of the lock being enabled. Accordingly, the lock may not be enabled when the user is in the interior area based upon the proximity sensor. For example, when the user's location, interior or exterior may not be able to be determined with a sufficient level of certainty based upon the directional antennas, the proximity sensor may be used to determine the user's location so that the lock is disabled when the user is in the interior area.

The lock controller may be configured to determine a received signal strength at each of the interior and exterior directional antennas based upon communication with the remote access device and disable switching of the lock between the locked and unlocked positions based upon the received signal strength at the interior directional antenna being greater than the received signal strength at the exterior directional antenna, for example. The lock controller may be configured to determine a received signal strength at each of the interior and exterior directional antennas based upon communication with the remote access device and enable switching of the lock between the locked and unlocked positions based upon the received signal strength at the interior and exterior directional antennas increasing over time.

The proximity detector may be an infrared (IR) proximity detector, for example. The lock assembly may further include a touch sensor coupled to the lock controller and configured to sense touching from the user. The lock controller may be configured to switch the lock between the locked and unlocked positions based upon the user touching the touch sensor. The touch sensor may be directed to the exterior area, for example. The touch sensor may be a capacitive touch sensor.

The lock controller may be configured to perform an authentication of the remote access device based upon communication with the remote access device and switch the lock between the locked and unlocked positions based upon the authentication.

A method aspect is directed to a method of using a wireless access control system for a door, the door defining interior and exterior areas. The wireless access control system may include a lock assembly carried by the door and comprising a lock switchable between an unlocked position and a locked position, lock wireless communications circuitry, a proximity detector directed toward the interior area to detect a proximity of a user to the door, an interior directional antenna directed toward the interior area, an exterior directional antenna directed toward the exterior area, and a lock controller coupled to the lock, the lock wireless communications circuitry, the proximity detector, and the interior and exterior directional antennas. The wireless access control system may also include a remote access device remote from the lock. The method may include using the lock controller to determine if the user is in the interior area or exterior area based upon the proximity detector and a received signal strength at each of the interior and exterior directional antennas based upon communication with the remote access device and enable switching of the lock between the locked and unlocked positions based upon the received signal strength at the exterior directional antenna being greater than at the interior directional antenna. The lock controller may also be used to disable switching of the lock between the locked and unlocked positions when the user is determined to be in the interior area and a difference between the received signal strength at the interior and exterior directional antennas is below a threshold and switch the lock between the locked and unlocked positions based upon communication with the remote access device and switching of the lock being enabled.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and number in increments of 100 are used to refer to like elements in different embodiments.

Figure 1:
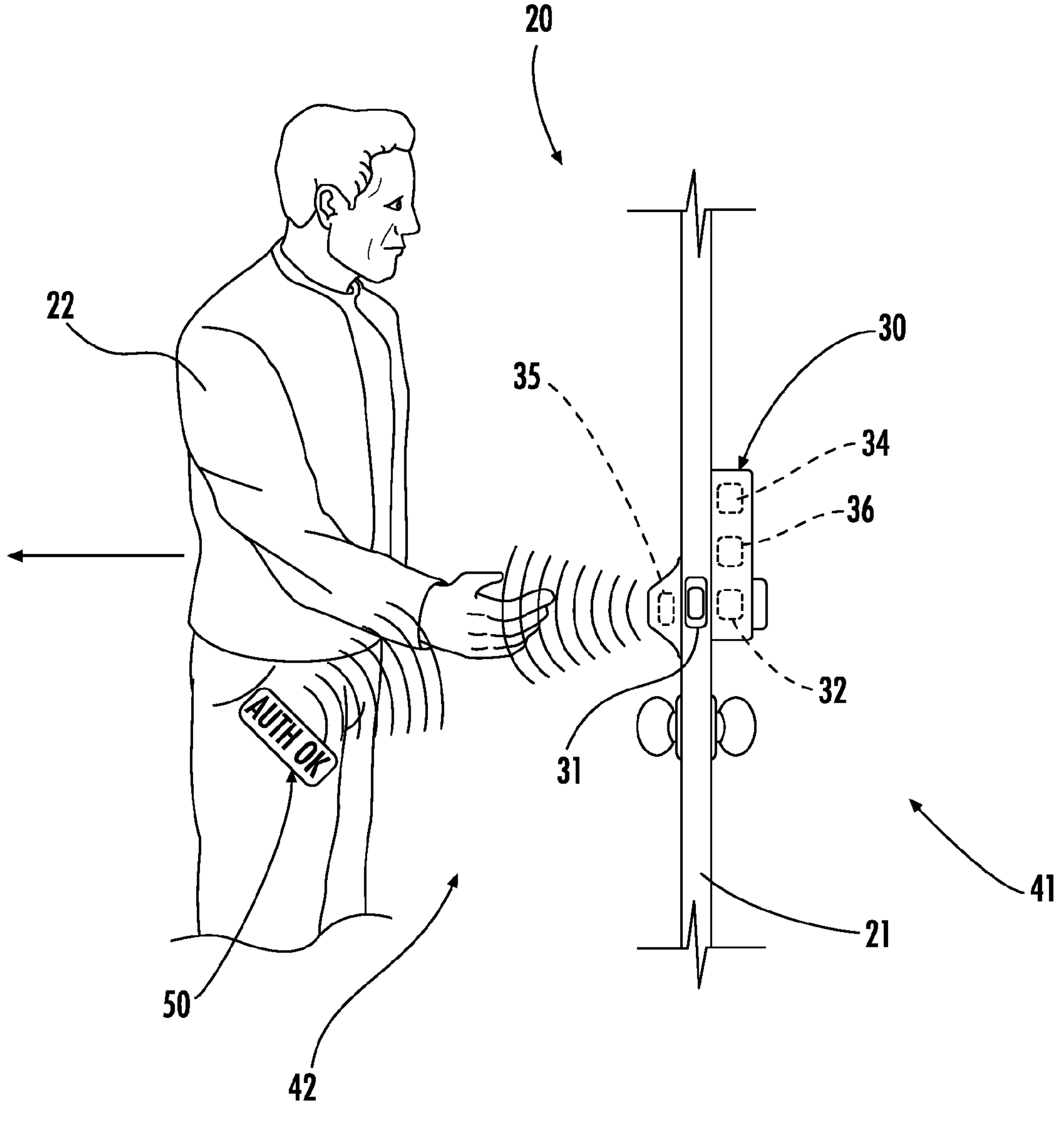
FIG. 1 is a diagram illustrating a side schematic view of a lock assembly of a wireless access control system and a remote access device of the wireless access control system carried by a user in accordance with an embodiment of the present invention.
Figure 2:
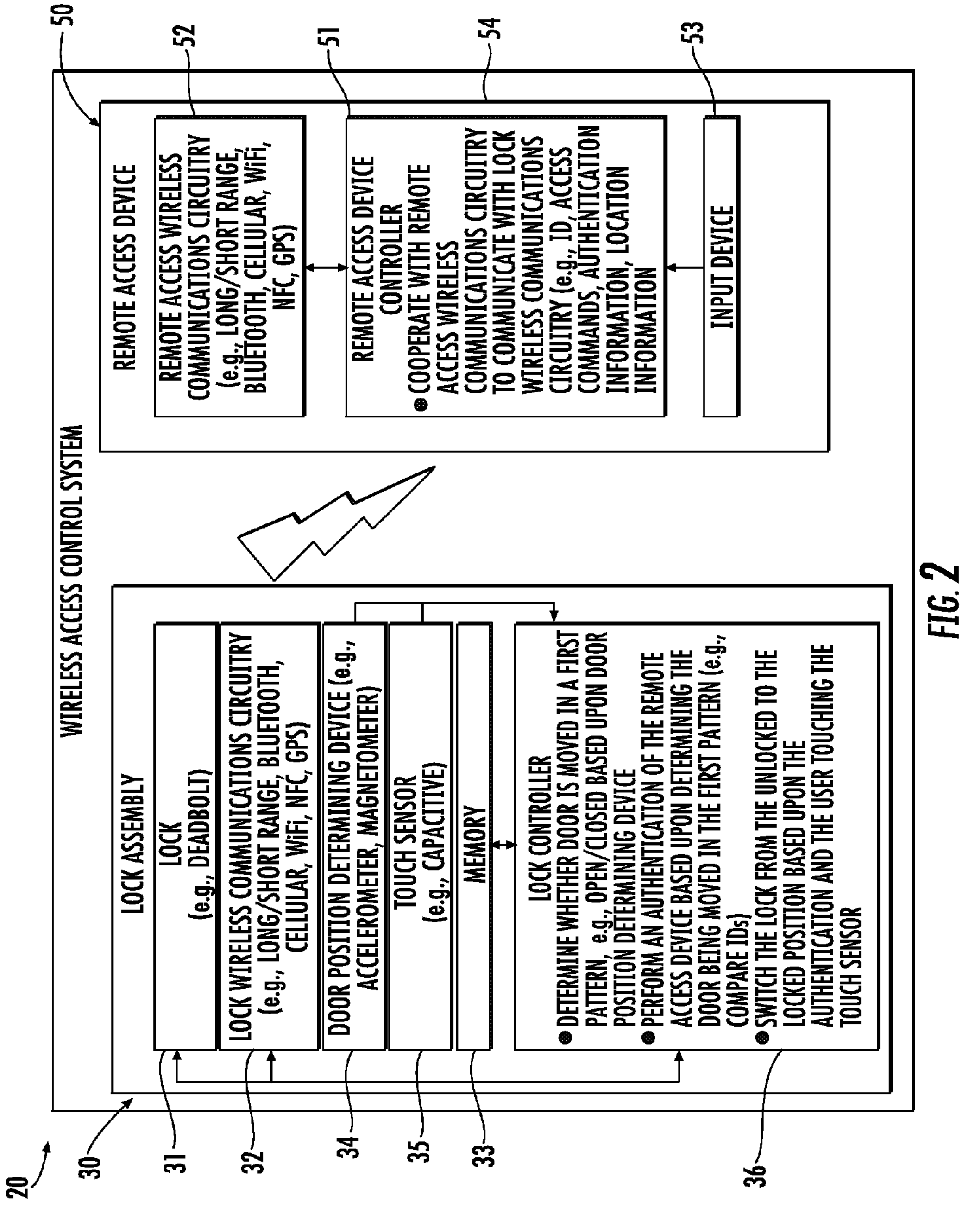
FIG. 2 is a schematic block diagram of the wireless access control system of FIG. 1.

Referring initially to FIGS. 1 and 2, a wireless access control system 20 for a door 21 may include a lock assembly 30 carried by the door. The door 21 may be an interior door, exterior door, overhead garage door, a door to a structure, overhead door, sliding door, screen door, revolving door, for example, a home or business, or any other door that separates an area where protection of that area may be desirable.

The lock assembly 30 may be considered a smart lock and illustratively includes a lock 31 switchable between a locked position and an unlocked position, lock wireless communications circuitry 32, and a door position determining device 34. The lock 31 may be cylinder lock, a deadbolt, or other type of lock, as will be appreciated by those skilled in the art. In some embodiments, the lock 31 may accept a physical key, for example, for manual or key operation of the lock. The lock assembly 30 is illustratively exposed on both the interior and exterior of the door 21. It should be understood that the term interior may refer to the side of the door 21 that faces an area desirable of protection or secured space. For example, where the lock assembly 30 is carried by a door of a home, the interior side 41 is the side within the home, while the exterior side 42 is outside the home and may be accessible to people other than the home's inhabitants.

The lock wireless communications circuitry 32 may be configured to communicate via one or more a short range wireless communications protocols, for example, Bluetooth, NFC, WLAN, or other communications protocols. The lock wireless communications circuitry 32 may also communicate via a long range communication protocol, for example, cellular, or global positioning system, or other long range communication protocol. The lock wireless communications circuitry 32 may communicate using either or both of one or more short and long range protocols, as will be appreciated by those skilled in the art.

The lock assembly 30 also illustratively includes a door position determining device 34. The door position determining device 34 may include an accelerometer, for example. The door position determining device 34 may also include a magnetometer. In some embodiments, the door position determining device 34 may include both an accelerometer and a magnetometer, or other and/or additional devices, sensors, or circuitry configured sense a position of the door 21. For example, the door position determining device 34 may determine when the door 21 has been opened and/or closed, moved, stationary, etc. A pattern of movement of the door 21 can be determined, for example, opened and then closed, closed then opened, based upon the door position determining device 34.

The lock assembly 30 also illustratively includes a touch sensor 35 on the exterior of the lock assembly 30 to sense touching by a user 36. The touch sensor 35 may be a capacitive touch sensor, for example, and when the lock 31 includes a key hole, may be positioned around the key hole. The touch sensor 35 may be positioned elsewhere on the lock assembly 30. More than one touch sensor 35 may be used. For example, in some embodiments, the lock assembly 30 may include an interior touch sensor and an exterior touch sensor. Other types of touch sensors may also be used. For example, the touch sensor 35 may not necessarily sense touching directly from a user, but rather touching using an intervening object that may be an extension of the user. The lock 31 may be switched between the locked and unlocked positions based upon the touch sensor 35. For example, the user 22 may lock the door 21 by touching the touch sensor 35. Of course, as will be explained in further detail below, other pre-requisite events may have to occur prior to switching the lock 31. In some embodiments, the touch sensor 35 may be replaced with another sensor, for example, a proximity sensor to sense when the user is within a relatively small distance from the lock assembly 30 (e.g., less than 12 inches), an access card reader, a FOB reader, or other circuitry to sense a user within a relatively small distance from the lock assembly 30 or door 21.

The wireless access control system 20 also illustratively includes a remote access device 50 remote from the lock assembly 30. The remote access device 50 includes a remote access device controller 51 and remote access wireless communications circuitry 52 coupled to the remote access device controller 51. The remote access device controller 51 and the remote access device wireless communications circuitry 52 cooperate to communicate with the lock wireless communications circuitry 32. For example, the remote access device controller 51 and the remote access device wireless communications circuitry 52 cooperate to communicate access commands, location information, authentication information, and/or other information for communicating with and controlling operation of the lock 31, and/or other devices that may be included in the wireless access control system 20, as will be appreciated by those skilled in the art. Similar to the lock wireless communication circuitry 32, the remote access device wireless communications circuitry 52 may communicate using one or both of short range and long range communications protocols.

The remote access device 50 may be in the form of a fob or keychain, and may include housing 54 carrying a battery for powering the remote access device controller 51 and wireless communications circuitry 52, and at least one input device 53 carried by the housing and coupled to the remote access device controller 51. In other embodiments, the remote access device 50 may be a cellular telephone, tablet PC, or any other portable wireless communications device. The lock assembly 30 further includes a lock controller 36 coupled to lock 31, the lock wireless communications circuitry 32, the door position determining device 34, and the touch sensor 35.

Figure 3:
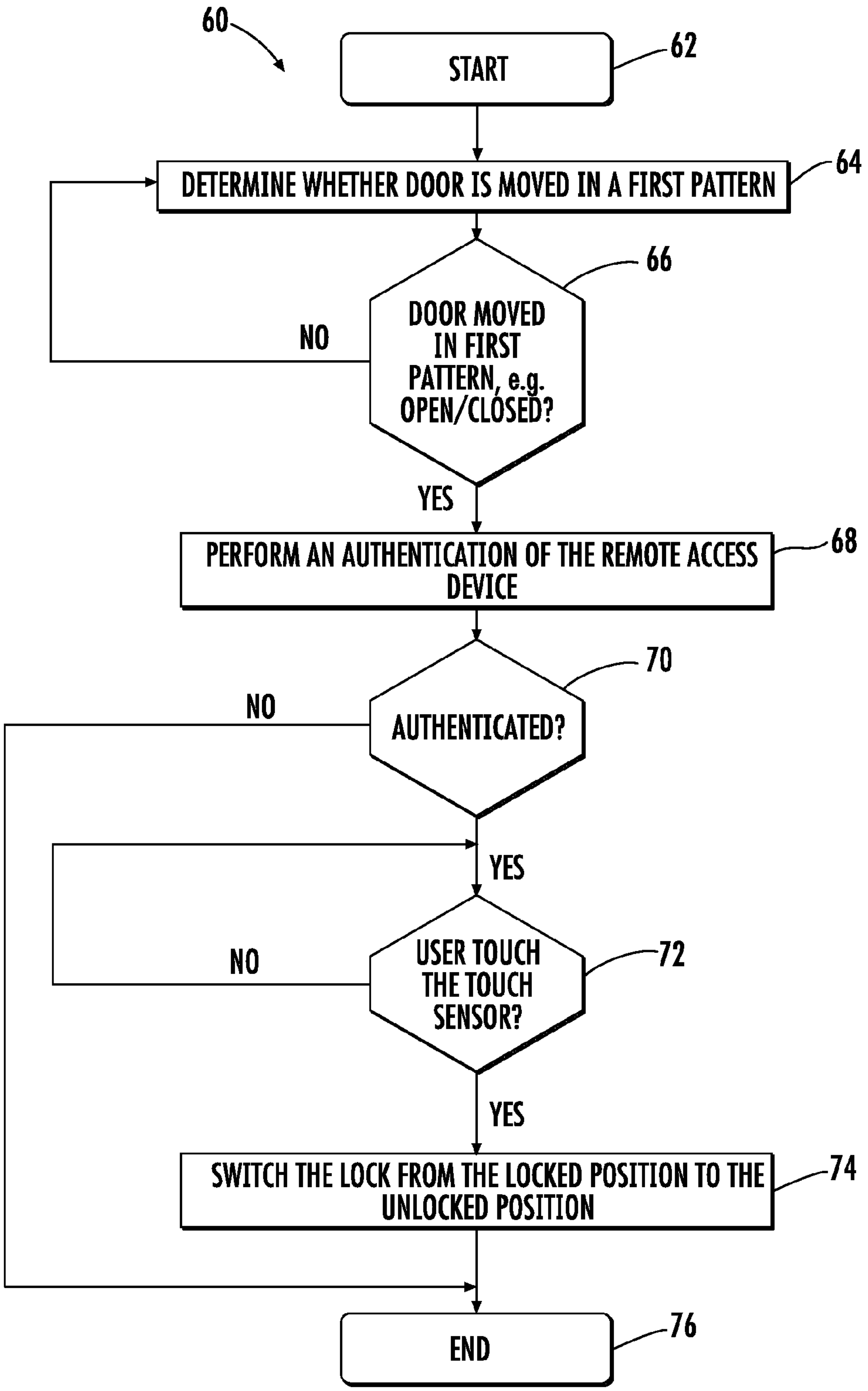
FIG. 3 is a flowchart illustrating operation of the wireless access control system of FIG. 1.

Referring now additionally to the flowchart 60 in FIG. 3, beginning at Block 62, operation of the wireless access control system 20 will also be described. The lock controller 36 is configured to determine when the door is moved in a pattern based upon the door position determining device 34 (Block 64). For example, the pattern may be a door opening followed by a door closing.

The lock controller 36 is further configured to perform an authentication of the remote access device 50, via the lock wireless communications circuitry 32 and the remote access wireless communications circuitry 52 (Block 68), when the door 21 is moved in the pattern (Block 66). More particularly, where the pattern is a door opening followed by a door closing pattern, the lock controller 36 determines that the door 21 has been opened and within a short time period, closed. This may be indicative of the user entering or leaving a home for example. Based upon the door 21 opening followed by the door closing, the lock controller 36 communicates with the remote access device 50 to determine whether the remote access device is authenticated or has the proper credentials to operate the lock 31. The lock controller 36 may communicate with the remote access device 50 by scanning for in-range remote access devices, initiating a connection with one or more of the remote access devices, and determine whether or not a given remote access device is authorized to access the lock 31 at that time.

For example, the remote access device 50 may have a unique identification (ID) associated therewith that is communicated to the lock assembly. The lock controller 36 compares the unique ID of the remote access device 50 to remote access device IDs stored in a memory 33 coupled to the lock controller. If the unique ID of the remote access device 50 matches an ID in the memory 33, the remote access device may be considered authenticated. Of course, there may be other and/or additional factors that may affect whether the remote access device 50 is authenticated, for example, is within an authorized time period.

Figure 4:
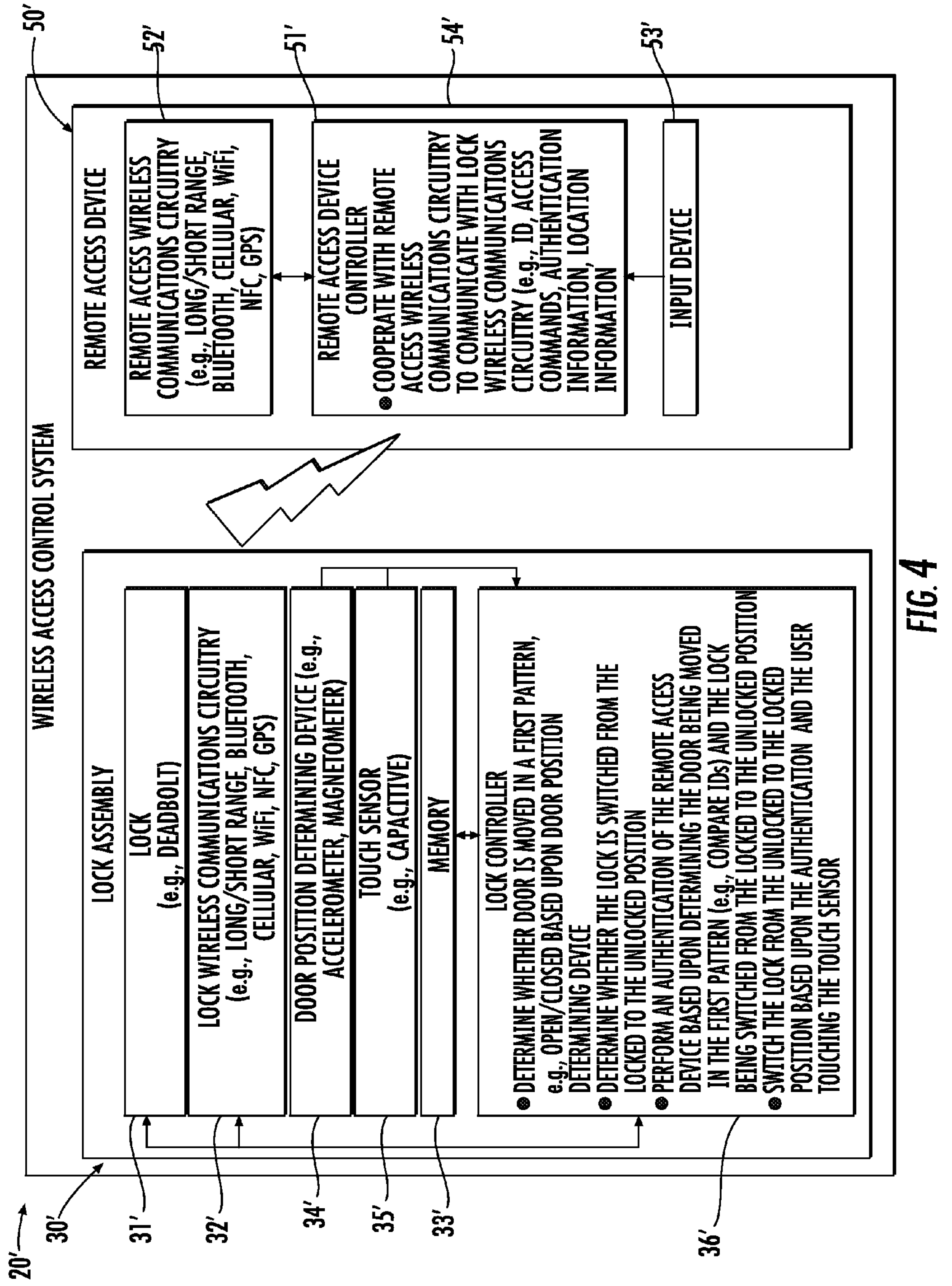
FIG. 4 is a schematic block diagram of a wireless access control system in accordance with another embodiment of the present invention.

Referring briefly to FIG. 4, in an embodiment, the lock controller 36' may also determine whether the lock 31' is switched, for example, manually, from the locked position to the unlocked position, for example, from the interior 41', and perform the authentication of the remote access device 50' also based upon determining the lock is switched from the locked position to the unlocked position. The opening and closing of the door 21' and (for example, preceding) the manual unlock of the door may be typical patterns for the user 22' attempting to leave his/her secure space.

Referring again to FIGS. 1-3, if the remote access device 50 is authenticated (Block 70), the lock controller 36 switches the lock 31 from the unlocked position (Block 74) to the locked position when the user touches the touch sensor 35 (Block 72). The method ends at Block 76 and also ends if the authentication fails.

As will be appreciated by those skilled in the art, any delay that would typically result for authenticating a remote access device 50 based upon the user 22 touching the touch sensor 35 would be reduced as the authentication of the remote access device had already completed or at least already begun by the time the user touches the touch sensor. The switching of the lock 31 from the unlocked to the locked position may appear near instantaneous to the user 22. It should be understood that this near instantaneous locking of the door 21 occurs when the lock controller 36 has reason to believe the user 22 is about to lock the lock 31. For example, if the user 22 touches the touch sensor 35 and thereafter opens and closes the door 21, the lock controller 35 performs an authentication, and in this case, the lock controller recognizes that the user 22 had approached outside of the door from inside, accessed the lock, and is leaving the secure space.

Figure 5:
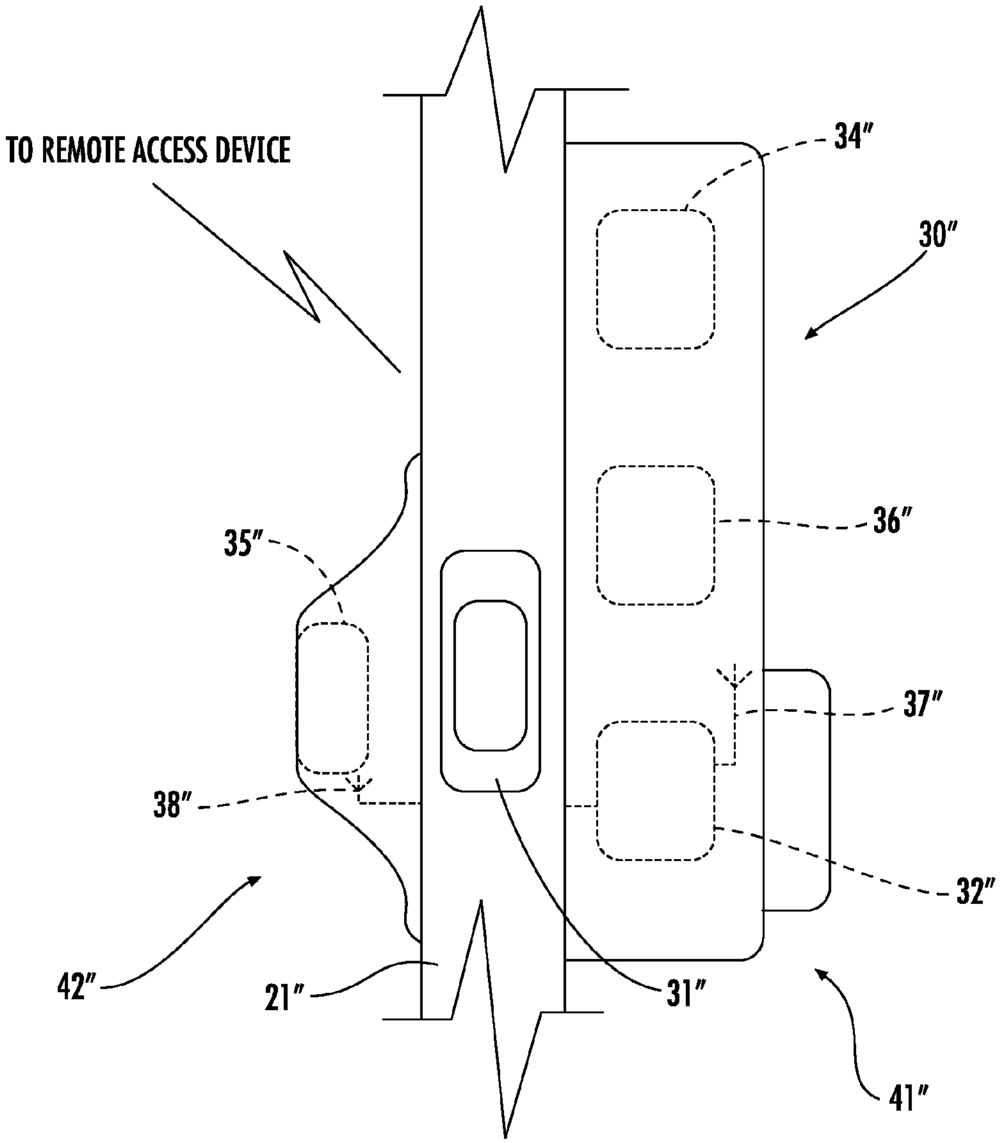
FIG. 5 is an enlarged side schematic view of lock assembly carried by a door in accordance with an embodiment of the present invention.
Figure 6:
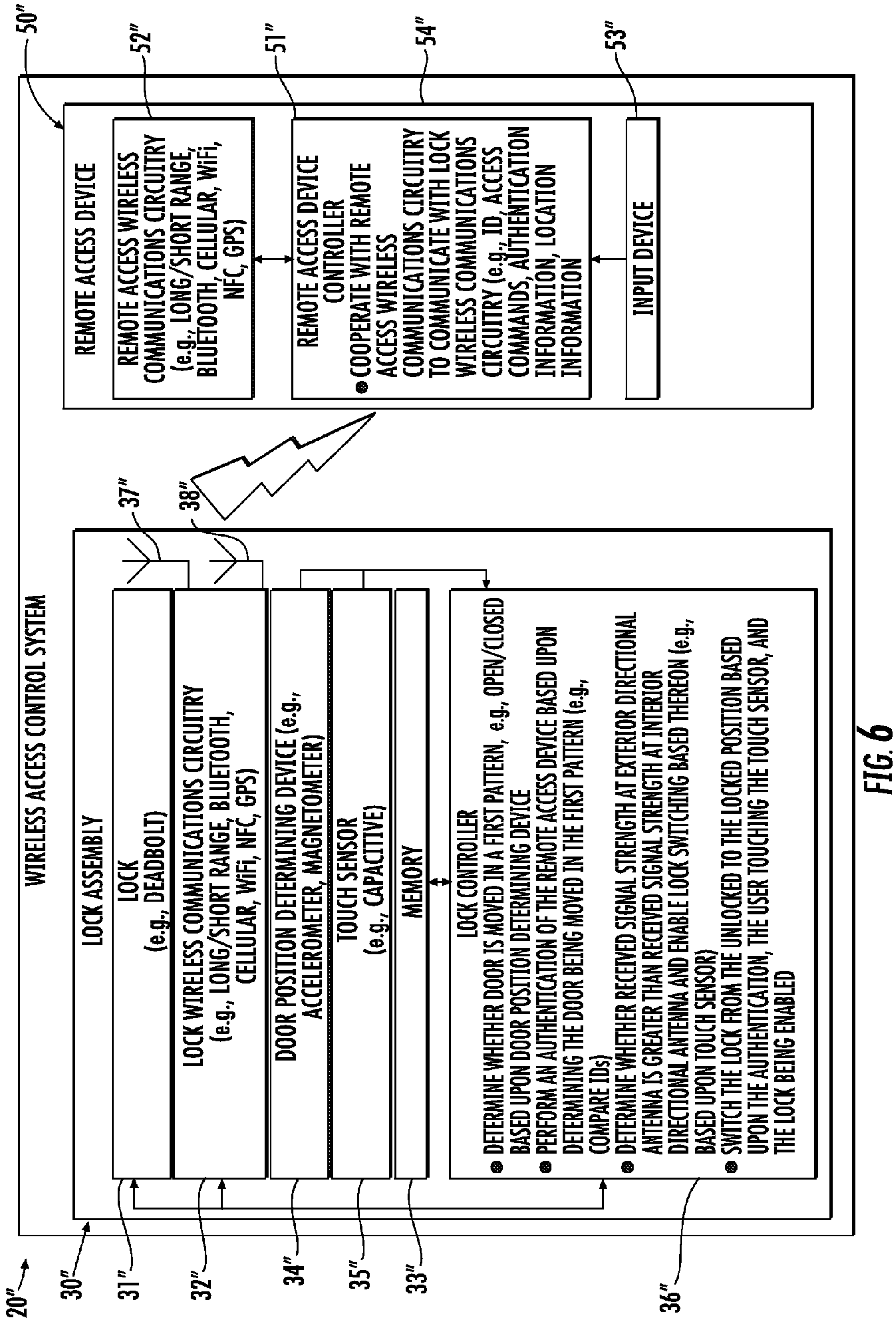
FIG. 6 is a schematic block diagram of a wireless access control system including the lock assembly of FIG. 5.
Figure 7:
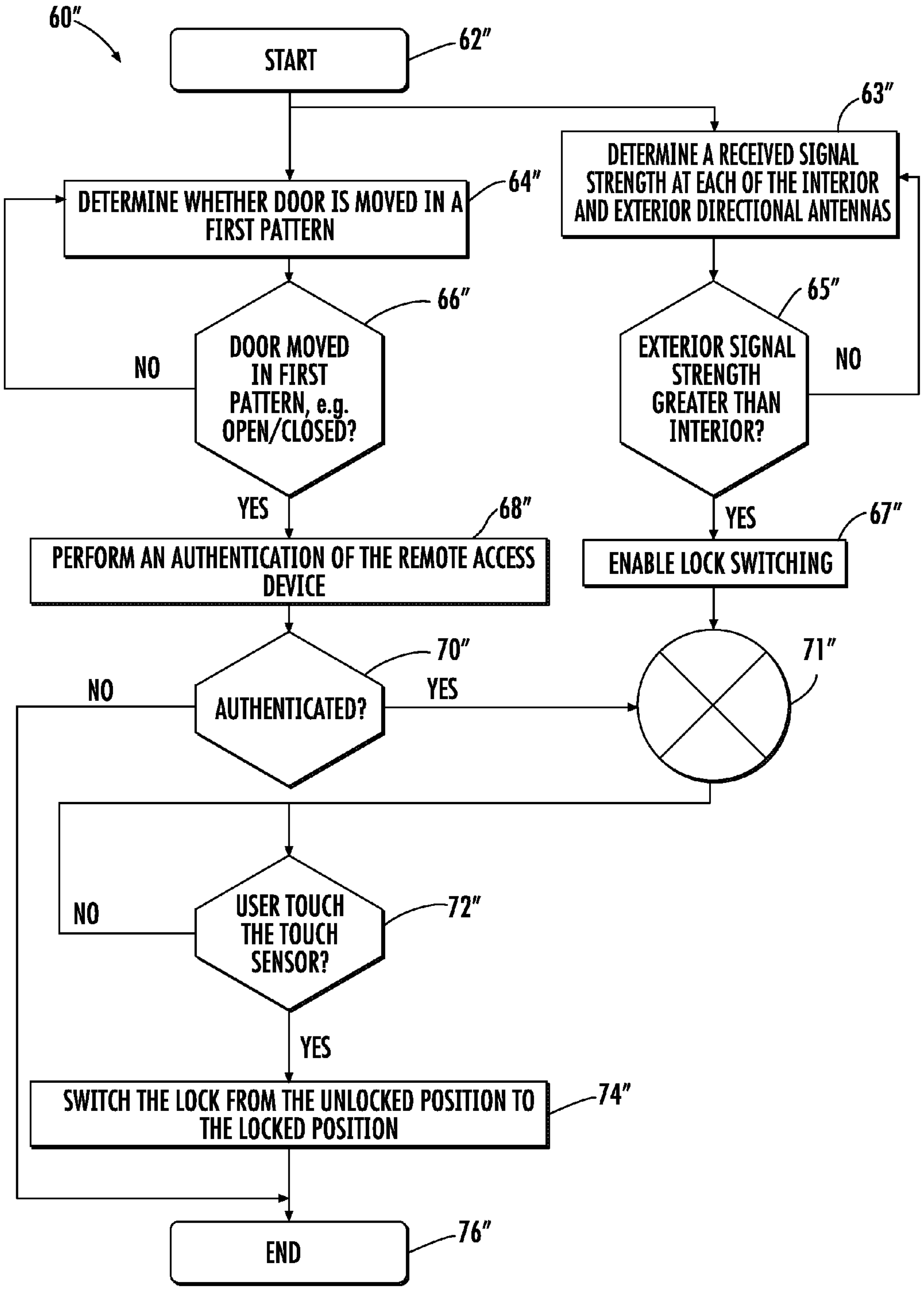
FIG. 7 is a flowchart illustrating operation of the wireless access control system of FIG. 6.

Referring now to FIGS. 5-6 and the flowchart 60" in FIG. 7, in another embodiment, the lock assembly 30" includes an interior directional antenna 37" directed toward the interior area 41", and an exterior directional antenna 38" directed toward the exterior area 42". The lock controller 36" determines a received signal strength at each of the interior and exterior directional antennas 37", 38" based upon the communication with the remote access device 50" (Block 63"). The lock controller 36" enables switching of the lock 31" from the unlocked position to the locked position (Block 67") based upon the received signal strength at the exterior directional antenna 38" being greater than the received signal strength at the interior directional antenna 37" (Block 65"). Of course, for switching, the switching is to be enabled, the user authenticated, and the user touches the touch sensor 35" (Block 71"). In some embodiments, the lock controller 36" may determine the received signal strength of communication with the remote access device 50" based upon the user touching the touch sensor 35".

In other words, even though the lock controller 36" determines that the door has opened and then closed and performs the authentication, the lock controller may not switch the lock 31" from the unlocked to the locked position based upon the touch sensor 35" (assuming the user 22" is authenticated) unless the lock controller determines that the remote access device 50" has moved outside (i.e. from the interior 41" to the exterior 42"). This may be particularly advantageous for reducing an occurrence of locking the user's key or remote access device 50" in the secured or interior area 41", for example, within the secure space. The method ends at Block 76" including if the user fails to authenticate at Block 70".

Figure 8:
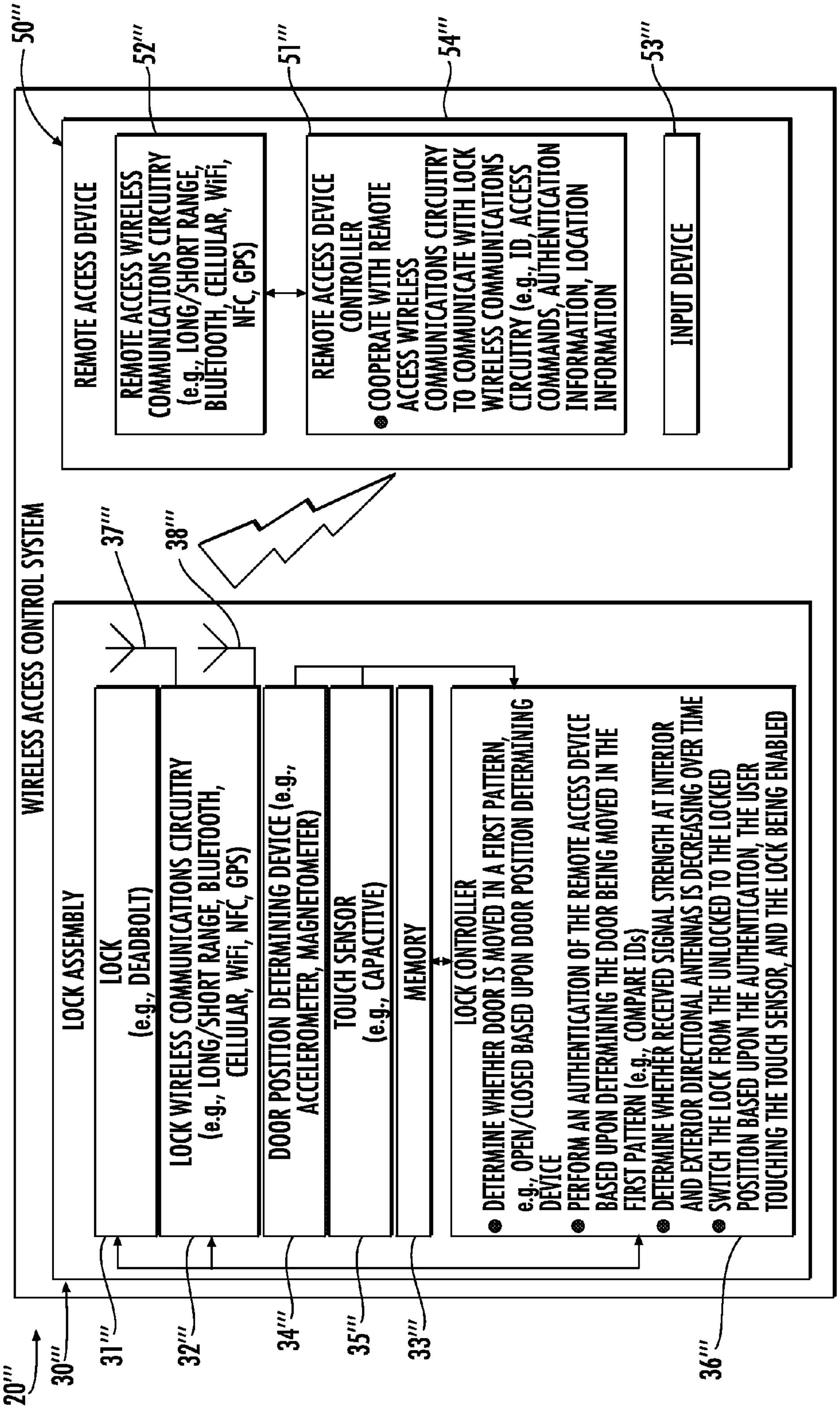
FIG. 8 is a schematic block diagram of a wireless access control system in accordance with another embodiment of the present invention.

Referring briefly to FIG. 8, in another embodiment, the lock controller 36'" may enable switching of the lock 31'" from the unlocked position to the locked position based upon the received signal strength at the interior and exterior directional antennas 37'", 38'", based upon communication with the remote access device 50'", decreasing over time. The decreasing received signal strength may be indicative of the remote access device 50'" moving away from the lock assembly 30'", for example, or leaving the secured area.

In an embodiment, the lock controller 36 may determine a false reject event. A false reject event, for example, may be a denial of access followed by the granting of access within a threshold time period, the granting of access being to the remote access device 50 that had been previously denied. Based upon the false reject rate determination, the lock controller may calculate a success rate for each user. If a user has an associated success rate that falls below a threshold, for example 90%, a signal threshold from one or both of, or between the interior and exterior directional antennas may be loosened upon authentication.

Figure 9:
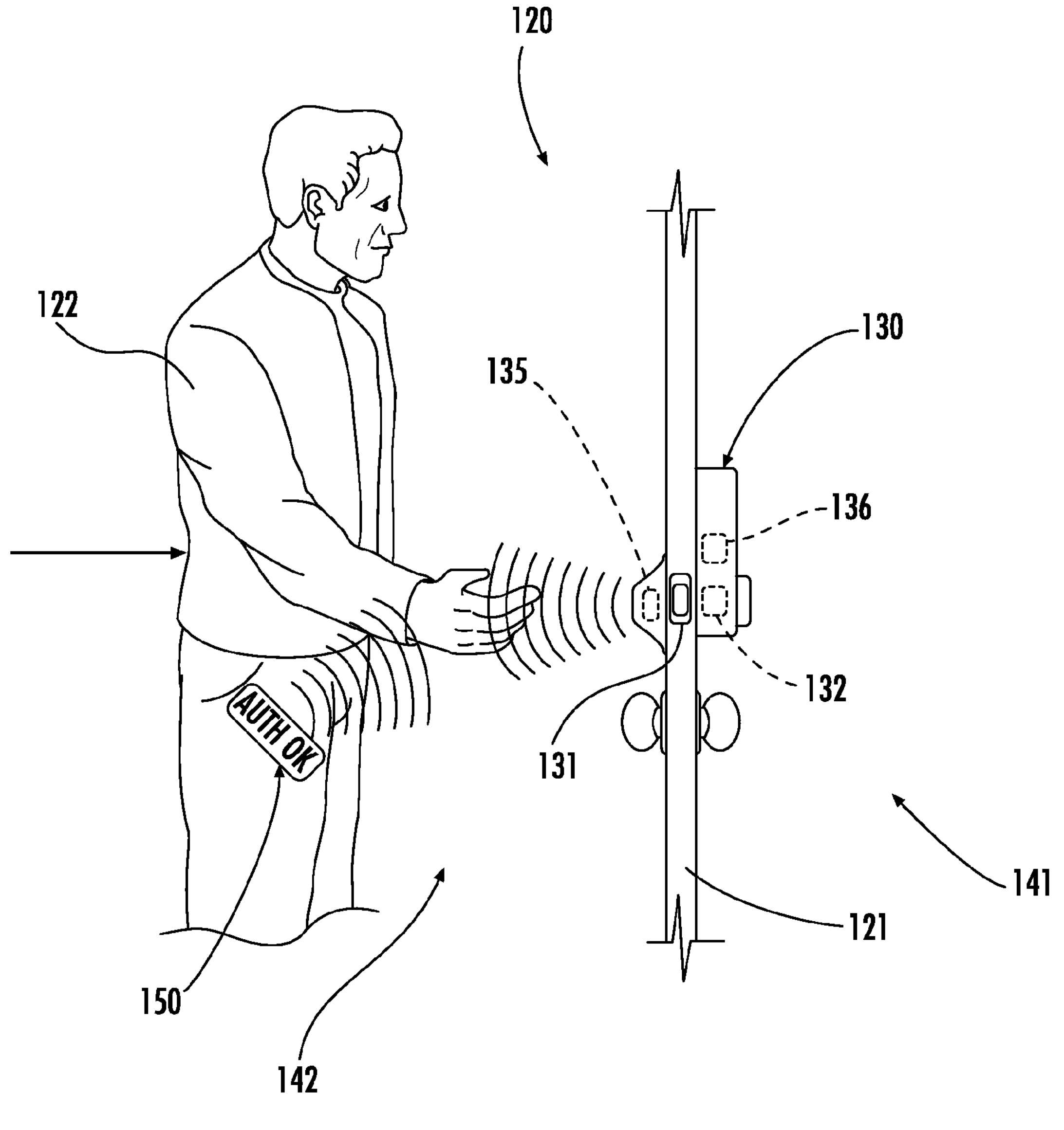
FIG. 9 is a diagram illustrating a side schematic view of a lock assembly of a wireless access control system and a remote access device of the wireless access control system carried by a user in accordance with an embodiment of the present invention.
Figure 10:
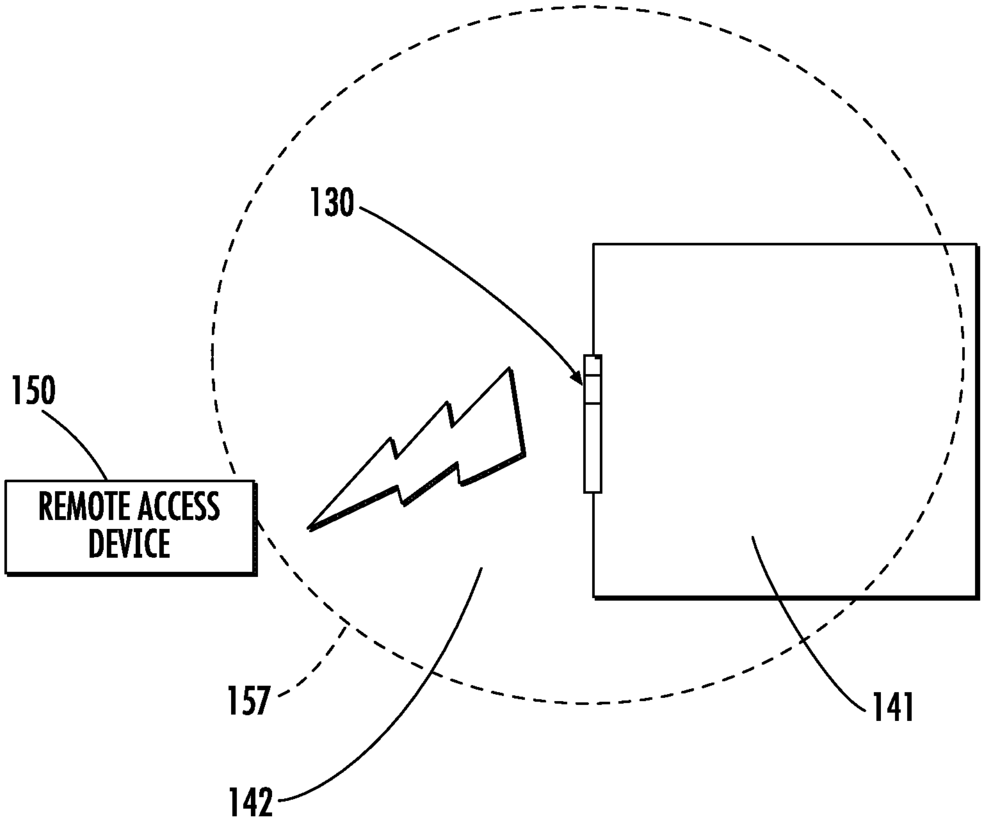
FIG. 10 is a schematic plan view of the wireless access control system of FIG. 9 illustrating an exemplary threshold distance.
Figure 11:
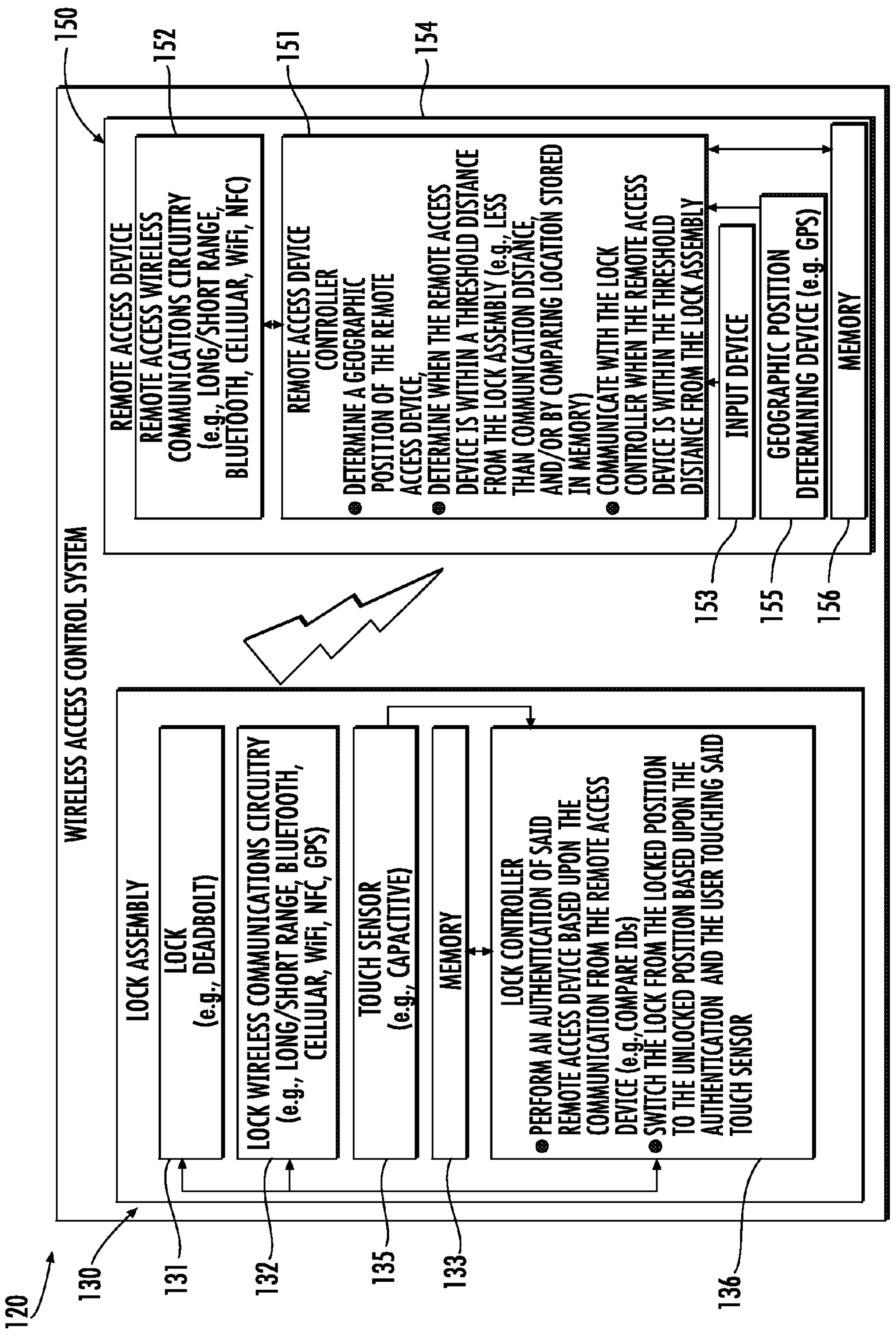
FIG. 11 is a schematic block diagram of the wireless access control system of FIG. 9.

Referring now to FIGS. 9-11, another embodiment of a wireless access control system 120 for a door 121 is illustrated. The wireless access control system 120 may include a lock assembly 130 carried by the door. The door 121 may be an interior door, exterior door, overhead garage door, a door to a structure, for example, a home or business, or any other door that separates an area where protection of that area may be desirable.

The lock assembly 130 may be considered a smart lock and illustratively includes a lock 131 switchable between an unlocked position and a locked position and lock wireless communications circuitry 132. The lock 131 may be cylinder lock, a deadbolt, or other type of lock, as will be appreciated by those skilled in the art. In some embodiments, the lock 131 may accept a physical key, for example, for manual or key operation of the lock. The lock assembly is illustratively exposed on both the interior and exterior of the door 121. It should be understood that the term interior may refer to the side of the door 121 that faces an area desirable of protection or secured space. For example, where the lock assembly 130 is carried by a door of a home, the interior side 141 is the side within the home, while the exterior side 142 is outside the home and may be accessible to people other than the home's inhabitants.

The lock wireless communications circuitry 132 may be configured to communicate via one or more a short range wireless communications protocols, for example, Bluetooth, NFC, WLAN, or other communications protocols. The lock wireless communications circuitry 132 may also communicate via a long range communication protocol, for example, cellular, or global positioning system, or other long range communication protocol. The lock wireless communications circuitry 132 may communicate using either or both of one or more short and long range protocols, as will be appreciated by those skilled in the art.

The lock assembly 130 illustratively includes a touch sensor 135 on the exterior of the lock assembly 130 to sense touching by a user 122. The touch sensor 135 may be a capacitive touch sensor, for example, and when the lock 131 includes a key hole, may be positioned around the key hole. The touch sensor 135 may be positioned elsewhere on the lock assembly 130. More than one touch sensor 135 may be used. For example, in some embodiments, the lock assembly 130 may include an interior touch sensor and an exterior touch sensor. Other types of touch sensors may also be used. The lock 131 may be switched between the locked and unlocked positions based upon the touch sensor 135. For example, the user 122 may unlock or lock the door by touching the touch sensor 135. As will be explained in further detail below, other pre-requisite events may have to occur prior to switching the lock 131.

The wireless access control system 120 also illustratively includes a remote access device 150 remote from the lock assembly 130. The remote access device 150 includes a remote access device controller 151 and remote access wireless communications circuitry 152 coupled to the remote access device controller 151. The remote access device controller 151 and the remote access device wireless communications circuitry 152 cooperate to communicate with the lock wireless communications circuitry 132. For example, the remote access device controller 151 and the remote access device wireless communications circuitry 152 cooperate to communicate access commands, location information, authentication information, and/or other information for communicating with and controlling operation of the lock 131, and/or other devices that may be included in the wireless access control system 120, as will be appreciated by those skilled in the art. Similar to the lock wireless communication circuitry 132, the remote access device wireless communications circuitry 152 may communicate using one or both of short range and long range communications protocols.

The remote access device 150 also includes a remote access device geographic position determining device 155. The remote access device geographic position determining device 155 may be a global positioning system (GPS) receiver, for example. The remote access device geographic position determining device 155 may be another type of position determining device and may use other and/or additional positioning techniques, for example, triangulation, as will be appreciated by those skilled in the art.

The remote access device also includes a memory 156 coupled to the remote access controller 151 for storing a geographical position of the lock assembly 130, for example, GPS coordinates. The geographical position of the lock assembly 130 can be stored in several different ways. For example, the geographical position of the lock assembly 130 may be stored after the lock assembly is installed and when the remote access device 150, for example, a GPS enabled mobile device, is paired with the lock. Alternatively, the remote access device 150 may wirelessly receive the geographic position of the lock assembly 130 from another remote access device, for example, a GPS based mobile device when the user associated with that remote access device operates the touch sensor 135.

The remote access device 150 may be in the form of a fob or keychain, and may include a housing 154 carrying a battery for powering the remote access device controller 151 and wireless communications circuitry 152, at least one input device 153 carried by the housing and coupled to the remote access device controller 151, and the geographic position determining device 155. In other embodiments, the remote access device 150 may be a cellular telephone, tablet PC, or any other portable wireless communications device. The lock assembly 130 further includes a lock controller 136 coupled to lock 131, the lock wireless communications circuitry 132, and the touch sensor 135.

Figure 12:
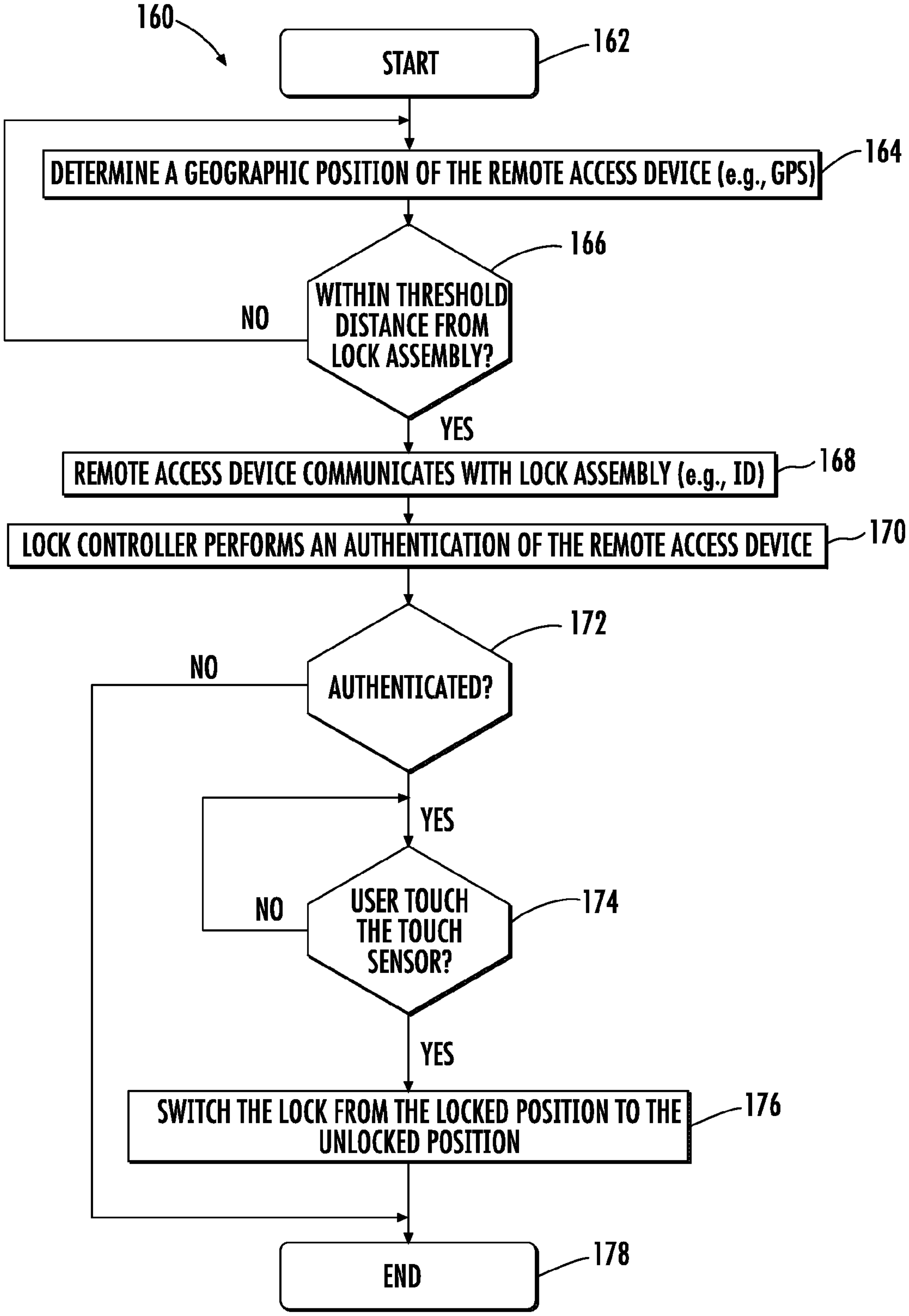
FIG. 12 is a flowchart illustrating operation of the wireless access control system of FIG. 9.

Referring now additionally to the flowchart 160 in FIG. 12, beginning at Block 162, the remote access controller 151 cooperates with the geographic position determining device 155 to determine a geographic position of the remote access device (Block 164). The remote access controller 151 determines when the remote access device is within a threshold distance 157 or geo-fence from the lock assembly (FIG. 10) (Block 166). For example, the remote access device 150 may compare its current geographical location with the geographical location of the lock assembly stored in the memory 156. The threshold distance 157 may be defined by a circular area with a constant predefined radius with the center of the circle being the GPS coordinates of the lock assembly 130. Of course, the shape of the threshold area or geo-fence may not constant or uniform. For example, the boundaries of a user's property may be determined by satellite or retrieved from a database, and the wireless access control system 120 may use the property's boundaries when establishing the threshold distance or geo-fence.

Each user 122 or remote access device 150 may have a corresponding threshold distance associated therewith, which may be different among the remote access devices. Additionally, a user 122 may change the threshold via the remote access device 150 or other application.

The threshold distance may also be less than a communication range distance with the lock assembly 130. More particularly, while the remote access device 150 may be able to communicate with the lock assembly 130, communication may not occur until the remote access device 150 is within the threshold distance.

When the remote access device 150 is within the threshold distance from the lock assembly (Block 166), the remote access device communicates with the lock controller 136, via the lock wireless communications circuitry 132 and the remote access wireless communications circuitry 152 (Block 168). For example, the remote access device 150 may communicate with the lock assembly by scanning for in-range lock assemblies, initiating a connection with the lock assembly, and determine whether or not the given remote access device is authorized to access the lock 131 at that time. The remote access device 150 may communicate a unique identification (ID) associated therewith to the lock assembly 130.

As will be appreciated by those skilled in the art, geographical information may be received from other and/or additional remote access devices or unrelated third party apps being executed on the remote access device 150, for example, when the remote access device is in the form of a smartphone. More particularly, a navigation or map application may track the user and his or her estimated time of arrival at the lock assembly 130, and based upon the tracked location of the user, cause the remote access device 150 to communicate with the lock assembly by scanning for in-range lock assemblies, initiating a connection with the lock assembly.

At Block 170, the lock controller 136 performs an authentication of the remote access device 150 based upon the communication from the remote access device. The lock controller 136 compares the unique ID of the remote access device 150 to remote access device IDs stored in a memory 133 coupled to the lock controller. If the unique ID of the remote access device 150 matches an ID in the memory 133, the remote access device may be considered authenticated. Of course, there may be other and/or additional factors that may affect whether the remote access device 150 is authenticated, for example, is within an authorized time period.

If the user 122 is authentication at Block 172, the lock controller 136 switches the lock 131 from the locked position to the unlocked position (Block 176) based upon the authentication and the user touching the touch sensor 135. The method ends at Block 178 and also ends if the authentication fails.

As will be appreciated by those skilled in the art, any delay that would typically result for authenticating a remote access device 150 based upon the user 122 touching the touch sensor 135 would be reduced as the authentication of the remote access device had already completed or at least already begun by the time the user touches the touch sensor. The switching of the lock 131 from the locked to the unlocked position may appear near instantaneous to the user 122. It should be understood that this near instantaneous unlocking of the door 121 occurs when the lock controller 136 has reason to believe the user 122 is about to unlock the lock 131 or is approaching the lock assembly 130.

Figure 13:
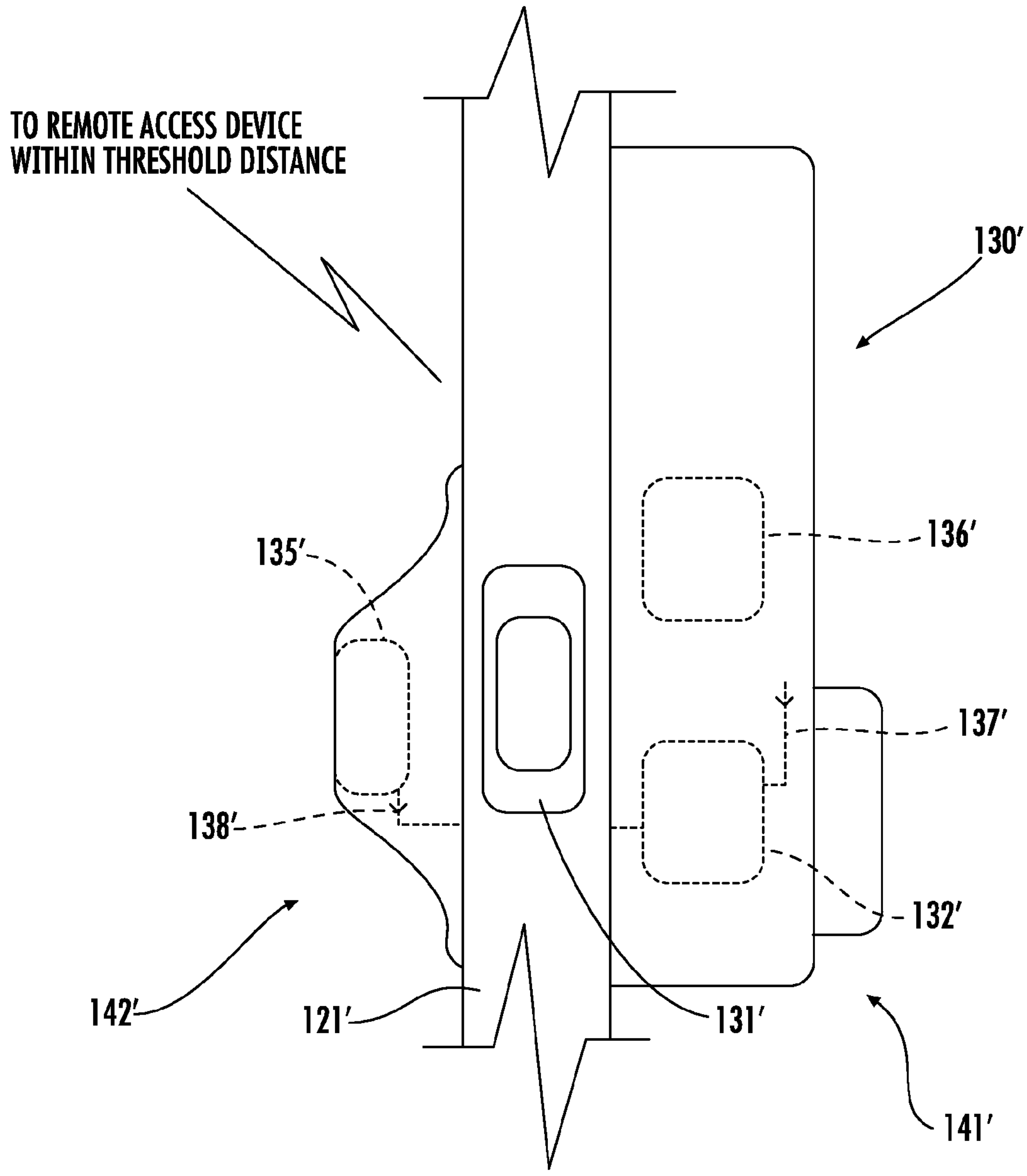
FIG. 13 is an enlarged side schematic view of lock assembly carried by a door in accordance with an embodiment of the present invention.
Figure 14:
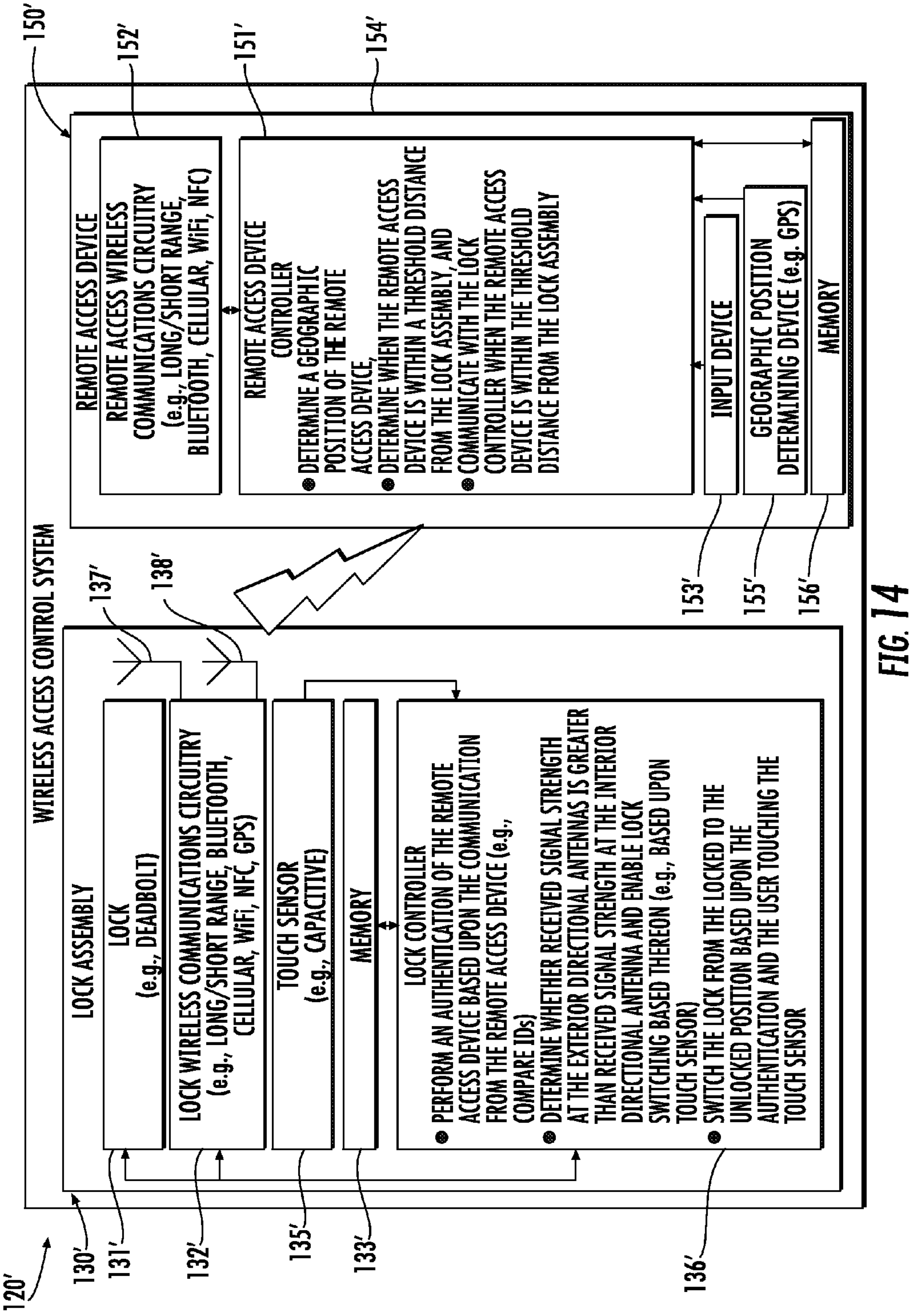
FIG. 14 is a schematic block diagram of a wireless access control system including the lock assembly of FIG. 13.
Figure 15:
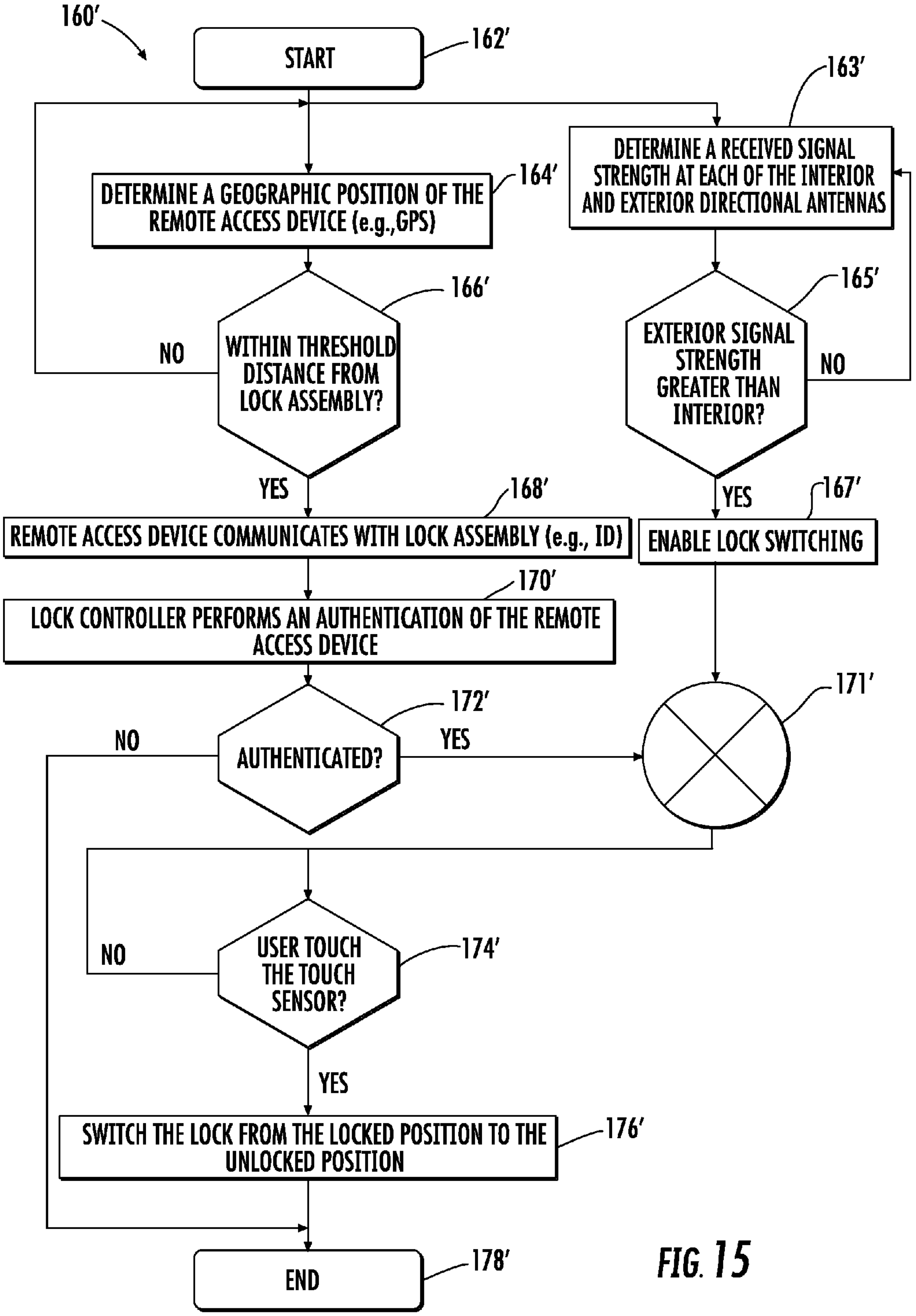
FIG. 15 is a flowchart illustrating operation of the wireless access control system of FIG. 14.

Referring now to FIGS. 13-14 and the flowchart 160' in FIG. 15, in another embodiment, the lock assembly 130' includes an interior directional antenna 137' directed toward the interior area 141', and an exterior directional antenna 138' directed toward the exterior area 142'. The lock controller 136' determines a received signal strength at each of the interior and exterior directional antennas 137', 138' based upon the communication with the remote access device 150' (Block 163'). The lock controller 136' enables switching of the lock 131' from the locked position to the unlocked position (Block 167') based upon the received signal strength at the exterior directional antenna 138' being greater than the received signal strength at the interior directional antenna 137' (Block 165'). Of course, for switching, the switching is to be enabled, the user 122' authenticated, and the user touches the touch sensor 135' (Block 171'). In some embodiments, the lock controller 136' may determine the received signal strength of communication with the remote access device 150' based upon the user touching the touch sensor 135'.

In other words, even though the remote access device 150' is within a threshold distance from the lock assembly 130', and the lock controller 136' performs the authentication, the lock controller may not switch the lock 131' from the locked to the unlocked position based upon the touch sensor 135' (assuming the user 122' is authenticated) unless the lock controller determines that the remote access device 150' is outside the secure space. The method ends at Block 178' and also ends if the user fails to authenticate.

Figure 16:
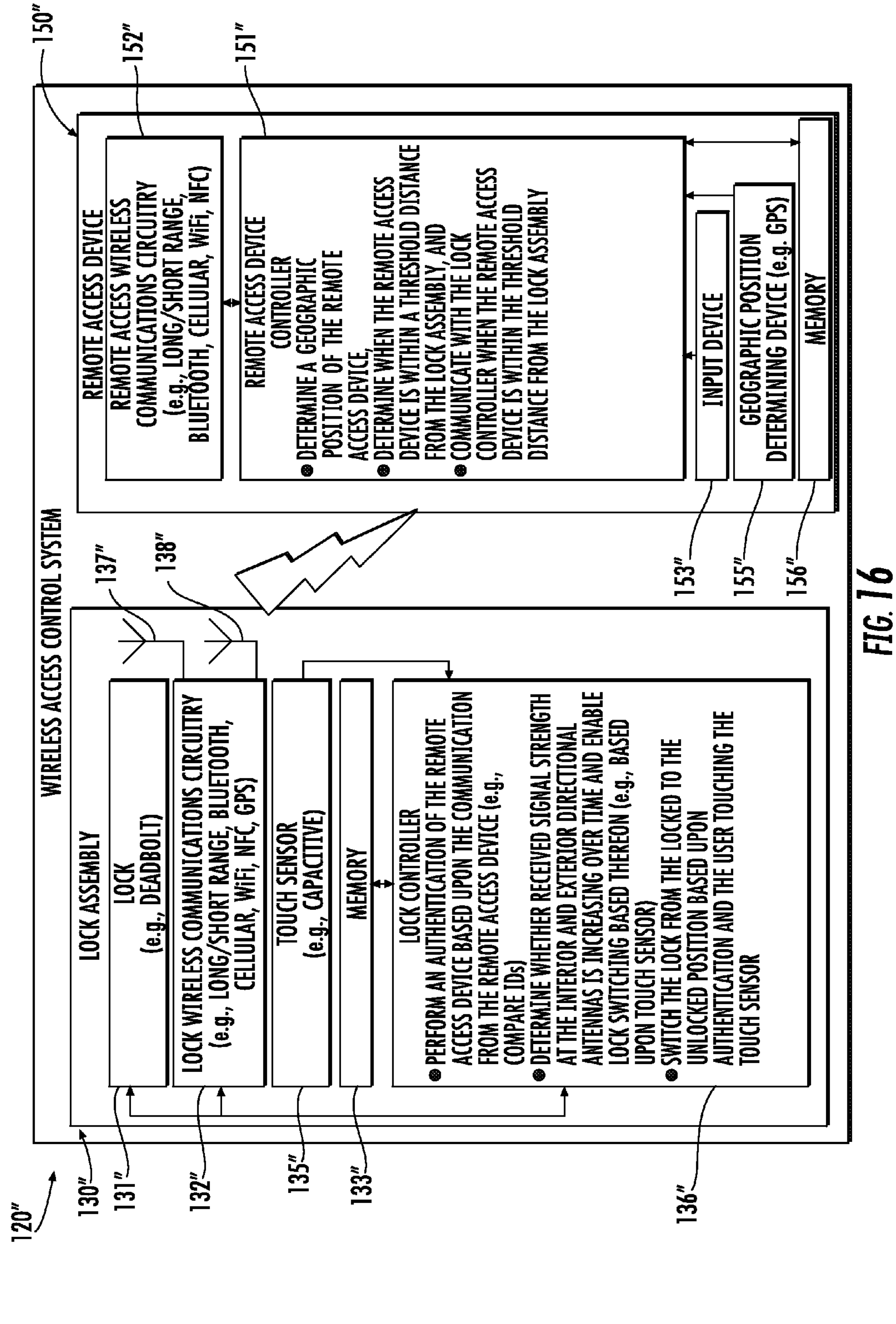
FIG. 16 is a schematic block diagram of a wireless access control system in accordance with another embodiment of the present invention.

Referring briefly to FIG. 16, in another embodiment, the lock controller 136" may enable switching of the lock 131" from the locked position to the unlocked position based upon the received signal strength at the interior and exterior directional antennas 137", 138", based upon communication with the remote access device 150", increasing over time. The increasing received signal strength may be indicative of the remote access device 150" moving toward from the lock assembly 130", for example, or arriving at the secured area.

Still further, in some embodiments, the lock controller 136 may determine an amount of time since a user's last touching of the touch sensor 135. The lock controller 136 may then, upon authentication, compare the time since last touching to a pre-authentication time frame. Based upon the comparison, for example, a signal threshold from one or both of, or between the interior and exterior directional antennas may be loosened. This may allow a user that has not accessed the lock 131 in a while to more easily access the secure or interior space.

In an example embodiment, if the user 122 has two lock assemblies 130, for example one on his front door and one on his garage door, the wireless access control system 120 may not be aware which lock assembly the user will operate for entering the secure space. In this example, the remote access device 150 may alternatingly communicate with, and be authenticated with each of the in-range lock assemblies. After the lock assembly 130 authenticates the user, including determining whether the user is authorized to access the secure space during the desired time period, the lock assembly may store the unique ID of the remote access device, or the remote access device may store the unique ID of the lock assembly. In either case, a time expiration may be associated with the stored unique ID such that after a predetermined time period, the stored unique ID is removed from the memory, and thus the authentication or credential expires.

In yet another embodiment, the remote access device controller 151 may determine whether the remote access device 150 is within first and second threshold distances from the lock assembly 130. The lock controller 136 may perform an authentication after the remote access device 150 is within the first and second threshold distances from the lock assembly. This may be particularly advantageous, for example, where the user 122 walks his/her dog around the neighborhood but does not necessarily wish to switch the lock 131 to the unlocked position upon returning home. In this specific case, the user 122 would have exited the smaller one of the first and second threshold distances (i.e. the inner geo-fence), but not the larger one of the first and second threshold distances (i.e., the outer geo-fence). Thus, the lock controller 136 would not perform the authentication of the remote access device 150, for example, upon reentering the smaller or inner threshold distance or geo-fence.

As will be appreciated by those skilled in the art, in another exemplary scenario, the wireless access control system 120 may be particularly advantageous to a user who has arrived home and is desirous of switching the lock 131 to the unlocked position, and accidentally switches the lock to the locked position. This may be addressed relatively easily. For example, if the lock 131 is in the locked position, and the user is within the threshold distance, i.e., breaks his/her geo-fence, the lock controller 136 may authenticate the user 122 so that when the user touches the touch sensor 135, the lock does not switch from the locked position to the unlocked position. Instead, the lock controller 136 may illuminate a visual indicator carried by the lock assembly, for example, around the lock. The visual indicator may, for example, a light emitting diode (LED) (e.g., flash green) to indicate to the user that the lock 131 is in the unlocked position. The LED may be any color and may flash or be solid. If, for example, the user 122 actually did want to switch the lock 131 from the locked position to the unlocked position, the user may subsequently touch the touch sensor 135 to switch the lock to the unlocked position after the lock controller 136 illuminates the visual indicator.

Figure 17:
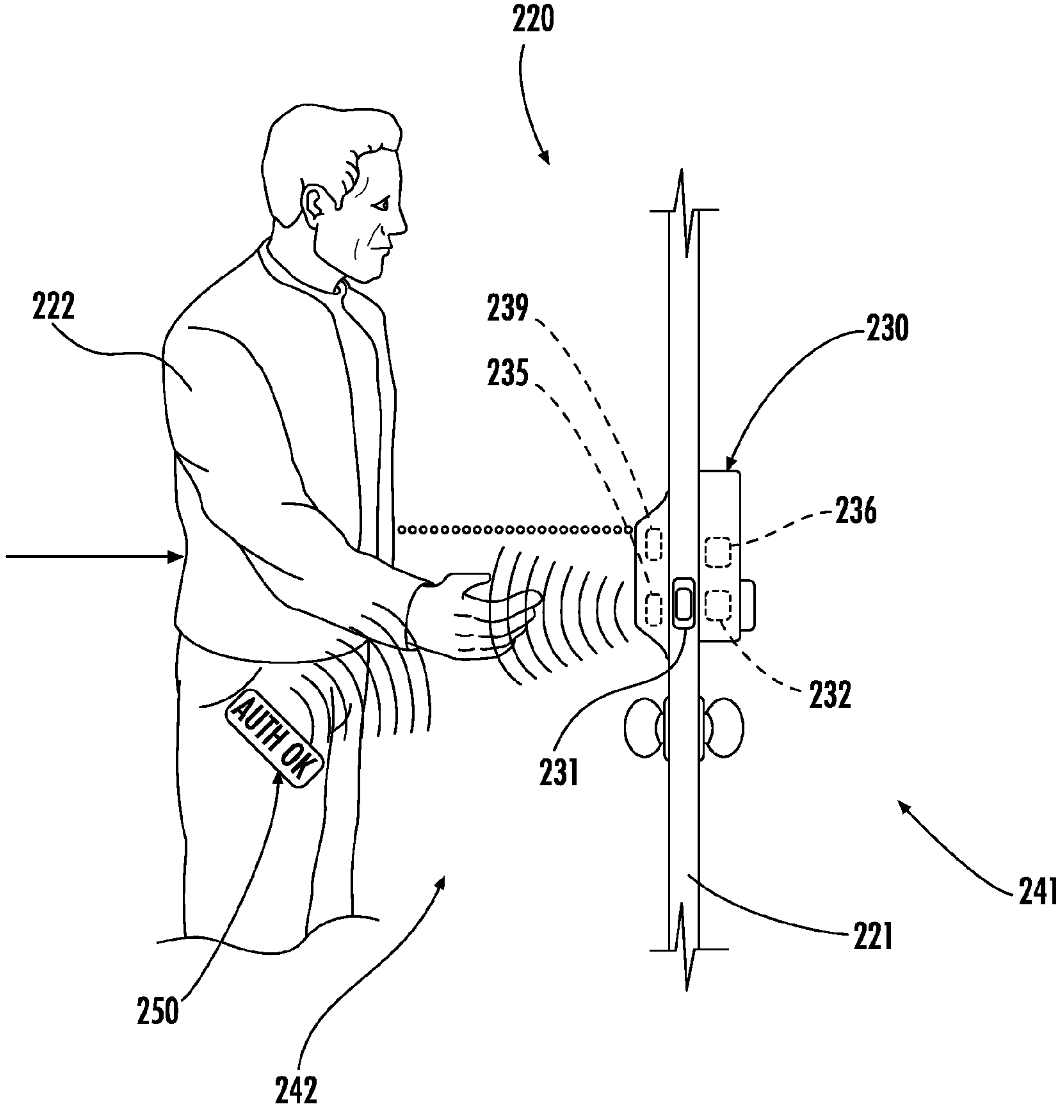
FIG. 17 is a diagram illustrating a side schematic view of a lock assembly of a wireless access control system and a remote access device of the wireless access control system carried by a user in accordance with an embodiment of the present invention.
Figure 18:
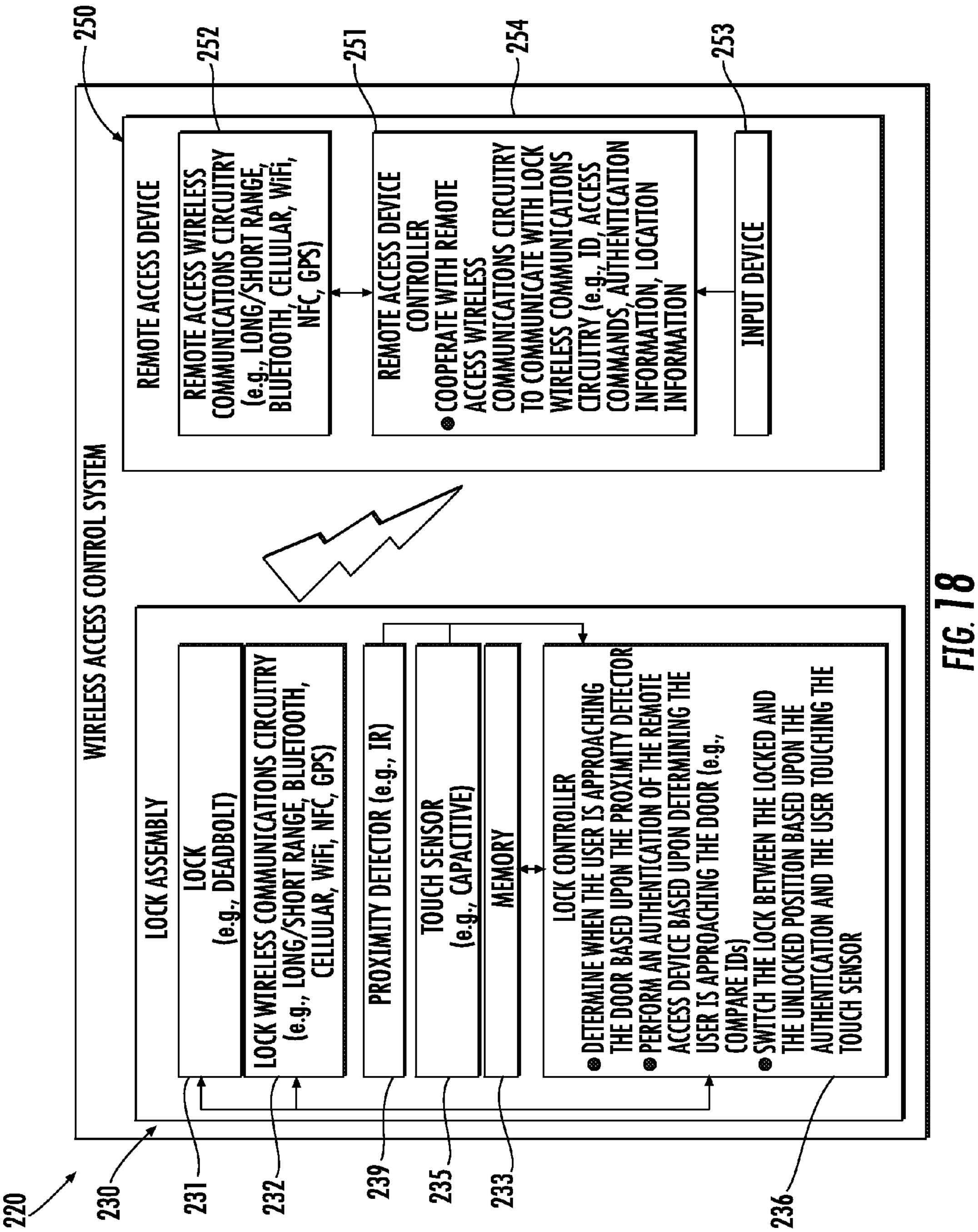
FIG. 18 is a schematic block diagram of the wireless access control system of FIG. 17.

Referring initially to FIGS. 17-18, in another embodiment, a wireless access control system 220 for a door 221 may include a lock assembly 230 carried by the door. The door 221 may be an interior door, exterior door, overhead garage door, a door to a structure, for example, a home or business, or any other door that separates an area where protection of that area may be desirable.

The lock assembly 230 may be considered a smart lock and illustratively includes a lock 231 that is switchable between a locked position and an unlocked position and lock wireless communications circuitry 232. The lock 231 may be cylinder lock, a deadbolt, or other type of lock, as will be appreciated by those skilled in the art. In some embodiments, the lock 231 may accept a physical key, for example, for manual or key operation of the lock. The lock assembly 230 is illustratively exposed on both the interior and exterior of the door 221. It should be understood that the term interior may refer to the side of the door 221 that faces an area desirable of protection or secured space. For example, where the lock assembly 230 is carried by a door of a home, the interior side 241 is the side within the home, while the exterior side 242 is outside the home and may be accessible to people other than the home's inhabitants.

The lock wireless communications circuitry 232 may be configured to communicate via one or more a short range wireless communications protocols, for example, Bluetooth, NFC, WLAN, or other communications protocols. The lock wireless communications circuitry 232 may also communicate via a long range communication protocol, for example, cellular, or global positioning system, or other long range communication protocol. The lock wireless communications circuitry 232 may communicate using either or both of one or more short and long range protocols, as will be appreciated by those skilled in the art.

The lock assembly 230 also illustratively includes a proximity detector 239. The proximity detector 239 may be an infrared proximity sensor, for example. The proximity sensor 239 may be another type of proximity detector as will be appreciated by those skilled in the art. The proximity detector 239 is illustratively facing or directed to the exterior 242 and detects the proximity of the user to the door 222, for example, the proximity of a user 222 approaching the door from the exterior. The proximity detector 239 may detect the user within a threshold distance from the door. The range of the proximity detector 239 may vary and, in some embodiments, may be adjustable.

The lock assembly 230 also illustratively includes a touch sensor 235 facing the exterior area 242 to sense touching by a user 222. The touch sensor 235 may be a capacitive touch sensor, for example, and when the lock 231 includes a key hole, may be positioned around the key hole. The touch sensor 235 may be positioned elsewhere on the lock assembly 230. More than one touch sensor 235 may be used. For example, in some embodiments, the lock assembly 230 may include an interior touch sensor and an exterior touch sensor. Other types of touch sensors may also be used. The lock 231 may be switched between the locked and unlocked positions based upon the touch sensor 235. For example, the user 222 may lock the door by touching the touch sensor 235. Of course, as will be explained in further detail below, other pre-requisite events may have to occur prior to switching the lock 231.

The wireless access control system 220 also illustratively includes a remote access device 250 remote from the lock assembly 230. The remote access device 250 includes a remote access device controller 251 and remote access wireless communications circuitry 252 coupled to the remote access device controller 251. The remote access device controller 251 and the remote access device wireless communications circuitry 252 cooperate to communicate with the lock wireless communications circuitry 232. For example, the remote access device controller 251 and the remote access device wireless communications circuitry 252 cooperate to communicate access commands, location information, authentication information, and/or other information for communicating with and controlling operation of the lock 231, and/or other devices that may be included in the wireless access control system 220, as will be appreciated by those skilled in the art. Similar to the lock wireless communication circuitry 232, the remote access device wireless communications circuitry 252 may communicate using one or both of short range and long range communications protocols.

The remote access device 250 may be in the form of a fob or keychain, and may include housing 254 carrying a battery for powering the remote access device controller 251 and wireless communications circuitry 252, and at least one input device 253 carried by the housing and coupled to the remote access device controller 251. In other embodiments, the remote access device 250 may be a cellular telephone, tablet PC, or any other portable wireless communications device. The lock assembly 230 further includes a lock controller 236 coupled to lock 231, the lock wireless communications circuitry 232, the proximity detector 239 and the touch sensor 235.

Figure 19:
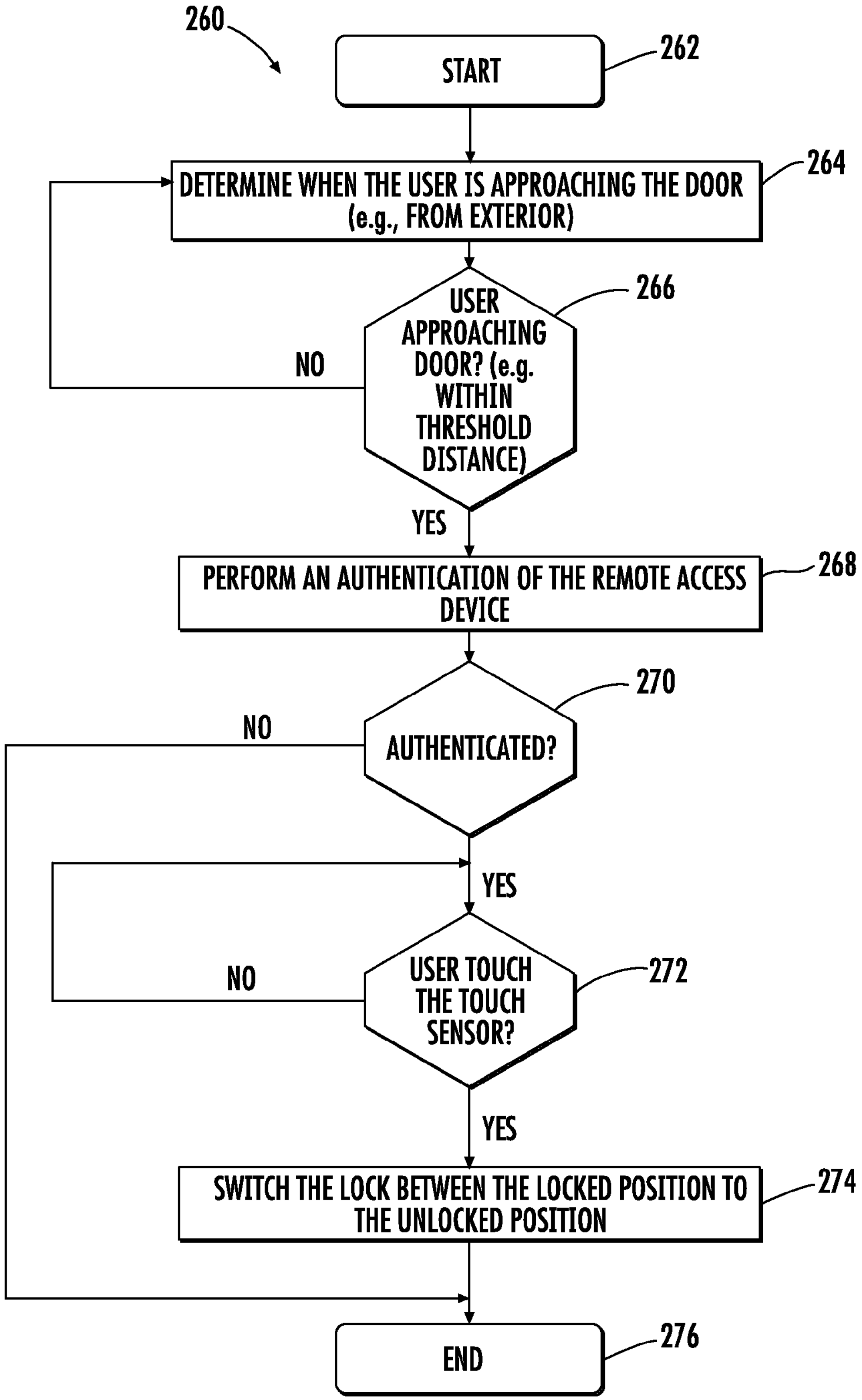
FIG. 19 is a flowchart illustrating operation of the wireless access control system of FIG. 17.

Referring now additionally to the flowchart 260 in FIG. 19, beginning at Block 262, operation of the wireless access control system will also be described. The lock controller 236 is configured to determine when the user 222 is approaching the door 221 from the exterior area 242 (Block 264) or is within the threshold distance of the door.

The lock controller 236 performs an authentication of the remote access device 250 (Block 268), via the lock wireless communications circuitry 232 and the remote access wireless communications circuitry 252, and based upon determining the user 222 approaching the door 221 (Block 266). More particularly, where the user is within the threshold distance from the door based upon the proximity detector (e.g., and for a threshold time period), the lock controller 236 determines that the user is approaching the door 221. This may be indicative of the user entering or leaving a home for example. Based upon the user approaching the proximity detector 239, the lock controller 236 communicates with the remote access device 250 to determine whether the remote access device is authenticated or has the proper credentials to operate the lock 231 (Block 266). The lock controller 236 may communicate with the remote access device 250 by scanning for in-range remote access devices, initiating a connection with one or more of the remote access devices, and determine whether or not a given remote access device is authorized to access the lock 231 at that time.

For example, the remote access device 250 may have a unique identification (ID) associated therewith that is communicated to the lock assembly. The lock controller 236 compares the unique ID of the remote access device 250 to remote access device IDs stored in a memory 233 coupled to the lock controller. If the unique ID of the remote access device 250 matches an ID in the memory 233, the remote access device may be considered authenticated. Of course, there may be other and/or additional factors that may affect whether the remote access device 250 is authenticated, for example, is within an authorized time period.

If the remote access device 250 is authenticated (Block 270), the lock controller 236 switches the lock 231 from the locked position to the unlocked position when the user touches the touch sensor 235 (Block 272). The method ends at Block 276 or if the user fails the authentication at Block 270.

As will be appreciated by those skilled in the art, any delay that would typically result for authenticating a remote access device 250 based upon the user 222 touching the touch sensor 235 would be reduced as the authentication of the remote access device had already completed or at least already begun by the time the user touches the touch sensor. The switching of the lock 231 from the unlocked to the locked position may appear near instantaneous to the user 222. It should be understood that this near instantaneous locking of the door 221 occurs when the lock controller 236 has reason to believe the user 222 is about to unlock the lock 231. For example, if the user approaches the door 221 and thereafter touches the touch sensor 235, the lock controller 236 performs an authentication, and in this case, the lock controller recognizes that the user 222 had approached from the outside of the door, accessed the lock, and is entering the secure space. It should be understood that while the proximity detector 239 has been described as facing the exterior area 242 and with respect to unlocking the lock 231, the proximity detector may face the interior area 241 and the lock may switch from the unlocked position to the locked position.

Figure 20:
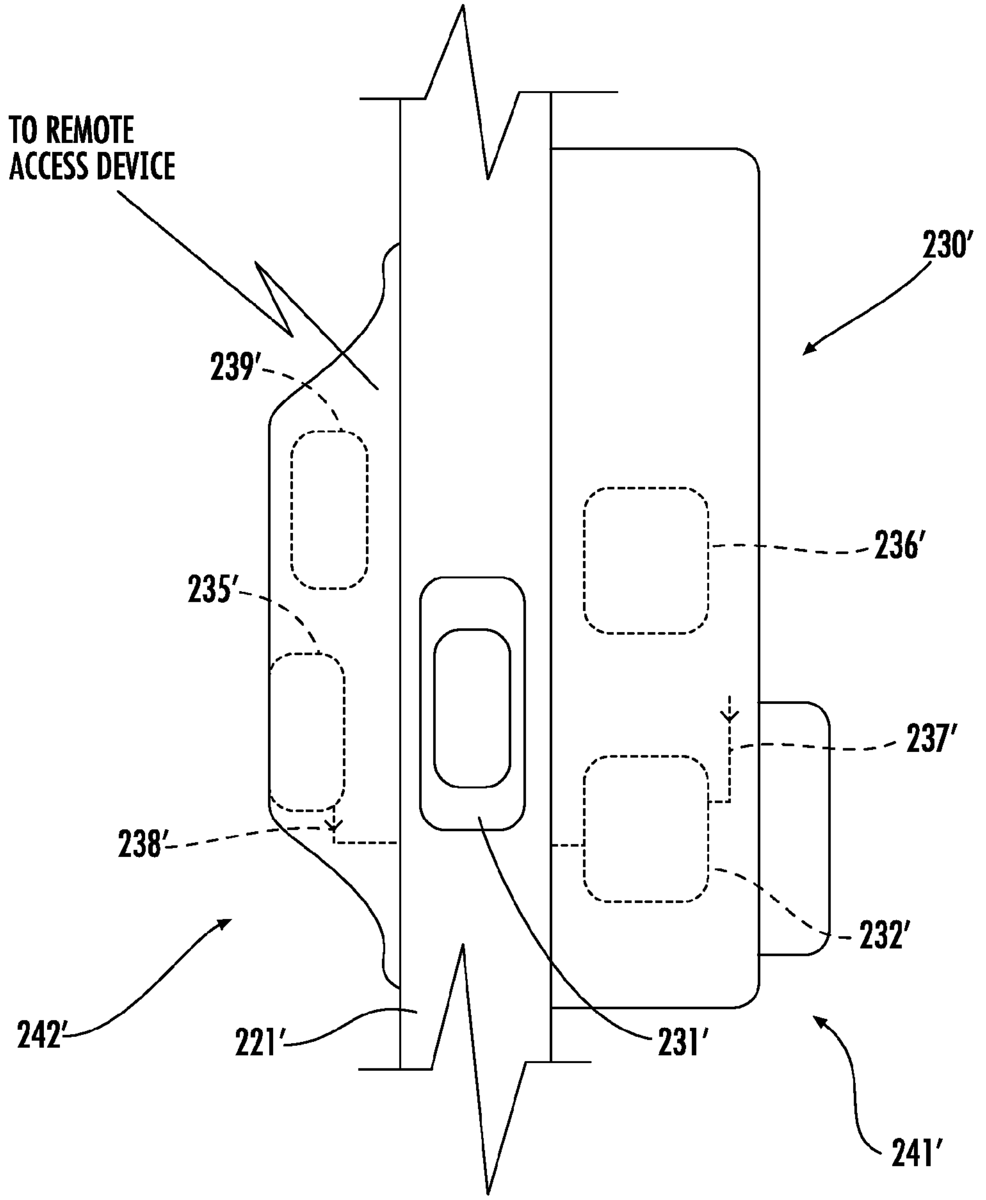
FIG. 20 is an enlarged side schematic view of lock assembly carried by a door in accordance with an embodiment of the present invention.
Figure 21:
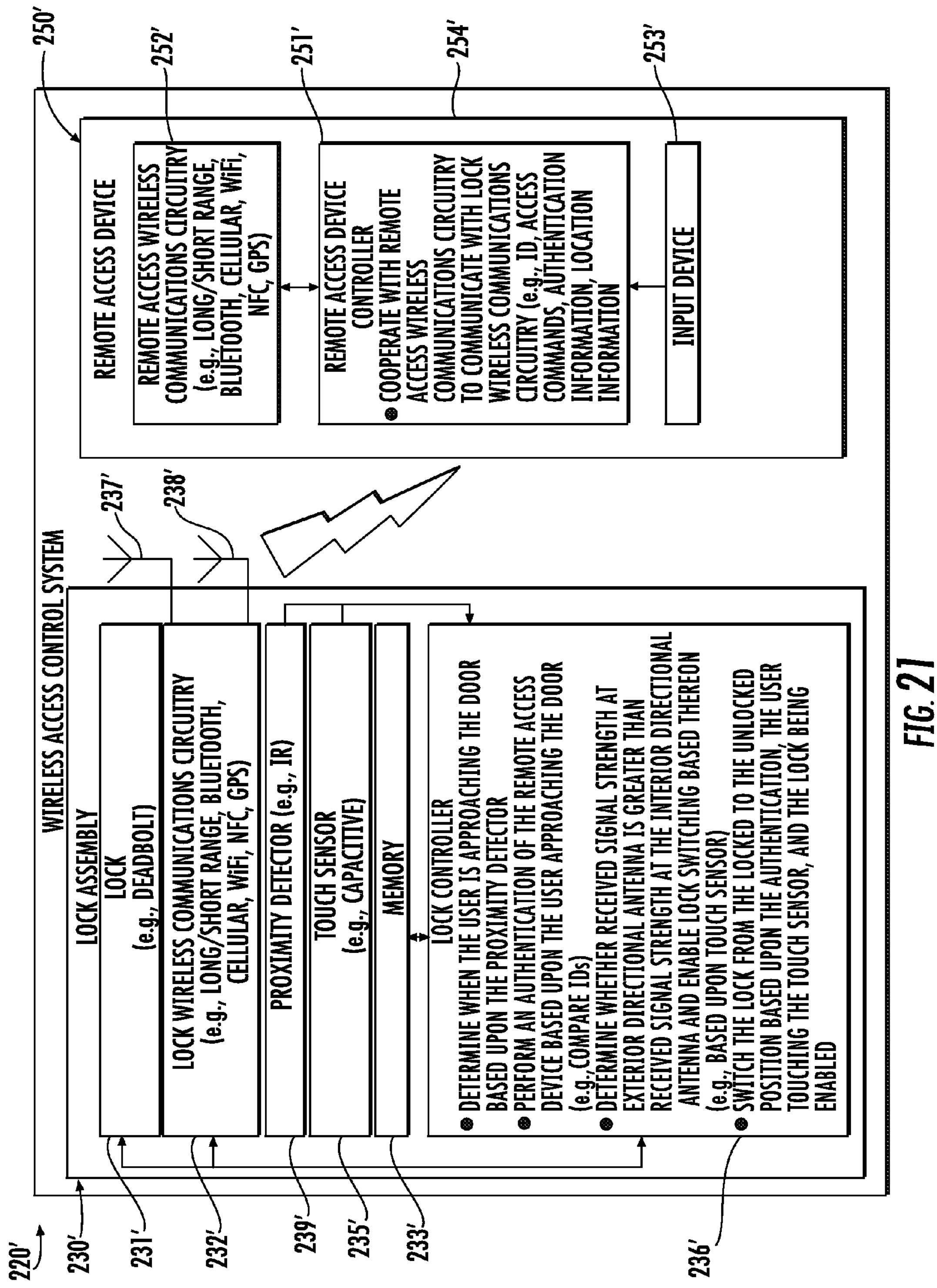
FIG. 21 is a schematic block diagram of a wireless access control system including the lock assembly of FIG. 20.
Figure 22:
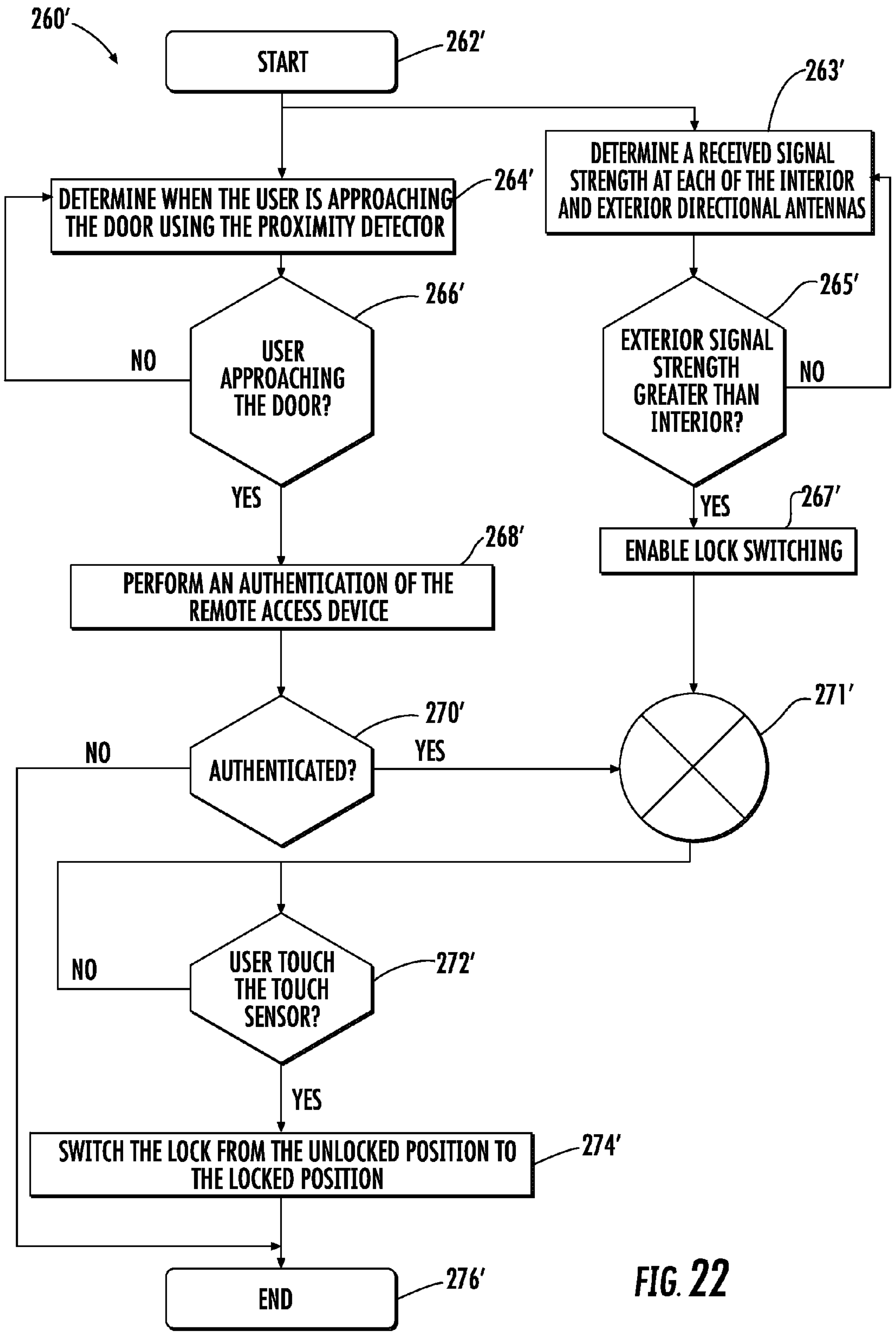
FIG. 22 is a flowchart illustrating operation of the wireless access control system of FIG. 21.

Referring now to FIGS. 20-21 and the flowchart 260' in FIG. 22, in another embodiment, the lock assembly 230' includes an interior directional antenna 237' directed toward the interior area 241', and an exterior directional antenna 238' directed toward the exterior area 242'. The lock controller 236' determines a received signal strength at each of the interior and exterior directional antennas 237', 238' based upon the communication with the remote access device 250' (Block 263'). The lock controller 236' enables switching of the lock 231' from the locked position to the unlocked position (Block 267') based upon the received signal strength at the exterior directional antenna 238' being greater than the received signal strength at the interior directional antenna 237' (Block 265'). Of course, for switching, the switching is to be enabled and the user authenticated (Block 271'). In some embodiments, the lock controller 236' may determine the received signal strength of communication with the remote access device 250' based upon the user touching the touch sensor 235'.

In other words, even though the lock controller 236' determines that the user is approaching the door 221' from the exterior and performs the authentication, the lock controller may not switch the lock 231' from the locked to the unlocked position based upon the touch sensor 235' (assuming the user 222' is authenticated) unless the lock controller determines that the remote access device 250' is actually outside (i.e. exterior area 242').

Figure 23:
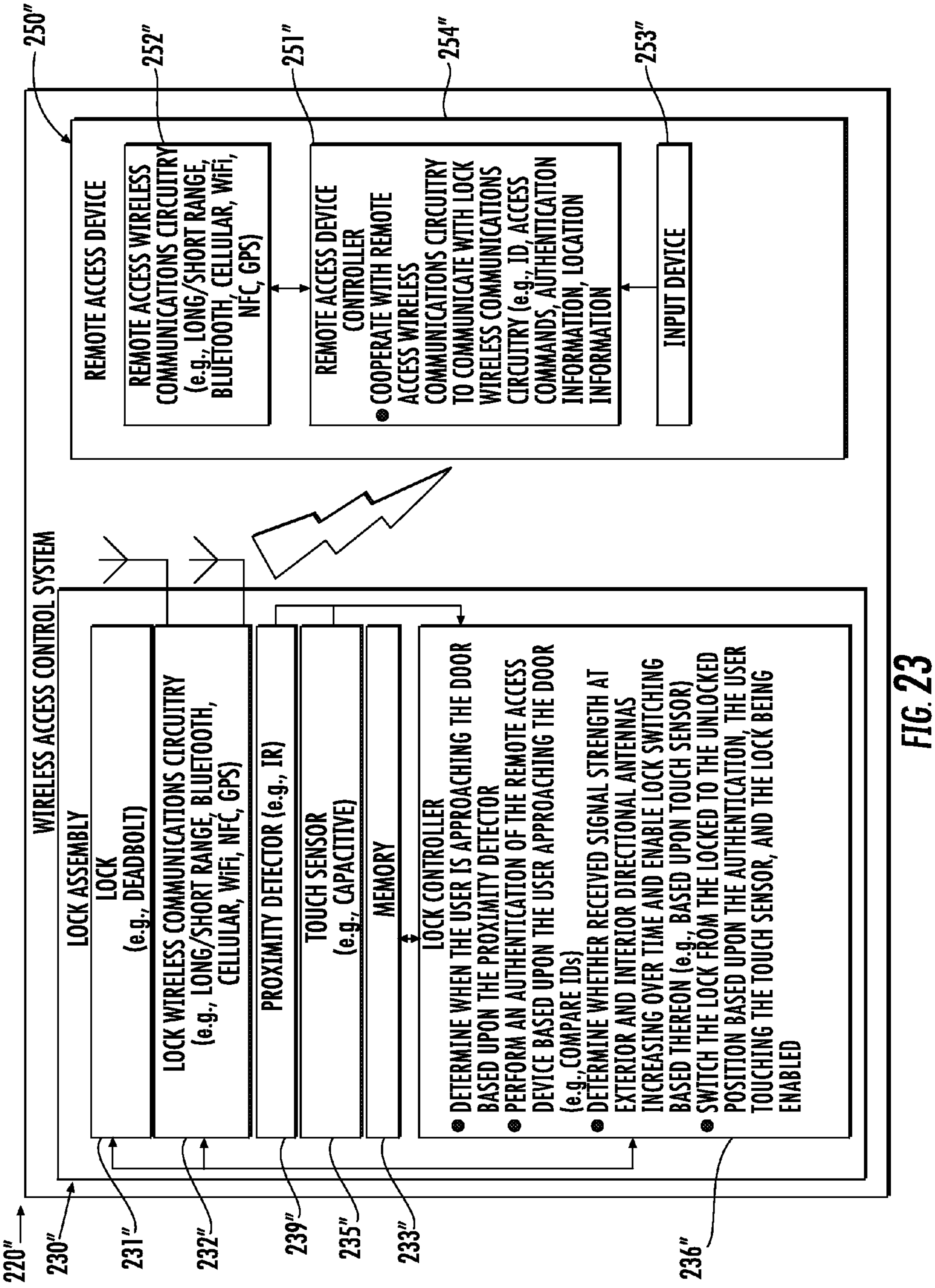
FIG. 23 is a schematic block diagram of a wireless access control system in accordance with another embodiment of the present invention.

Referring briefly to FIG. 23, in another embodiment, the lock controller 236" may enable switching of the lock 231" from the locked position to the unlocked position based upon the received signal strength at the interior and exterior directional antennas 237", 238", based upon communication with the remote access device 250", increasing over time. The increasing received signal strength may be indicative of the remote access device 250" moving toward from the lock assembly 230", for example, or approaching the secured area.

Figure 24:
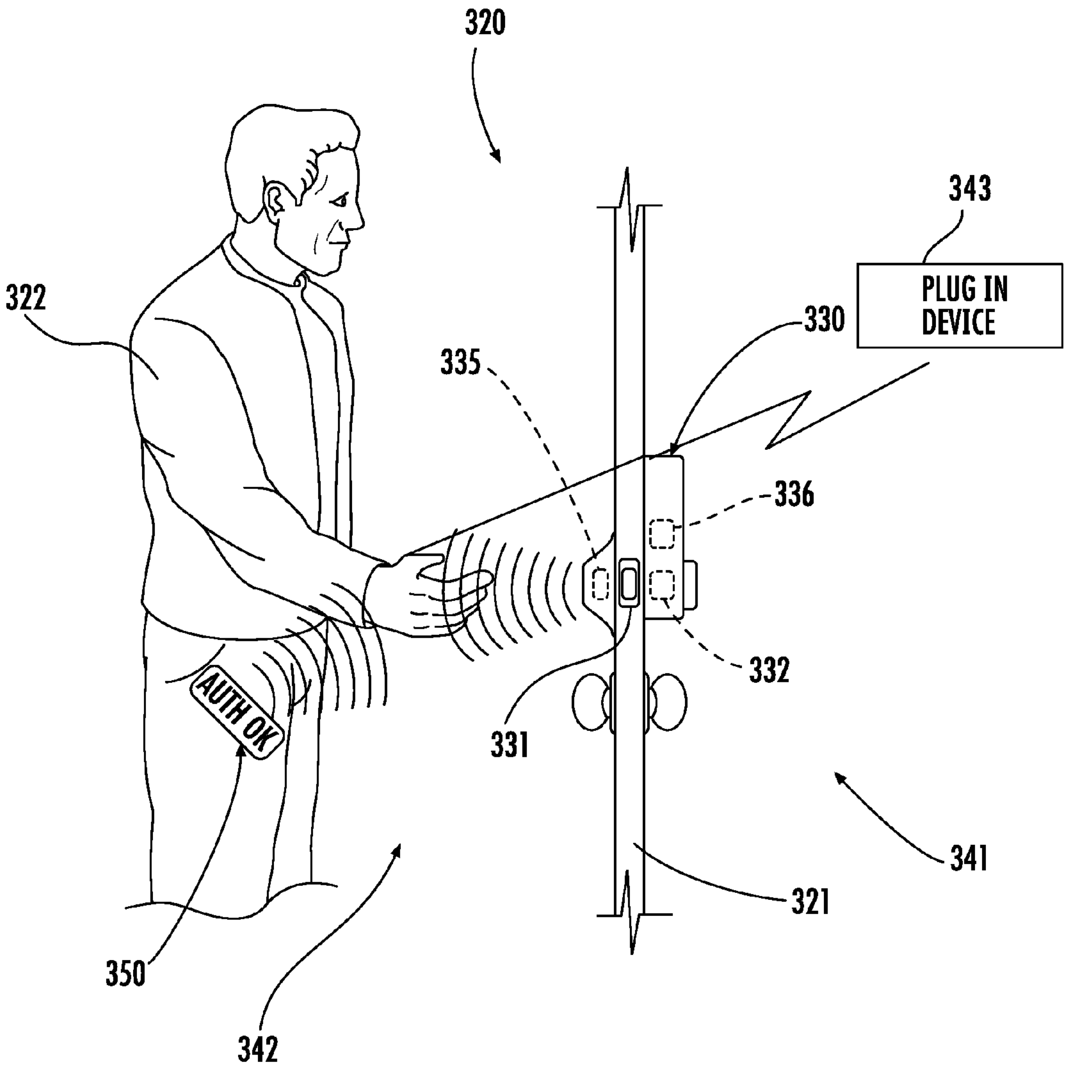
FIG. 24 is a diagram illustrating a side schematic view of a lock assembly of a wireless access control system, a plugin device of the wireless access control system, and a remote access device of the wireless access control system carried by a user in accordance with an embodiment of the present invention.
Figure 25:
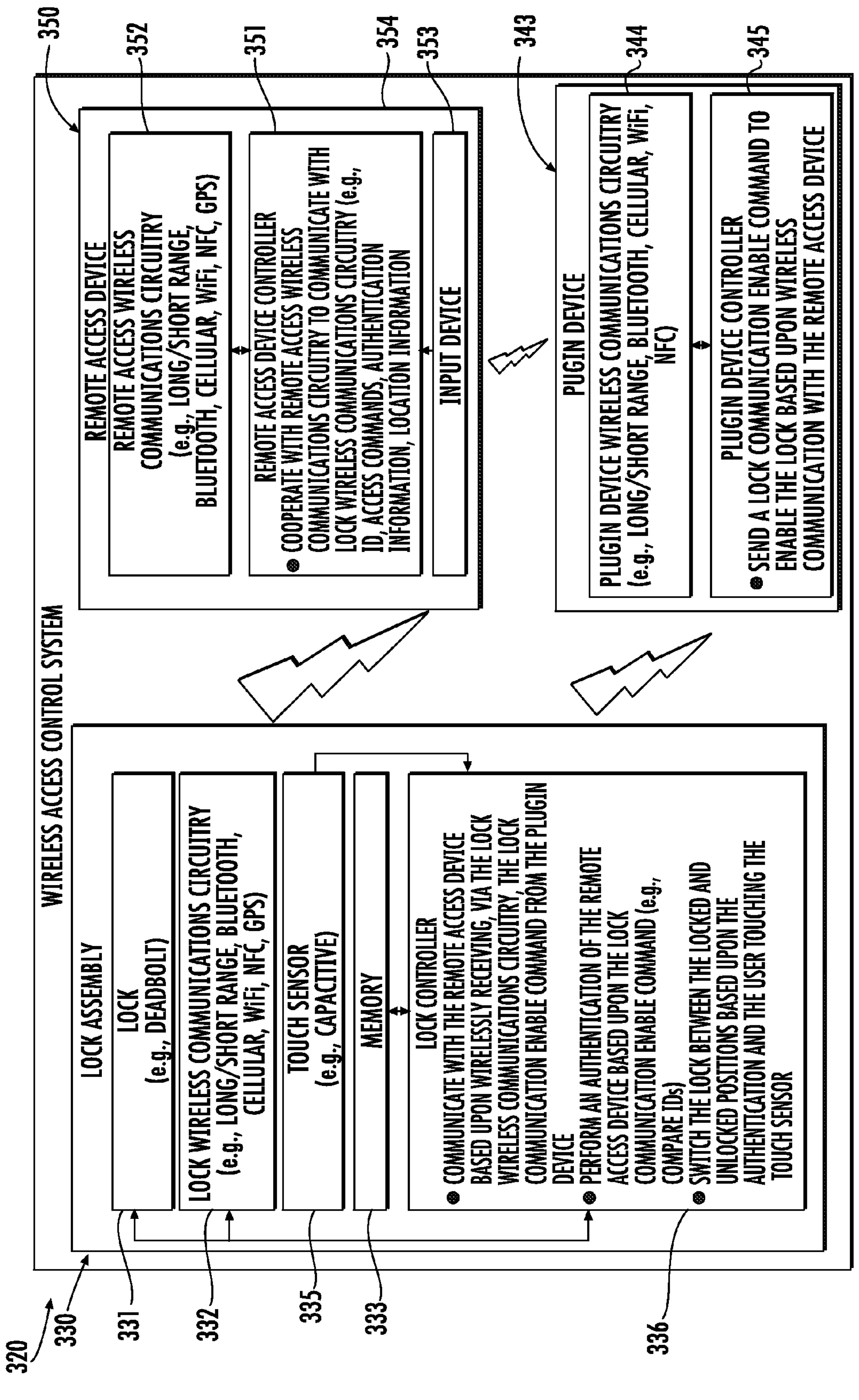
FIG. 25 is a schematic block diagram of the wireless access control system of FIG. 24.

Referring to FIGS. 24-25, in another embodiment a wireless access control system 320 for a door 321 may include a lock assembly 330 carried by the door. The door 321 may be an interior door, exterior door, overhead garage door, a door to a structure, for example, a home or business, or any other door that separates an area where protection of that area may be desirable.

The lock assembly 330 may be considered a smart lock and illustratively includes a lock 331 that is switchable between a locked position and an unlocked position and lock wireless communications circuitry 332. The lock 331 may be cylinder lock, a deadbolt, or other type of lock, as will be appreciated by those skilled in the art. In some embodiments, the lock 331 may accept a physical key, for example, for manual or key operation of the lock. The lock assembly 330 is illustratively exposed on both the interior and exterior of the door 321. It should be understood that the term interior may refer to the side of the door 321 that faces an area desirable of protection or secured space. For example, where the lock assembly 330 is carried by a door of a home, the interior side 41 is the side within the home, while the exterior side 342 is outside the home and may be accessible to people other than the home's inhabitants.

The lock wireless communications circuitry 332 may be configured to communicate via one or more a short range wireless communications protocols, for example, Bluetooth, NFC, WLAN, or other communications protocols. The lock wireless communications circuitry 332 may also communicate via a long range communication protocol, for example, cellular, or global positioning system, or other long range communication protocol. The lock wireless communications circuitry 32 may communicate using either or both of one or more short and long range protocols, as will be appreciated by those skilled in the art.

The lock assembly 330 also illustratively includes a touch sensor 335 on the exterior of the lock assembly 330 to sense touching by a user 322. The touch sensor 335 may be a capacitive touch sensor, for example, and when the lock 331 includes a key hole, may be positioned around the key hole. The touch sensor 335 may be positioned elsewhere on the lock assembly 330. More than one touch sensor 335 may be used. For example, in some embodiments, the lock assembly 330 may include an interior touch sensor and an exterior touch sensor. Other types of touch sensors may also be used. The lock 331 may be switched between the locked and unlocked positions based upon the touch sensor 335. For example, the user 322 may unlock the door by touching the touch sensor 335. Of course, as will be explained in further detail below, other pre-requisite events may have to occur prior to switching the lock 331.

The wireless access control system 320 also illustratively includes a remote access device 350 remote from the lock assembly 330. The remote access device 350 includes a remote access device controller 351 and remote access wireless communications circuitry 352 coupled to the remote access device controller 351. The remote access device controller 351 and the remote access device wireless communications circuitry 352 cooperate to communicate with the lock wireless communications circuitry 332. For example, the remote access device controller 351 and the remote access device wireless communications circuitry 352 cooperate to communicate access commands, location information, authentication information, and/or other information for communicating with and controlling operation of the lock 331, and/or other devices that may be included in the wireless access control system 320, as will be appreciated by those skilled in the art. Similar to the lock wireless communication circuitry 332, the remote access device wireless communications circuitry 352 may communicate using one or both of short range and long range communications protocols.

The remote access device 350 may be in the form of a fob or keychain, and may include housing 354 carrying a battery for powering the remote access device controller 351 and wireless communications circuitry 352, and at least one input device 353 carried by the housing and coupled to the remote access device controller 351. In other embodiments, the remote access device 350 may be a cellular telephone, tablet PC, or any other portable wireless communications device. The lock assembly 330 further includes a lock controller 336 coupled to lock 331, the lock wireless communications circuitry 332, and the touch sensor 335.

The wireless access control system 320 also illustratively includes a plugin device 343 remote from the lock assembly 330, for example, within the secure space or interior area 341. The plugin device 343 includes plugin device wireless communications circuitry 344 and a plugin device controller 345 coupled to the plugin device wireless communications circuitry. The plugin device wireless communications circuitry 344 may be configured to communicate via one or more a short range wireless communications protocols, for example, Bluetooth, NFC, WLAN, or other communications protocols, for example, to communicate with the lock assembly 330 and/or the remote access device 350. The plugin device wireless communications circuitry 344 may also communicate via a long range communication protocol, for example, cellular or other long range communication protocol. The plugin wireless communications circuitry 344 may communicate using either or both of one or more short and long range protocols, as will be appreciated by those skilled in the art. The plugin device 343 may be powered by mains electricity, or standard household operating power, which may make the plugin capable of communicating at higher speeds and at longer distances, as power consumption concerns, for example, that may be applicable to a battery powered device such as the remote access device 350, may be less of a concern.

Generally speaking, the plugin device 343 may relay commands between the lock assembly 330 and remote access device 350, which may be connected to a network, for example, the Internet. In some embodiments, the plugin device 343 may communicate directly with the lock assembly 330. Additionally, the plugin device 343 may operate as an Internet gateway. The plugin device 343 may also include a wired communications circuitry coupled to a wired communications port, for example, an Ethernet port for coupling to a router/modem to enable Internet connectivity. Of course, Internet connectivity may be established using the plugin wireless communications circuitry, for example.

The plugin device 343, when located within a relatively close proximity to the lock assembly, for example, within 100 meters, may allow a user to use the remote access device 350 to remotely check the state (locked or unlocked) of the lock 331 and remotely change the state of the lock. In one embodiment, the user 322 can remotely access their lock 331 from a web browser by signing into their account on a web portal, website, or mobile app on the remote access device, for example.

The plugin device controller 345 is configured to send a lock communication enable command to enable the lock 331 based upon wireless communication with the remote access device 350.

Figure 26:
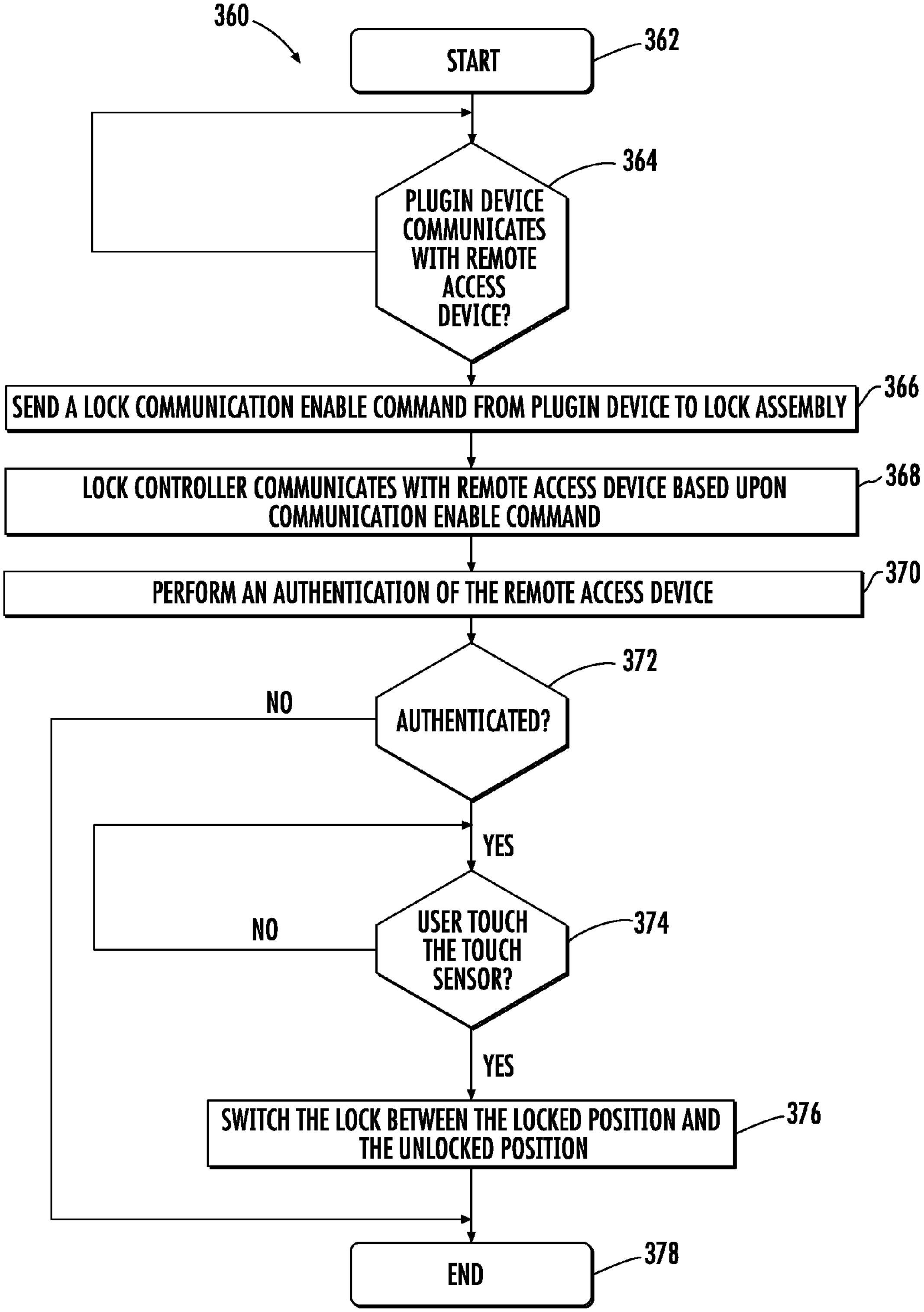
FIG. 26 is a flowchart illustrating operation of the wireless access control system of FIG. 24.

Referring now additionally to the flowchart 360 in FIG. 26, beginning at Block 362, operation of the wireless access control system will also be described. If the plugin device controller 345 communicates with or establishes communication with the remote access device 350 (Block 364), the plugin device controller wireless communications circuitry 344 cooperates with the plugin device controller 345 to wireless send a lock communication enable command to the lock assembly 330 to enable the lock 331 (i.e., to be switched between the locked and unlocked positions) (Block 366). As will be appreciated by those skilled in the art, the lock 331 may not operate, i.e. switch between locked and unlocked positions, based upon a proper authentication and touching of the touch sensor 335, for example.

The lock controller 336, at Block 368, communicates with the remote access device 350 based upon wirelessly receiving, via the lock wireless communications circuitry 332, the lock communication enable command from the plugin device 343. The lock controller 336 performs an authentication of the remote access device 350, via the lock wireless communications circuitry 332 and the remote access wireless communications circuitry 352, and based upon the lock communications enable command (Block 370). More particularly, when the remote access device 350 establishes communication with the plugin device 343, the plugin device enables the lock assembly 330, which in turn, communicates with the remote access device.

Based upon the lock communication enable command, the lock controller 336 communicates with the remote access device 350 to determine whether the remote access device is authenticated or has the proper credentials to operate the lock 331 (Block 372). The lock controller 336 may communicate with the remote access device 350 by scanning for in-range remote access devices, initiating a connection with one or more of the remote access devices, and determine whether or not a given remote access device is authorized to access the lock 331 at that time.

Further details of the cooperation between the remote access device 350, the plugin device 343, and the lock assembly 330 will now be described. The plugin device 343 may communicate in what may be referred to as a central mode, scanning for a remote access devices. Because the plugin device 343 is typically plugged into an electrical outlet at the secure space, the high power consumption associated with constantly scanning in central mode may be as much a concern as it is with a battery powered device, as noted above. When the plugin device 343 receives one or more advertisement packets from a remote access device 350, which in some embodiments constantly communicates or advertises as long it is motion, the plug device determines whether or not the remote access device is part of the system as opposed to some other device, for example, not part of the system.

If the plugin device 343 determines the remote access device 350 is authorized or part of the system, the plugin device connects to the lock assembly 330 and sends instructions to the lock assembly to begin scanning for the remote access device or devices. The plugin device 343 may discover the lock assembly 330 because prior to connecting to the plugin device, the lock assembly may be in a default low power mode. When the plugin device 343 and the lock assembly 330 connect, the plugin device effectively tells the lock assembly 330 that a remote access device 350 that belongs to the system is within range of the lock assembly. After the lock assembly 330 and the plugin device 343 drop their connection, the lock assembly enters central mode to scan for the remote access device 350, the lock assembly discovers the remote access device, the lock assembly connects to the remote access device, and the lock assembly and remote access device go through the authentication process.

The remote access device 350 may have a unique identification (ID) associated therewith that is communicated to the lock assembly 330. The lock controller 336 compares the unique ID of the remote access device 350 to remote access device IDs stored in a memory 333 coupled to the lock controller. If the unique ID of the remote access device 350 matches an ID in the memory 333, the remote access device may be considered authenticated. Of course, there may be other and/or additional factors that may affect whether the remote access device 350 is authenticated, for example, is within an authorized time period. If the remote access device 350 is authenticated (Block 372), the lock controller 336 switches the lock 331 between the locked position and the unlocked position when the user touches the touch sensor 335 (Block 374). The method ends at Block 378 or if the user authentication fails.

As will be appreciated by those skilled in the art, any delay that would typically result from authenticating a remote access device 350 based upon the user 322 touching the touch sensor 335 would be reduced as the authentication of the remote access device had already completed or at least already begun by the time the user touches the touch sensor. The switching of the lock 331 between the locked and the unlocked position may appear near instantaneous to the user 322. It should be understood that this near instantaneous unlocking of the door 321 occurs when the lock controller 336 has reason to believe the user 322 is about to unlock the lock 331.

Figure 27:
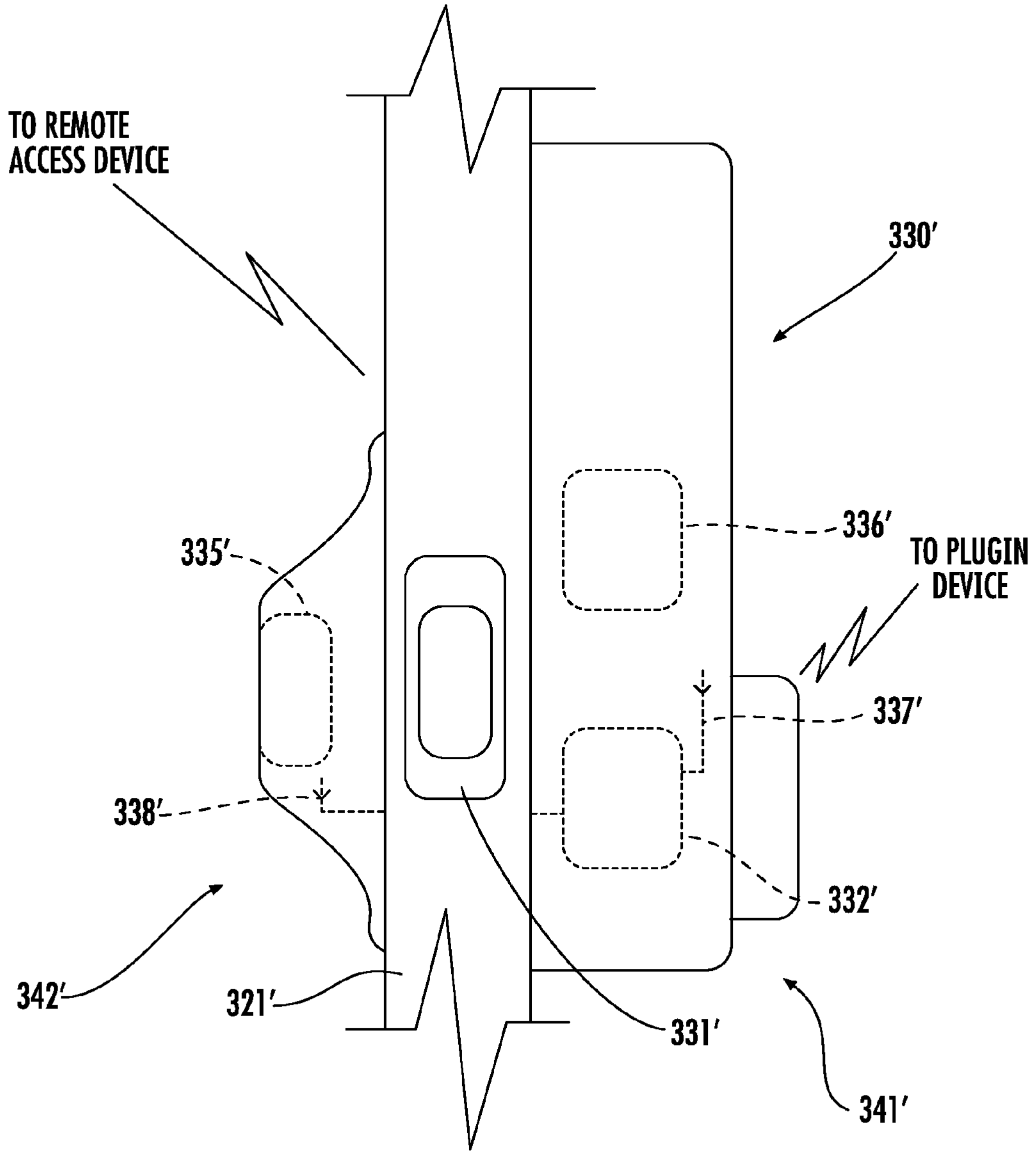
FIG. 27 is an enlarged side schematic view of lock assembly carried by a door in accordance with an embodiment of the present invention.
Figure 28:
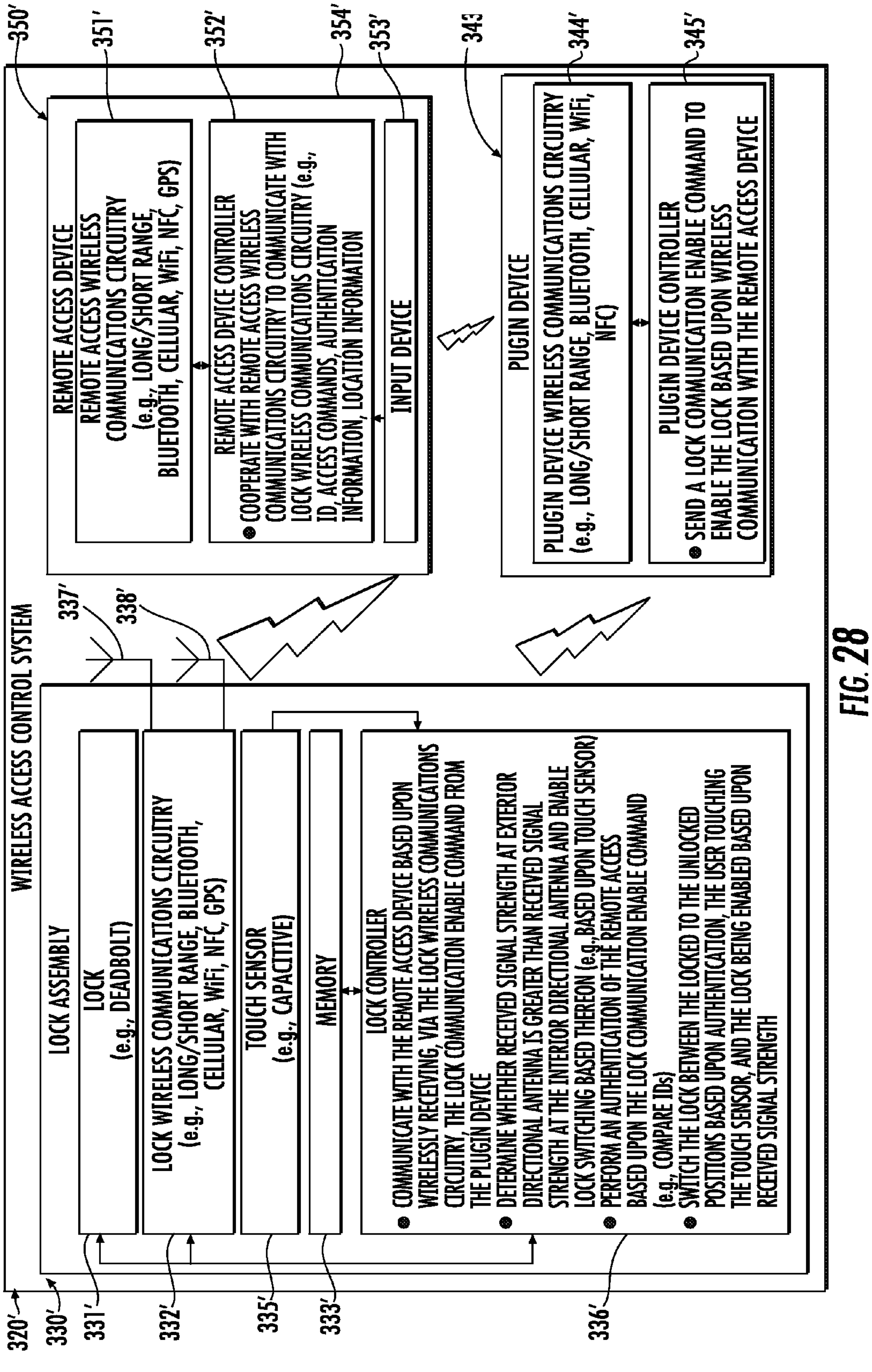
FIG. 28 is a schematic block diagram of a wireless access control system including the lock assembly of FIG. 27.
Figure 29:
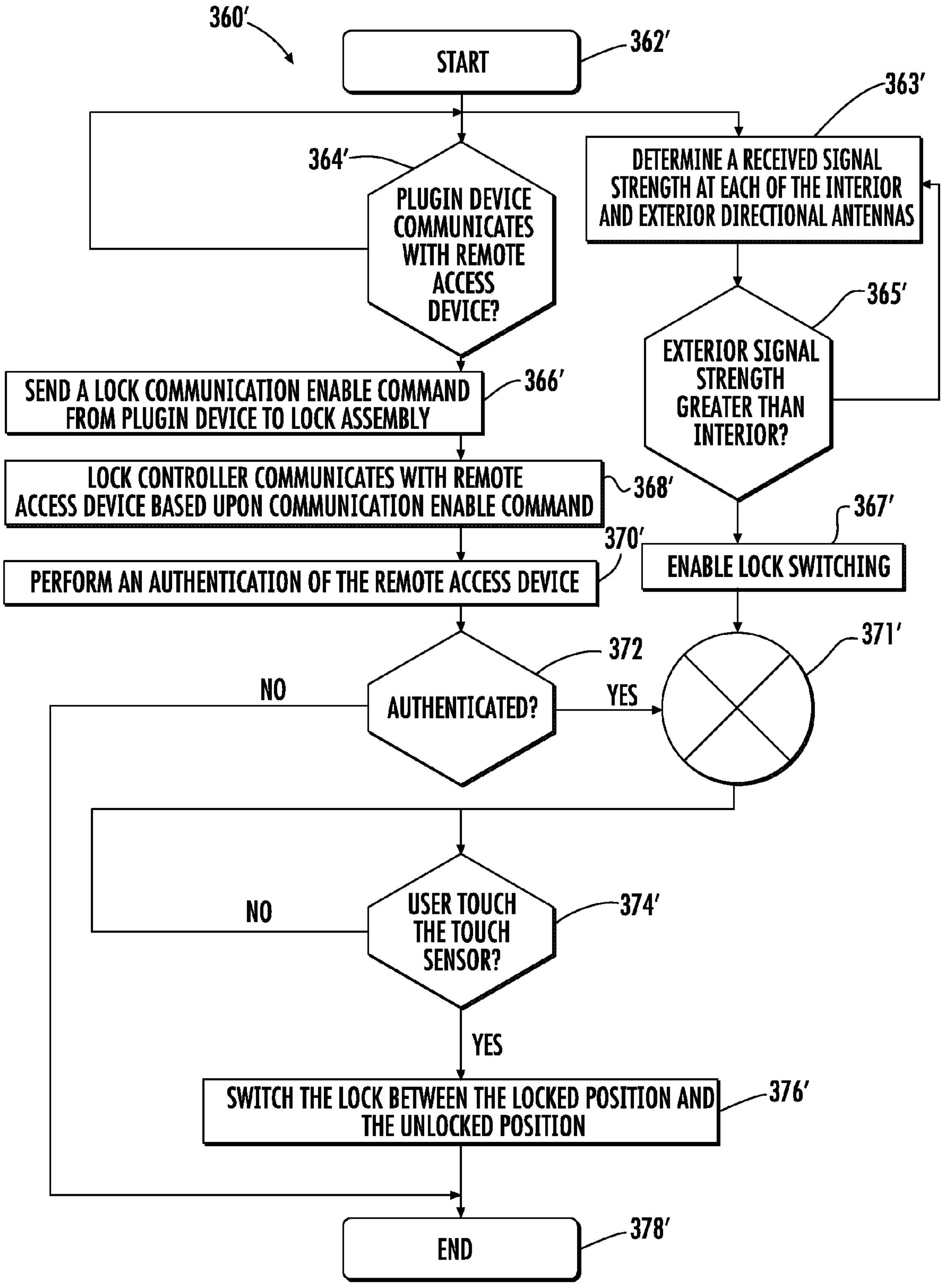
FIG. 29 is a flowchart illustrating operation of the wireless access control system of FIG. 28.

Referring now to FIGS. 27-28 and the flowchart 360' in FIG. 29, in another embodiment, the lock assembly 330' includes an interior directional antenna 337' directed toward the interior area 341', and an exterior directional antenna 338' directed toward the exterior area 342'. The lock controller 336' determines a received signal strength at each of the interior and exterior directional antennas 337', 338' based upon the communication with the remote access device 350' (Block 363'). The lock controller 336' enables switching of the lock 331' from the locked position to the unlocked position (Block 367') based upon the received signal strength at the exterior directional antenna 338' being greater than the received signal strength at the interior directional antenna 337' (Block 365'). Of course, for switching, the switching is to be enabled and the user authenticated (Block 371'). In some embodiments, the lock controller 336' may determine the received signal strength of communication with the remote access device 50' based upon the user touching the touch sensor 335'. The method ends at Block 378' or based upon a failed authentication.

Figure 30:
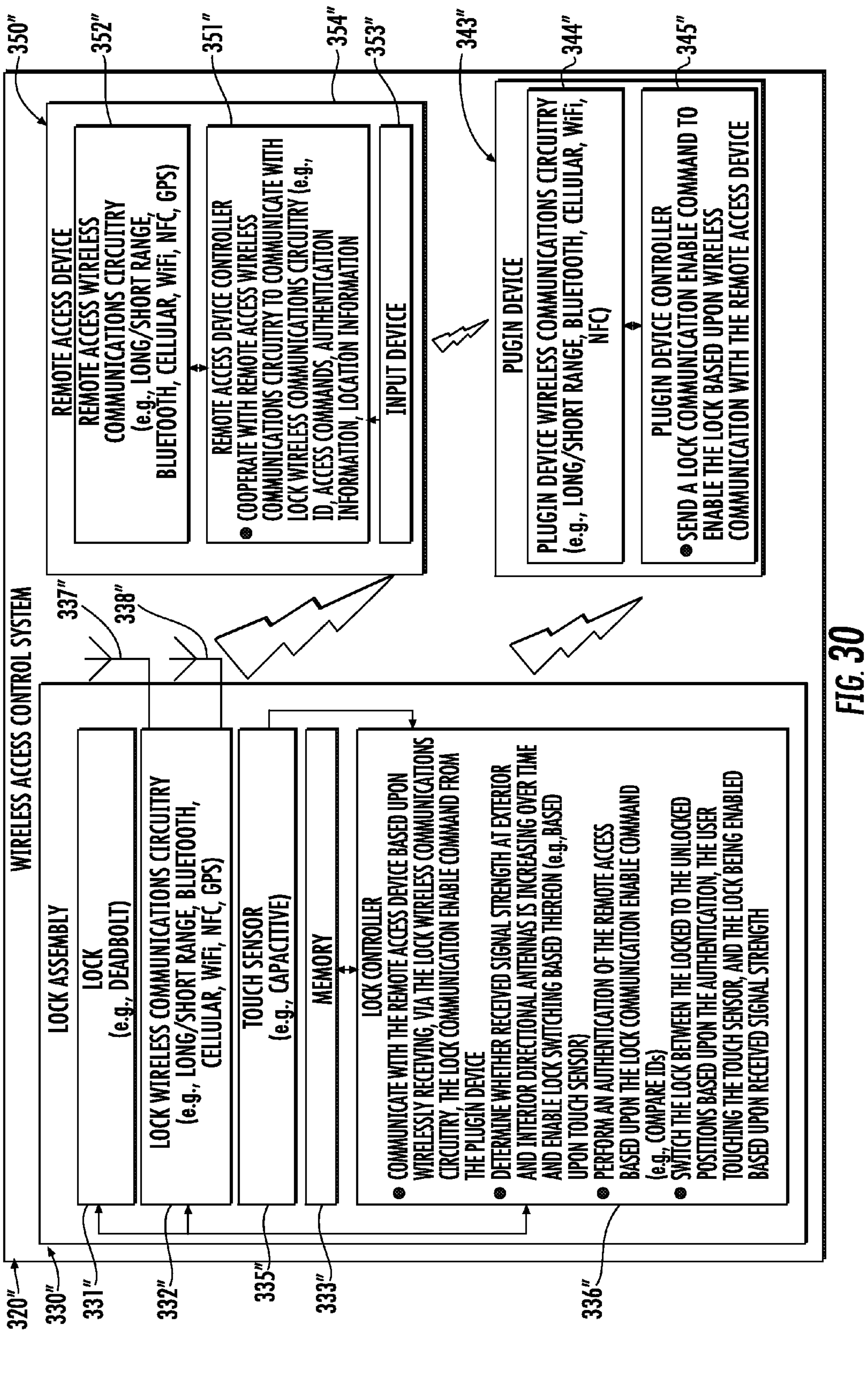
FIG. 30 is a schematic block diagram of a wireless access control system in accordance with another embodiment of the present invention.
Figure 31:
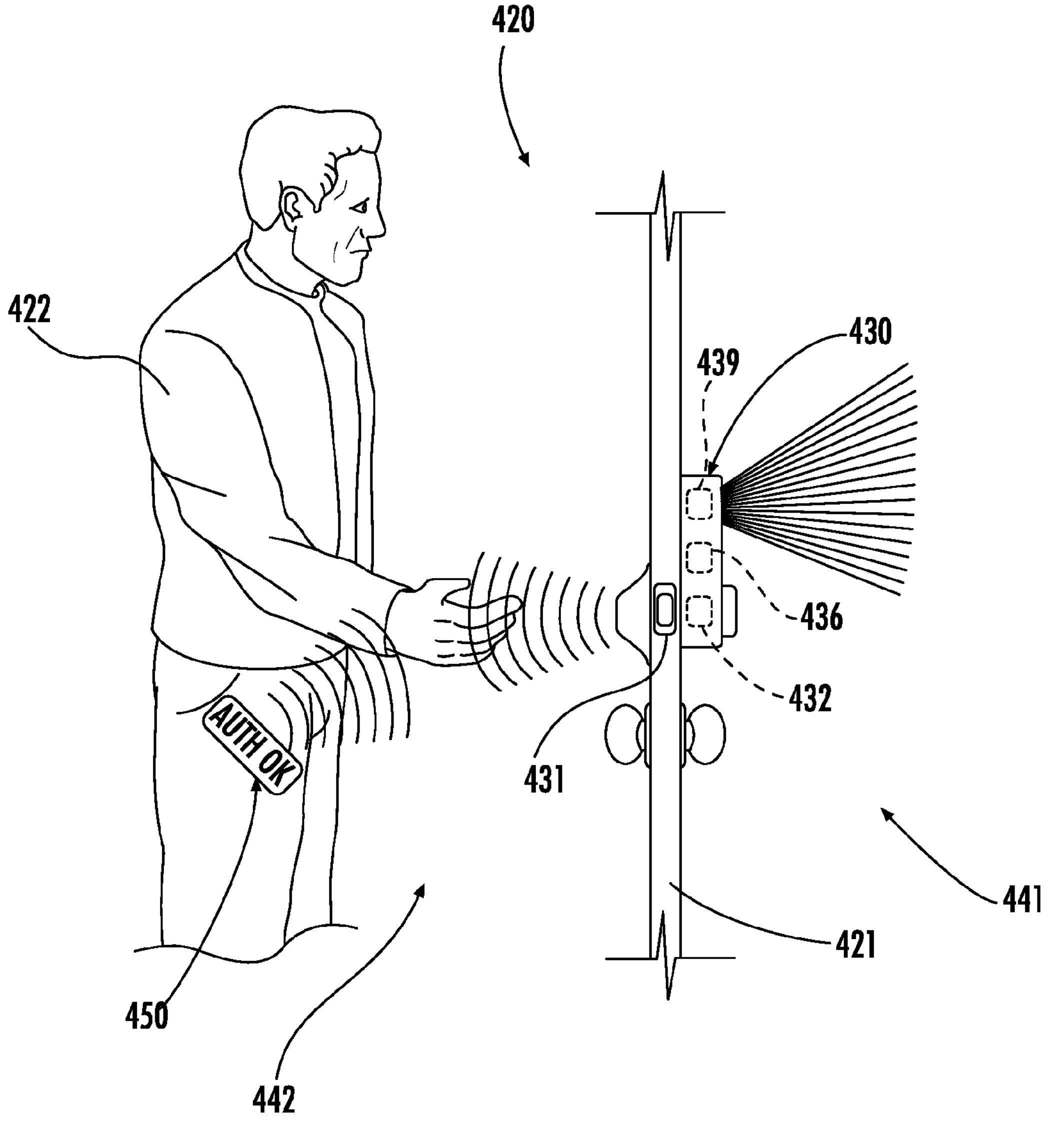
FIG. 31 is a diagram illustrating a side schematic view of a lock assembly of a wireless access control system and a remote access device of the wireless access control system carried by a user in the exterior area in accordance with an embodiment of the present invention.
Figure 32:
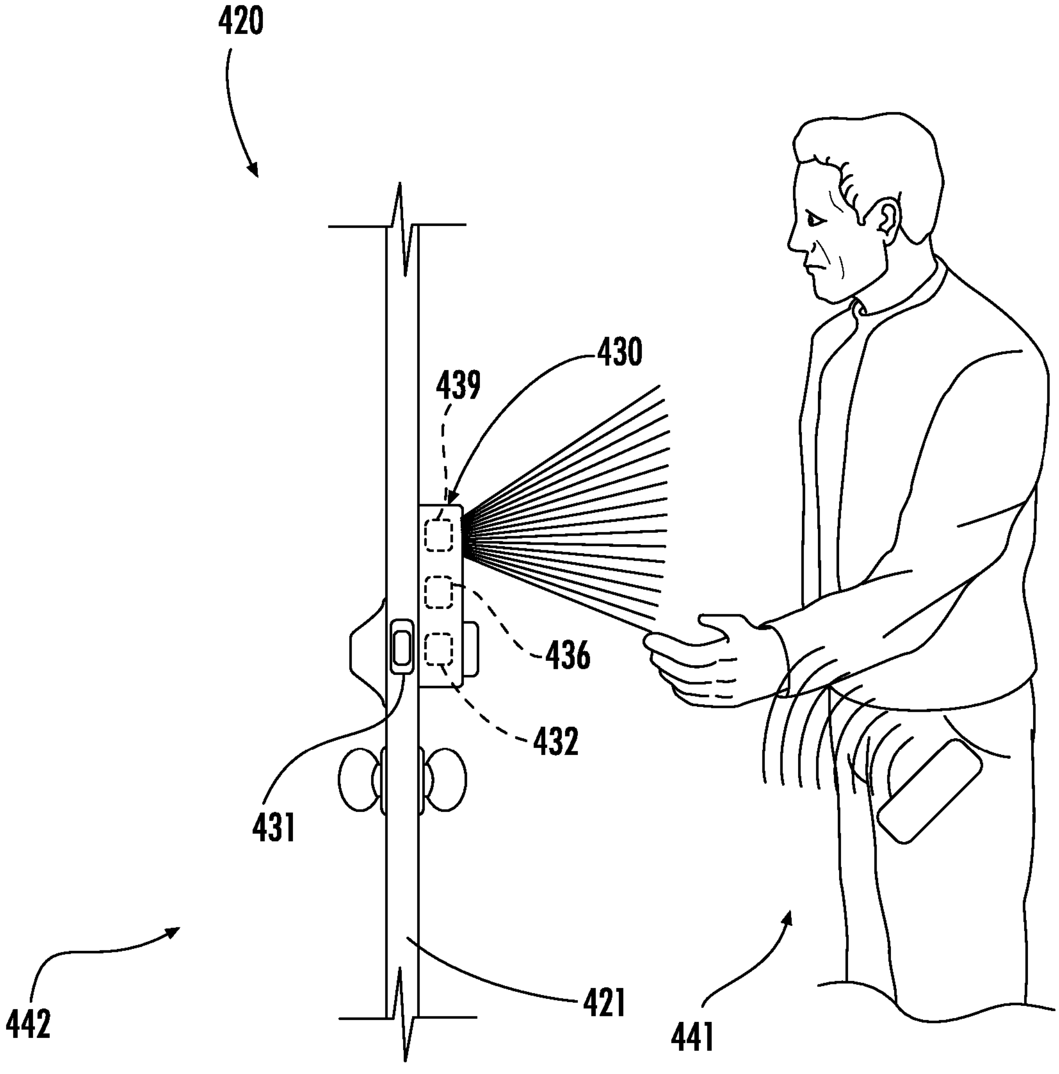
FIG. 32 is another diagram illustrating a side schematic view of the lock assembly of the wireless access control system and the remote access device of the wireless access control system carried by the user in the interior area in accordance with an embodiment of the present invention.
Figure 33:
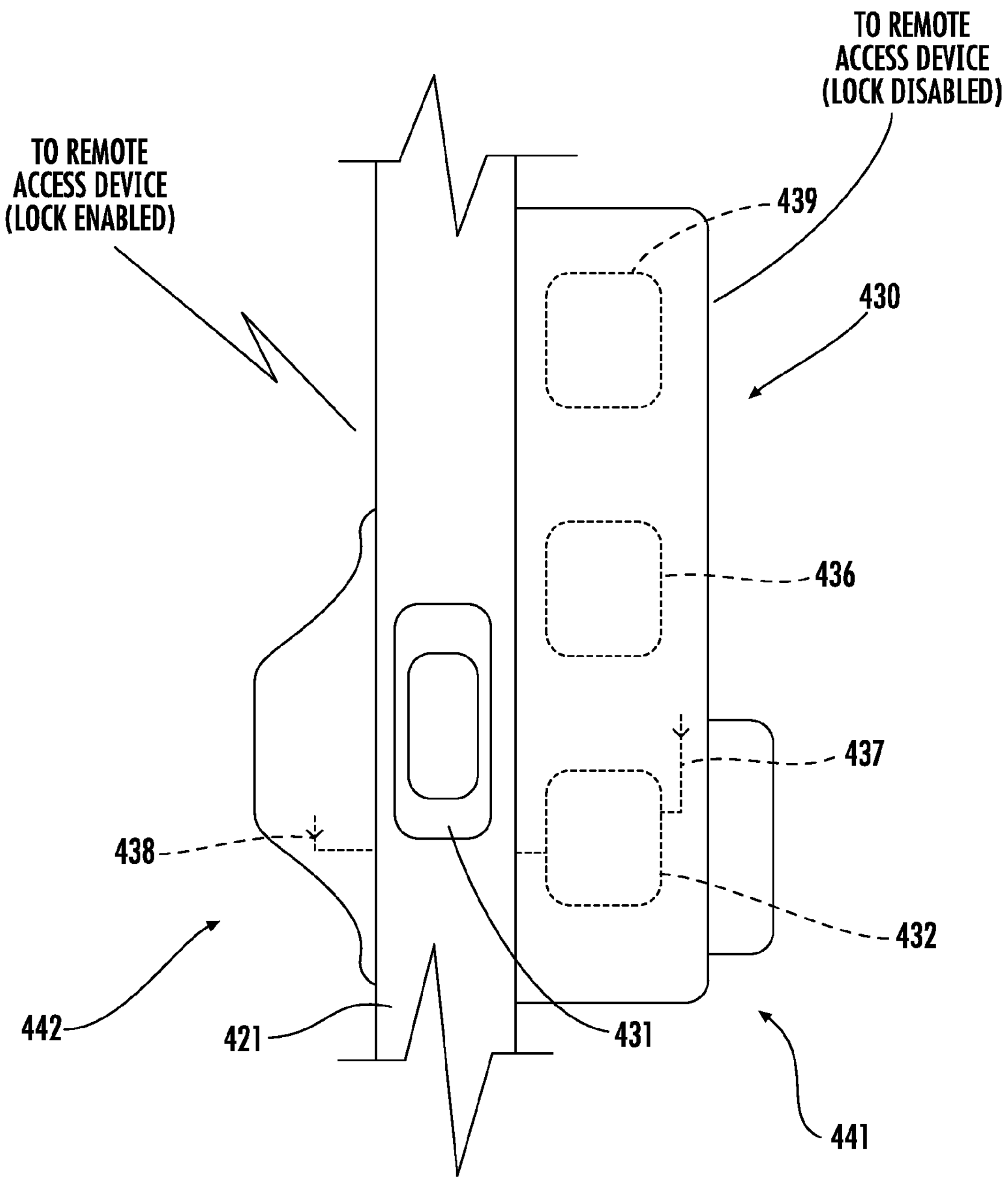
FIG. 33 is an enlarged side schematic view of the lock assembly of FIG. 32.
Figure 34:
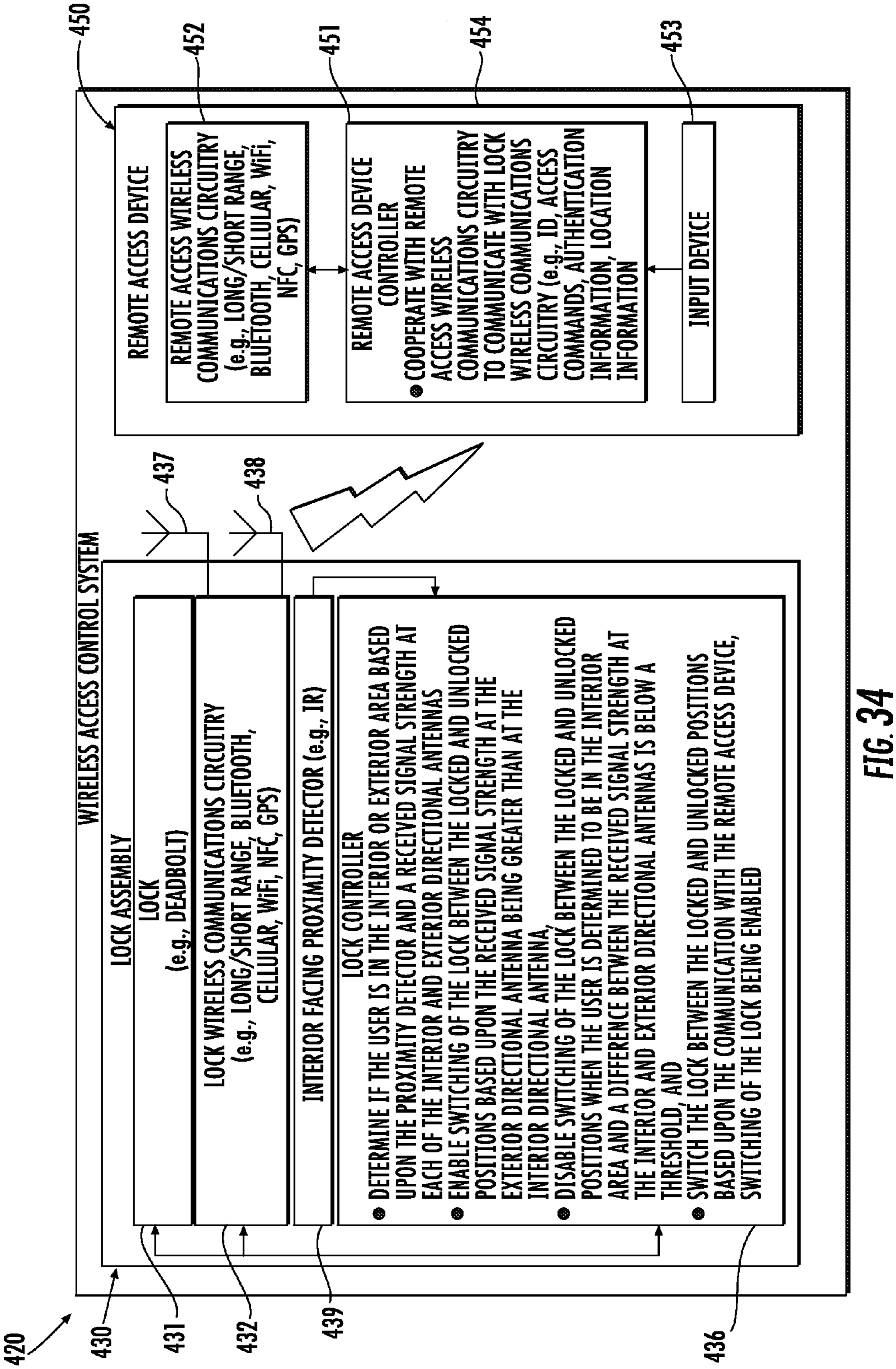
FIG. 34 is a schematic block diagram of the wireless access control system of FIG. 32.

In other words, even though the lock controller 336' communicates with the remote access device 350' based upon the lock enable command and performs the authentication, the lock controller may not switch the lock 331' from the unlocked to the locked position based upon the touch sensor 335' (assuming the user 322' is authenticated) unless the lock controller determines that the remote access device 350' is outside Referring briefly to FIG. 30, in another embodiment, the lock controller 336" may enable switching of the lock 331" from the locked position to the unlocked position based upon the received signal strength at the interior and exterior directional antennas 337", 338", based upon communication with the remote access device 350", increasing over time. The increasing received signal strength may be indicative of the remote access device 350" moving toward the lock assembly 330", for example, or arriving at the secured area. Of course, in other embodiments, the lock controller 336" may enable switching of the lock 331" from the unlocked position to the locked position based upon the received signal strength at the interior and exterior directional antennas 337", 338" based upon communication with the remote access device 50', decreasing over time.

Referring now to FIGS. 31-34, another embodiment of a wireless access control system 420 for a door 421 is illustrated. The wireless access control system 420 may include a lock assembly 430 carried by the door. The door 421 may be an interior door, exterior door, overhead garage door, a door to a structure, for example, a home or business, or any other door that separates an area where protection of that area may be desirable.

The lock assembly 430 may be considered a smart lock and illustratively includes a lock 431 that is switchable between locked and unlocked positions, and lock wireless communications circuitry 432. The lock 431 may be cylinder lock, a deadbolt, or other type of lock, as will be appreciated by those skilled in the art. In some embodiments, the lock 431 may accept a physical key, for example, for manual or key operation of the lock. The lock 430 assembly is illustratively exposed on both the interior and exterior of the door 421. It should be understood that the term interior may refer to the side of the door 421 that faces an area desirable of protection or secured space. For example, where the lock assembly 430 is carried by a door of a home, the interior side 441 is the side within the home, while the exterior side 442 is outside the home and may be accessible to people other than the home's inhabitants.

The lock wireless communications circuitry 432 may be configured to communicate via one or more a short range wireless communications protocols, for example, Bluetooth, NFC, WLAN, or other communications protocols. The lock wireless communications circuitry 432 may also communicate via a long range communication protocol, for example, cellular, or global positioning system, or other long range communication protocol. The lock wireless communications circuitry 432 may communicate using either or both of one or more short and long range protocols, as will be appreciated by those skilled in the art.

The lock assembly 430 also includes a proximity detector 439 directed toward the interior area 441 to detect a proximity of a user 422 to the door 421. The proximity sensor 439 may be an infrared (IR) proximity sensor, for example. The proximity sensor 439 may be another type of proximity sensor, as will be appreciated by those skilled in the art.

The lock assembly 430 also includes an interior directional antenna 437 directed toward the interior area 441, and an exterior directional antenna 448 directed toward the exterior area 442 The interior and exterior directional antennas 437, 438 are coupled to the lock wireless communications circuitry 432. The lock assembly 439 further includes a lock controller 436 coupled to lock 431, the lock wireless communications circuitry 432, the proximity sensor 439, and the interior and exterior directional antennas 437, 438.

The wireless access control system 420 also illustratively includes a remote access device 450 remote from the lock assembly 430. The remote access device 450 includes a remote access device controller 451 and remote access wireless communications circuitry 452 coupled to the remote access device controller 451. The remote access device controller 451 and the remote access device wireless communications circuitry 452 cooperate to communicate with the lock wireless communications circuitry 432. For example, the remote access device controller 451 and the remote access device wireless communications circuitry 452 cooperate to communicate access commands, location information, authentication information, and/or other information for communicating with and controlling operation of the lock 431, and/or other devices that may be included in the wireless access control system 420, as will be appreciated by those skilled in the art. Similar to the lock wireless communication circuitry 432, the remote access device wireless communications circuitry 452 may communicate using one or both of short range and long range communications protocols.

The remote access device 459 may be in the form of a fob or keychain, and may include housing 454 carrying a battery for powering the remote access device controller 451 and wireless communications circuitry 452, and at least one input device 453 carried by the housing and coupled to the remote access device controller 451. In other embodiments, the remote access device 450 may be a cellular telephone, tablet PC, or any other portable wireless communications device.

Figure 35:
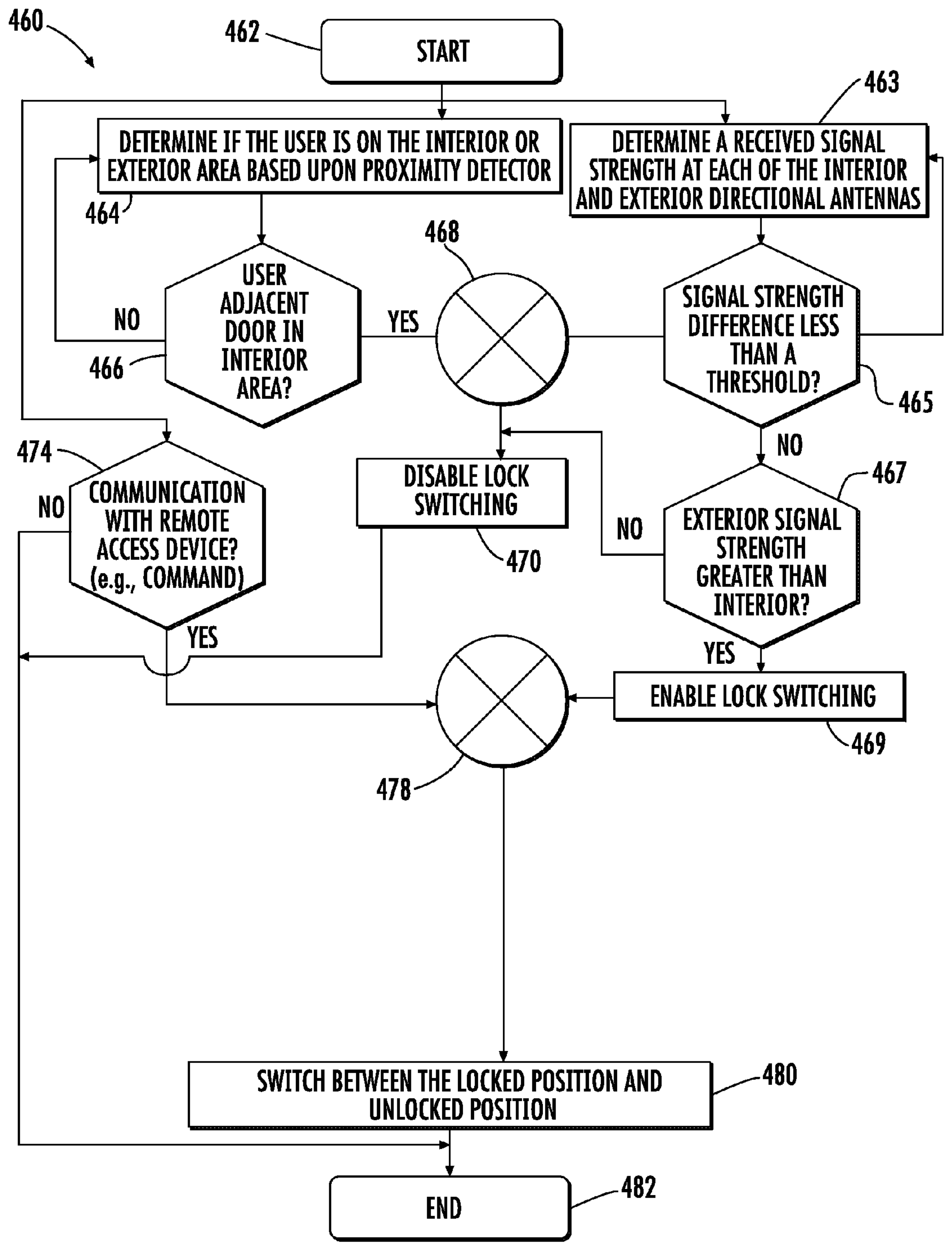
FIG. 35 is a flowchart illustrating operation of the wireless access control system of FIG. 32.

Referring now additionally to the flowchart 460 in FIG. 35, beginning at Block 462, the lock controller 436 determines if the user 422 is in the interior area 441 (Block 464) or the exterior area 442 based upon the proximity detector 439 and a received signal strength at each of the interior and exterior directional antennas 437, 438 (Block 463). The received signal strength at each of the interior and exterior directional antennas 437, 438 is determined based upon wireless communication with the remote access device 450, using the remote access device wireless communications circuitry 452 and the lock wireless communications circuitry 432. More particularly, the received signal strength at the interior directional antenna 437 being greater than the received signal strength at the exterior directional antenna 438, for example, by a threshold signal strength, may be indicative of the user being on the interior 441 or in the secure space. Alternatively, if the received signal strength at the exterior directional antenna 438 is greater than the received signal strength at the interior directional antenna 437, for example, by a threshold signal strength, the user 422 may be in the exterior area 442.

If the user 422 is determined to be on the exterior (Block 465) based upon the received signal strength, for example based upon the exterior signal being greater than the interior by the threshold signal strength (Block 465), lock controller 436 enables the lock to be switched between the locked and unlocked positions (Block 469). The lock controller 436 may enable the lock 431 irrespective of the proximity detector 439 detecting the proximity of the user 422 to the door 421. In some embodiments, the lock controller 436 may enable the lock based upon the proximity sensor 439 not detecting the proximity of the user 422 to the door 421.

If the user is determined to be in the interior area 441, for example, based upon the received signal strength at the interior directional antenna 437 being greater than the exterior directional antenna 438 (Block 467) by a threshold signal strength (Block 465), the lock controller 436 may disable the lock from being switched between the locked and unlocked positions (Block 470). The lock controller 436 may disable the lock 431 irrespective of the proximity detector 439 detecting the proximity of the user 422 to the door 421 in the interior area 441. In some embodiments, the lock controller 436 may disable the lock based upon the proximity sensor 439 detecting the proximity of the user to the door on the interior area 441.

The lock controller 436 also disables, at Block 470, switching of the lock 431 between the locked and unlocked positions when the user 422 is determined to be in the interior area 441 based upon the proximity sensor 439 and a difference between the received signal strength at the interior and exterior directional antennas 437, 438 being below a threshold (Block 468). For example, if the signal strength at each of the interior and exterior directions antennas 437, 438 is so close that the lock controller 436 cannot discern whether the user in the interior area 441 or the exterior area 442, the proximity sensor 439 may be used, for example, solely, to determine whether the user 422 is in the interior area or exterior area and disable the lock 431 if the user is in the interior area (Block 466). Of course, as will be appreciated by those skilled in the art, the received signal strength may also be used in addition to the proximity sensor 439, and the proximity sensor may be adjusted or have its sensitivity set to detect the user 422.

At Block 478, if the lock 431 is enabled, for example, based upon the determination of the user 422 being in the exterior area 442, the lock controller 436, based upon the communication with the remote access device 450 (Block 474), switches the lock between the locked and unlocked positions (Block 480). The method ends at Block 482 or if the lock 431 is disabled or based upon communication with the remote access device 450, for example if a “switch” command is not received.

Figure 36:
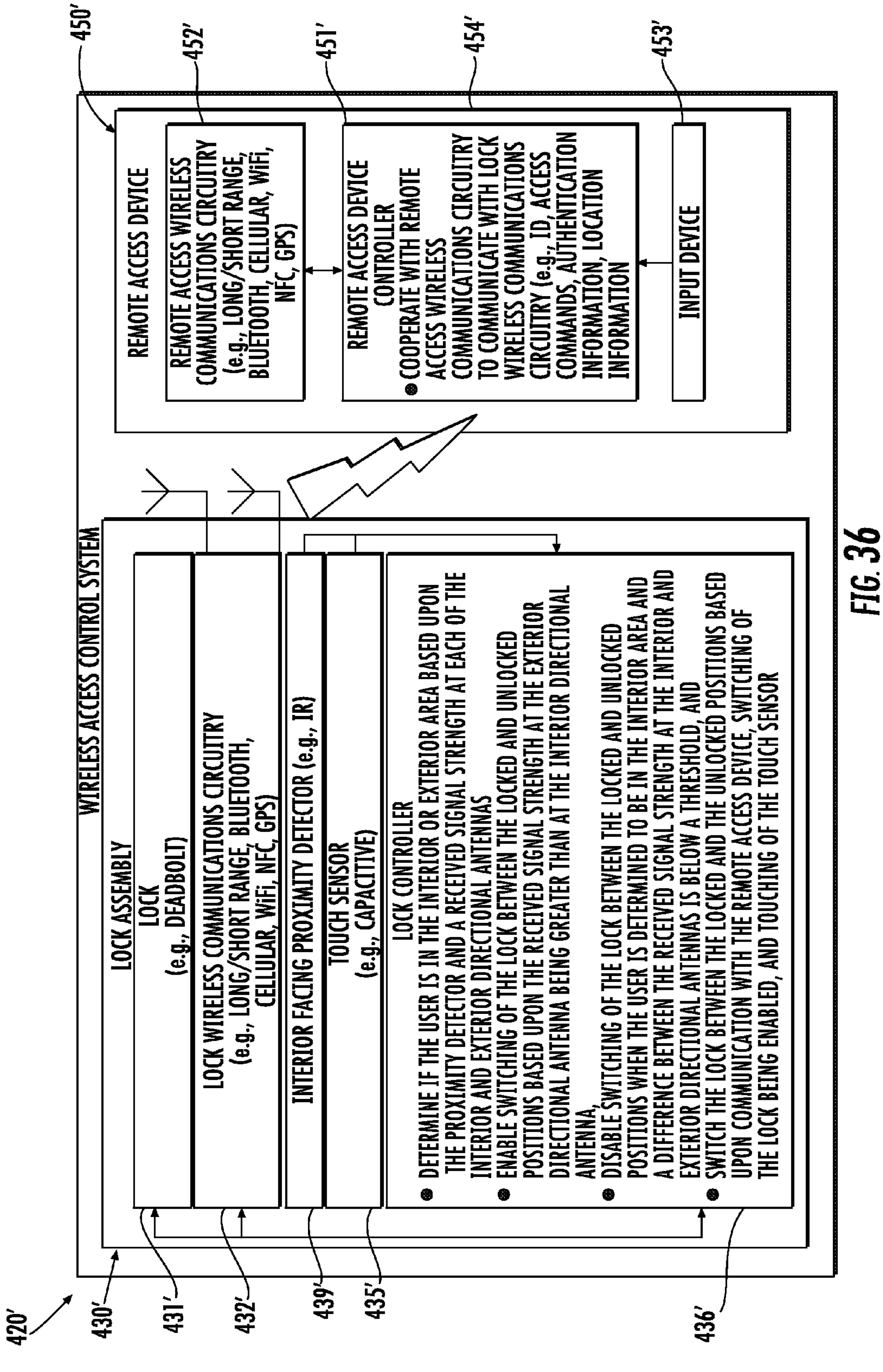
FIG. 36 is a schematic block diagram of a wireless access control system in accordance with another embodiment of the present invention.
Figure 37:
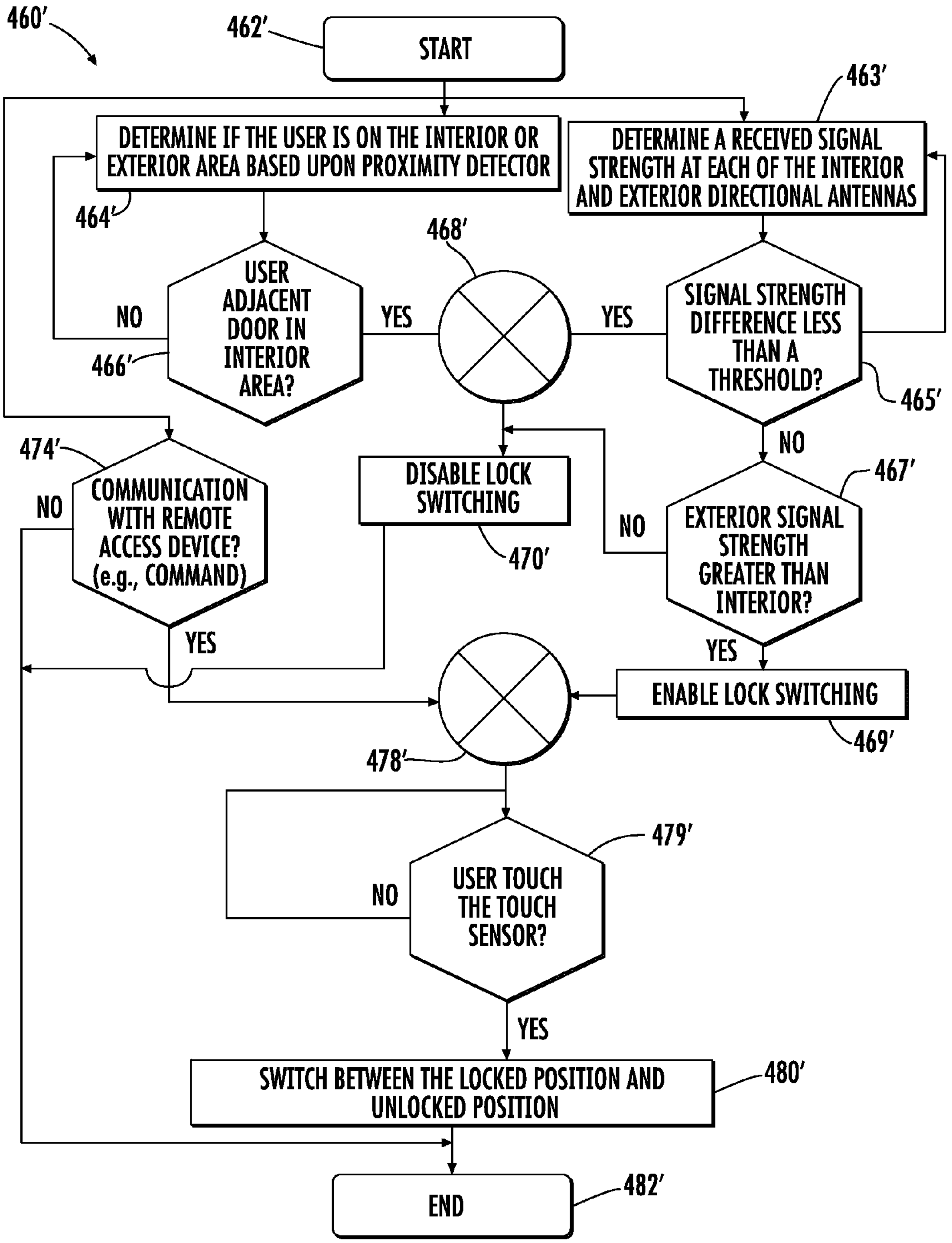
FIG. 37 is a flowchart illustrating operation of the wireless access control system of FIG. 36.

Referring briefly to FIG. 36 and the flow chart 460' in FIG. 37, in another embodiment, the lock assembly 430' also illustratively includes a touch sensor 435' facing the exterior area to sense touching by a user 422'. The touch sensor 435' may be a capacitive touch sensor, for example, and when the lock 431' includes a key hole, may be positioned around the key hole. The touch sensor 435' may be positioned elsewhere on the lock assembly 430'. More than one touch sensor 435' may be used. For example, in some embodiments, the lock assembly 430' may include an interior touch sensor and an exterior touch sensor. Other types of touch sensors may also be used.

The lock 431' may be switched between the locked and unlocked positions based upon the touch sensor 435'. For example, the user 422' may lock or unlock the door 421' by touching the touch sensor 435'. At Block 478', if the lock 431 is enabled, for example, based upon the determination of the user 422' being in the exterior area 442', the lock controller 436', based upon the communication with the remote access device 450' (Block 474') and the user touching the touch sensor 435' (Block 479'), switches the lock between the locked and unlocked positions (Block 480'). The method ends at Block 482' or if the lock 431' is disabled or based upon communication with the remote access device 450', for example if a “switch” command is not received.

Figure 38:
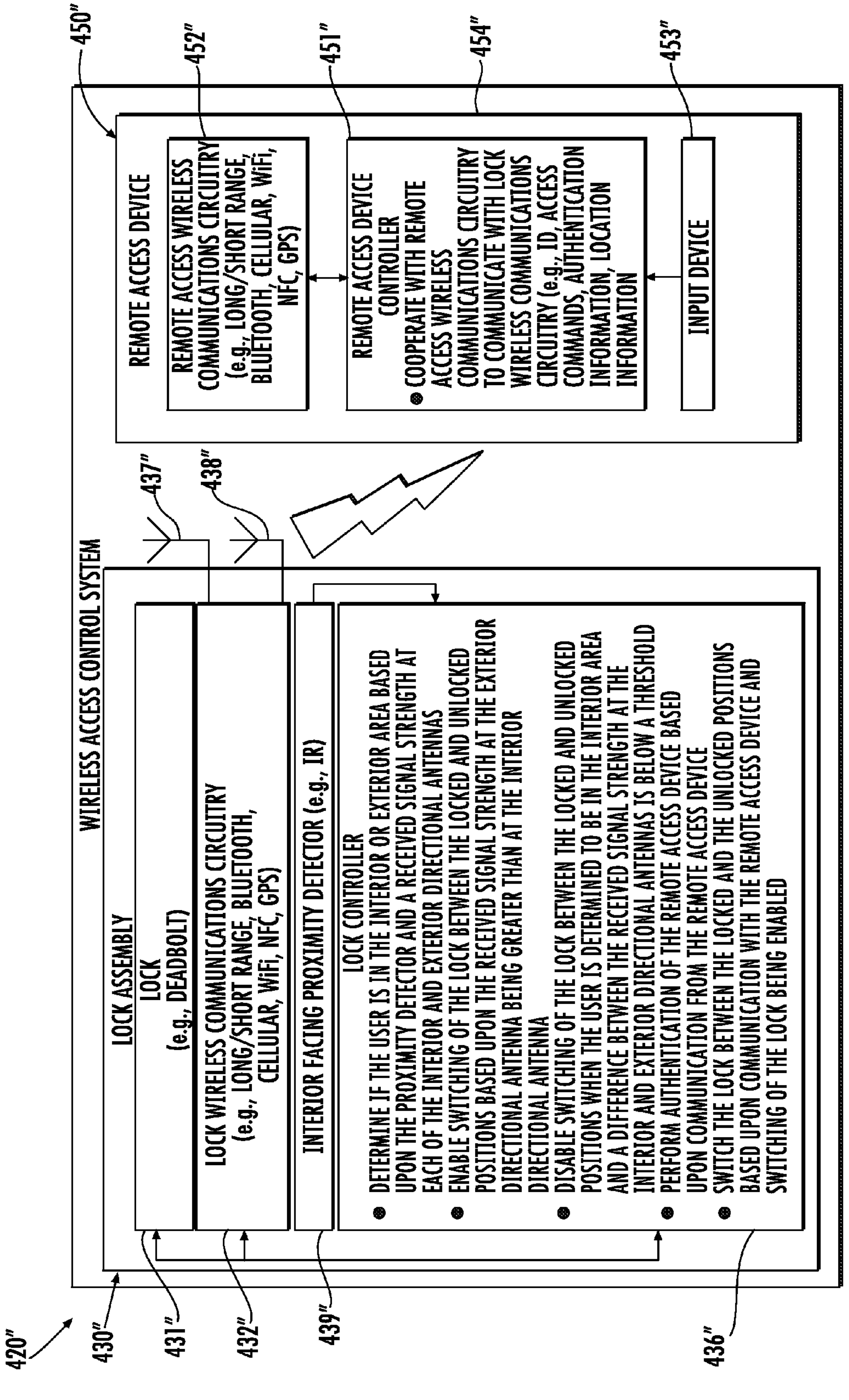
FIG. 38 is a schematic block diagram of a wireless access control system in accordance with another embodiment of the present invention.
Figure 39:
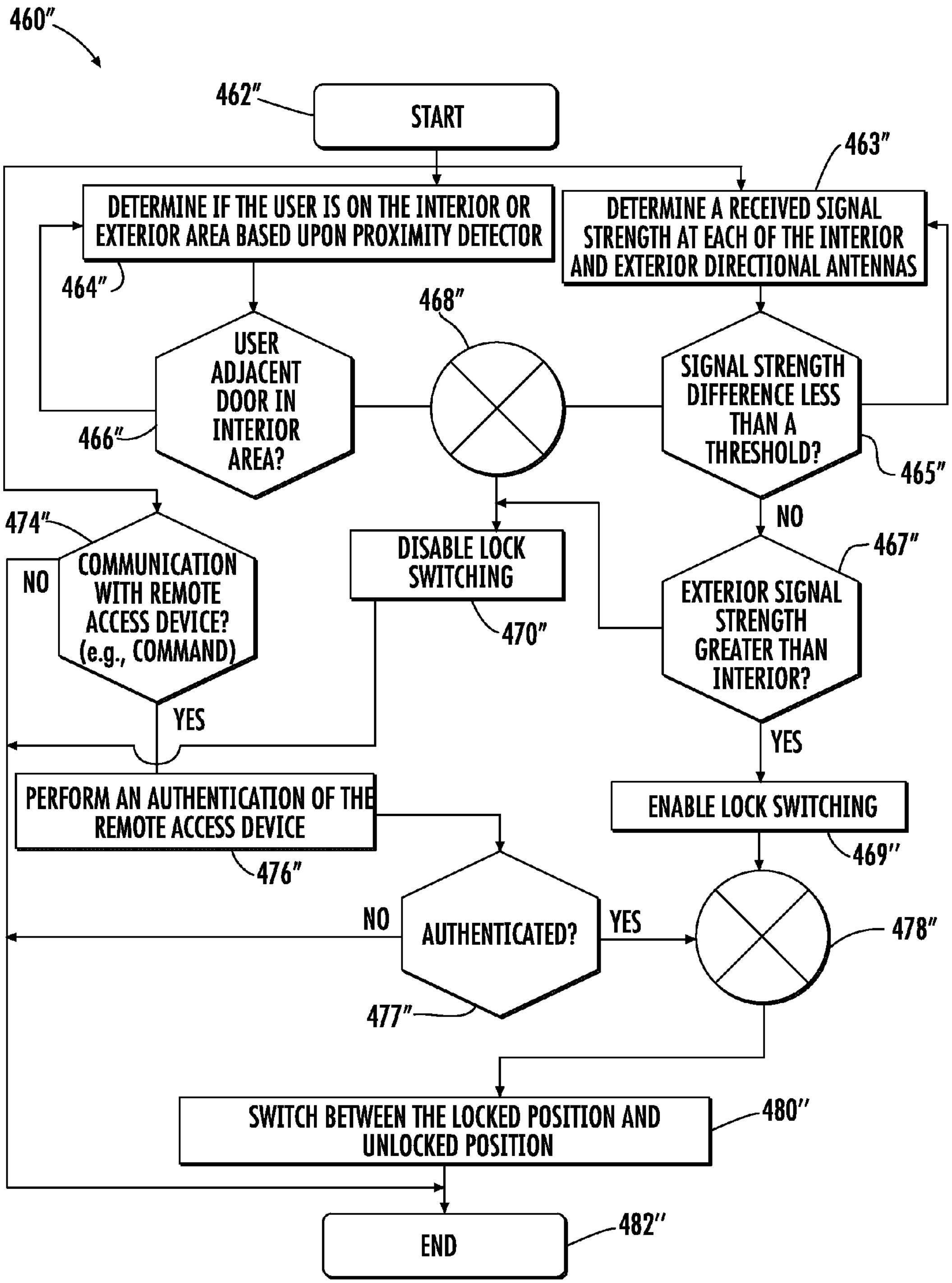
FIG. 39 is a flowchart illustrating operation of the wireless access control system of FIG. 38.

Referring now to FIG. 38 and the flowchart 460" in FIG. 39, beginning at Block 462", in another embodiment, the lock controller 436" performs an authentication of the remote access device 450" based upon the communication from the remote access device (Block 476"). The lock controller 436" compares the unique ID of the remote access device 450" to remote access device IDs stored in a memory coupled to the lock controller. If the unique ID of the remote access device 450" matches an ID in the memory, the remote access device may be considered authenticated. Of course, there may be other and/or additional factors that may affect whether the remote access device 50 is authenticated, for example, is within an authorized time period.

At Block 480", the lock controller 436" switches the lock 431" from the locked position to the unlocked position based upon the authentication (Block 477"), the lock being enabled at Block 469" (Block 478"). The method ends at Block 482", if the authentication fails, or if the lock 431" is disabled or based upon communication with the remote access device 450", for example if a “switch” command is not received.

As will be appreciated by those skilled in the art, any delay that would typically result for authenticating a remote access device 450" would be reduced as the authentication of the remote access device had already completed or at least already begun by the time the user arrives at or uses or access the lock assembly 430". The switching of the lock 431" from the unlocked to the locked position may appear near instantaneous to the user 422". It should be understood that this near instantaneous unlocking of the door 421" occurs when the lock controller 436" has reason to believe the user 422" is about to unlock the lock 431" or is approaching the lock assembly 430".

While a specific example embodiment has been described herein with respect to the interior and exterior area, it should be appreciated to those skilled in the art that the proximity sensor may be alternatively or additionally positioned facing the exterior area and may be used to aid in the determination whether the user is in the interior or exterior areas.

Figure 40:
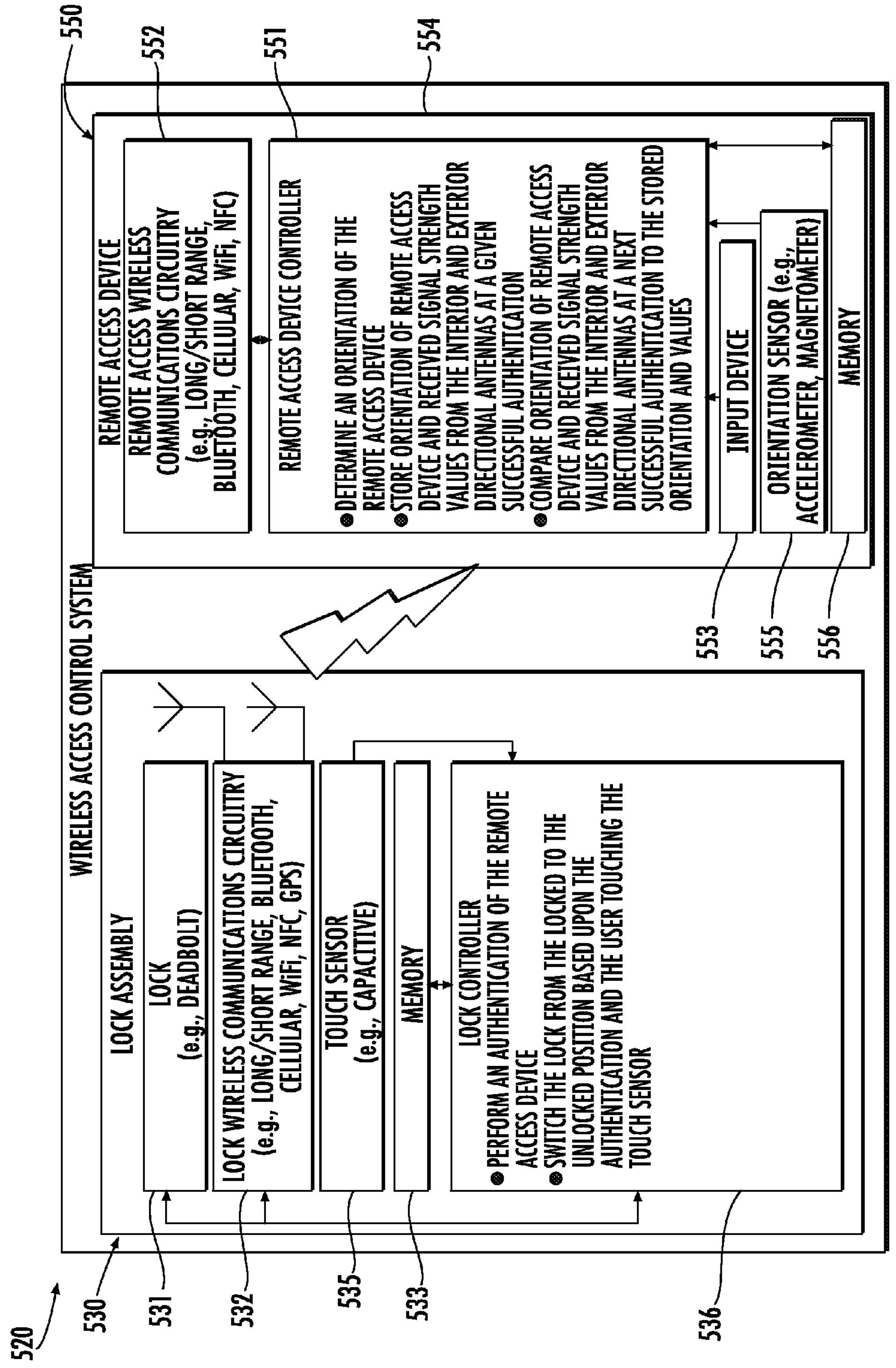
FIG. 40 is a schematic block diagram of a wireless access control system in accordance with another embodiment.

Referring now to FIG. 40, in another embodiment, the remote access device 550 includes an orientation sensor 555 coupled to the remote access device controller 551. The orientation sensor 555 senses an orientation of the remote access device 550, for example, the housing 554, relative to the lock 531. The orientation sensor 555 may include one or more of an accelerometer and a magnetometer. Of course, the orientation sensor 555 may include other and/or additional circuitry or sensors as will be appreciated by those skilled in the art.

When, for example, after a successful authentication or lock enablement, the user 522 touches the touch sensor 535 to switch the lock 531 between the locked and unlocked positions, for example, the orientation of the remote access device 550 is stored in a lookup table, which may be stored in the lock assembly memory 533 or the remote access device memory 553. For example, for every touching of the touch sensor 555, the remote access device's orientation, as indicated by a snapshot of the orientation sensor, and the received signal strength values at the interior and exterior directional antennas 537, 538 may be stored at the remote access device 550 and/or the lock assembly 531. Upon subsequent touching of the touch sensor 555, the remote access device 550 may compare its current orientation and received signal strength values to the corresponding previously stored values in the lookup table. If the current parameters are substantially similar, for example, within a threshold percentage of the lookup table parameters, such as, for example, ±10%, to the expected parameters, the lock may be enabled. However, if there are certain received signal strength/orientation patterns that may be increasingly problematic, for example, having a delta between the interior and exterior received signal strengths be too small, the lock 531 may be disabled, or the threshold for enablement of the lock may be decreased.

While some embodiments have been described so that the lock controller 36 switches the lock 31 between the unlocked and locked positions, and vice versa, it should be appreciated by those skilled in the art that the lock controller may switch the lock between any of the locked and unlocked positions in the embodiments described herein. Moreover, while different embodiments have been described herein, any of the functions or features described in any one embodiment may be used in conjunction with any one or more functions or features described in other embodiments. Additional details of wireless access control systems for a door can be found in U.S. application Ser. Nos. 13/415,365, 13/654,132, 13/734,671, 13/968,067, and 14/304,573, the contents of all of which are hereby incorporated in their entirety by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that, modifications and embodiments are intended to be included within the scope of the appended claims.

That which is claimed is:

1. A wireless access control system for a door, the door defining interior and exterior areas, the wireless access control system comprising:

a lock assembly carried by the door and comprising a lock switchable between a locked position and an unlocked position, lock wireless communications circuitry, a proximity detector directed toward the interior area to detect a proximity of a user to the door, an interior directional antenna directed toward the interior area, an exterior directional antenna directed toward the exterior area, and a lock controller coupled to said lock, said lock wireless communications circuitry, said proximity detector, and said interior and exterior directional antennas; and a remote access device remote from said lock assembly;

said lock controller configured to determine if the user is in the interior area or exterior area based upon said proximity detector and a received signal strength at each of said interior and exterior directional antennas based upon wireless communication with said remote access device, enable switching of said lock between the locked and unlocked positions based upon the received signal strength at said exterior directional antenna being greater than at said interior directional antenna, disable switching of said lock between the locked and unlocked positions when the user is determined to be in the interior area and a difference between the received signal strength at said interior and exterior directional antennas is below a threshold, and switch said lock between the locked and unlocked positions based upon communication with said remote access device and switching of said lock being enabled.

2. The wireless access control system of claim 1 wherein said lock controller is configured to determine a received signal strength at each of said interior and exterior directional antennas based upon communication with said remote access device and disable switching of said lock between the locked and unlocked positions based upon the received signal strength at said interior directional antenna being greater than the received signal strength at said exterior directional antenna.

3. The wireless access control system of claim 1 wherein said lock controller is configured to determine a received signal strength at each of said interior and exterior directional antennas based upon communication with said remote access device and enable switching of said lock between the locked and unlocked positions based upon the received signal strength at said interior and exterior directional antennas increasing over time.

4. The wireless access control system of claim 1 wherein said proximity detector comprises an infrared (IR) proximity detector.

5. The wireless access control system of claim 1 wherein said lock assembly further comprises a touch sensor coupled to said lock controller and configured to sense touching from the user, and wherein said lock controller is configured to switch said lock between the locked and unlocked positions based upon the user touching said touch sensor.

6. The wireless access control system of claim 5 wherein said touch sensor is directed to the exterior area.

7. The wireless access control system of claim 5 wherein said touch sensor comprises a capacitive touch sensor.

8. The wireless access control system of claim 1 wherein said lock controller is configured to perform an authentication of said remote access device based upon communication with said remote access device and switch said lock between the locked and unlocked positions based upon the authentication.

9. A lock assembly for wireless access control system for a door, the door defining interior and exterior areas, the lock assembly carried by the door and comprising:

a lock switchable between a locked position and an unlocked position;

lock wireless communications circuitry;

a proximity detector directed toward the interior area to detect a proximity of a user to the door;

an interior directional antenna directed toward the interior area;

an exterior directional antenna directed toward the exterior area; and a lock controller coupled to said lock, said lock wireless communications circuitry, said proximity detector, and said interior and exterior directional antennas, said lock controller configured to determine if the user is in the interior area or exterior area based upon said proximity detector and a received signal strength at each of said interior and exterior directional antennas based upon wireless communication with a remote access device remote from the lock assembly, enable switching of said lock between the locked and unlocked positions based upon the received signal strength at said exterior directional antenna being greater than at said interior directional antenna, disable switching of said lock between the locked and unlocked positions when the user is determined to be in the interior area and a difference between the received signal strength at said interior and exterior directional antennas is below a threshold, and switch said lock between the locked and unlocked positions based upon communication with said remote access device and switching of said lock being enabled.

10. The lock assembly of claim 9 wherein said lock controller is configured to determine a received signal strength at each of said interior and exterior directional antennas based upon communication with said remote access device and disable switching of said lock between the locked and unlocked positions based upon the received signal strength at said interior directional antenna being greater than the received signal strength at said exterior directional antenna.

11. The lock assembly of claim 9 wherein said lock controller is configured to determine a received signal strength at each of said interior and exterior directional antennas based upon communication with said remote access device and enable switching of said lock between the locked and unlocked positions based upon the received signal strength at said interior and exterior directional antennas increasing over time.

12. The lock assembly of claim 9 wherein said proximity detector comprises an infrared (IR) proximity detector.

13. The lock assembly of claim 9 further comprising a touch sensor coupled to said lock controller and configured to sense touching from the user and wherein said lock controller is configured to switch said lock between the locked and unlocked positions based upon the user touching said touch sensor.

14. The lock assembly of claim 13 wherein said touch sensor is directed to the exterior area.

15. The lock assembly of claim 13 wherein said touch sensor comprises a capacitive touch sensor.

16. A method of using a wireless access control system for a door, the door defining interior and exterior areas, the wireless access control system comprising a lock assembly carried by the door and comprising a lock switchable between a locked position and an unlocked position, lock wireless communications circuitry, a proximity detector directed toward the interior area to detect a proximity of a user to the door, an interior directional antenna directed toward the interior area, an exterior directional antenna directed toward the exterior area, and a lock controller coupled to the lock, the lock wireless communications circuitry, the proximity detector, and the interior and exterior directional antennas, the wireless access control system further comprising a remote access device remote from the lock, the method comprising:

using the lock controller to determine if the user is in the interior area or exterior area based upon the proximity detector and a received signal strength at each of the interior and exterior directional antennas based upon wireless communication with the remote access device, enable switching of the lock between the locked and unlocked positions based upon the received signal strength at the exterior directional antenna being greater than at the interior directional antenna, disable switching of the lock between the locked and unlocked positions when the user is determined to be in the interior area and a difference between the received signal strength at the interior and exterior directional antennas is below a threshold, and switch the lock between the locked and unlocked positions based upon communication with the remote access device and switching of the lock being enabled.

17. The method of claim 16 wherein using the lock controller comprises using the lock controller to determine a received signal strength at each of the interior and exterior directional antennas based upon communication with the remote access device and disable switching of the lock between the locked and unlocked positions based upon the received signal strength at the interior directional antenna being greater than the received signal strength at the exterior directional antenna.

18. The method of claim 16 wherein using the lock controller comprises using the lock controller to determine a received signal strength at each of the interior and exterior directional antennas based upon communication with the remote access device and enable switching of the lock between the locked and unlocked positions based upon the received signal strength at the interior and exterior directional antennas increasing over time.

19. The method of claim 16 wherein the lock assembly further comprises a touch sensor coupled to the lock controller and configured to sense touching from the user, and wherein using the lock controller to switch the lock between the locked and unlocked positions comprises using the lock controller to switch the lock between the locked and unlocked positions based upon the user touching the touch sensor.

20. The method of claim 16 wherein using the lock controller comprises using the lock controller to perform an authentication of the remote access device based upon communication with the remote access device and switch the lock between the locked and unlocked positions based upon the authentication.

* * * * *